US012165439B2

(12) United States Patent
Tal et al.

(10) Patent No.: US 12,165,439 B2
(45) Date of Patent: Dec. 10, 2024

(54) SYSTEM AND METHOD FOR INTERACTIVELY REPORTING OF ROADWAY INCIDENTS ON AN AI DEVICE

(71) Applicant: Visual Defence Inc., Richmond Hill (CA)

(72) Inventors: Royi Tal, Richmond Hill (CA); Thomas Bakonyi, Richmond Hill (CA)

(73) Assignee: VISUAL DEFENCE INC., Richmond Hill (CA)

( * ) Notice: Subject to any disclaimer, the term of this patent is extended or adjusted under 35 U.S.C. 154(b) by 707 days.

(21) Appl. No.: 17/373,514

(22) Filed: Jul. 12, 2021

(65) Prior Publication Data
US 2022/0020230 A1 Jan. 20, 2022

Related U.S. Application Data

(63) Continuation-in-part of application No. 16/930,070, filed on Jul. 15, 2020, now Pat. No. 11,481,991.

(51) Int. Cl.
*G07C 5/00* (2006.01)
*G06V 20/56* (2022.01)
*G07C 5/08* (2006.01)

(52) U.S. Cl.
CPC .............. *G07C 5/008* (2013.01); *G06V 20/56* (2022.01); *G07C 5/085* (2013.01)

(58) Field of Classification Search
CPC ......... G06V 20/56; G07C 5/008; G07C 5/085
See application file for complete search history.

(56) References Cited

U.S. PATENT DOCUMENTS 10,137,834 B2 * 11/2018 Pedersen ................. H04W 4/90
2017/0200061 A1 7/2017 Julian et al.
2018/0253814 A1 * 9/2018 Kaguma .............. G06Q 50/265
(Continued)

FOREIGN PATENT DOCUMENTS

EP 3618012 A1 3/2020
EP 3618012 * 4/2020 ........... G08G 1/0112

OTHER PUBLICATIONS

Applicant: Visual Defence Inc.; "A System and Method for Detecting and Transmitting Incidents of Interest of a Roadway to a Remote Server"; European Application No. 21185548; Extended European Search Report; Nov. 12, 2021; 11 pgs.

(Continued)

*Primary Examiner* — Myron Wyche
(74) *Attorney, Agent, or Firm* — Tarolli, Sundheim, Covell & Tummino LLP

(57) ABSTRACT

System and methods for including a system mounted to a vehicle for identifying incidents of a roadway and transmitting the incidents to a server, the server located remotely from the system, the system comprising: a device having: a camera for obtaining digital images; at least one sensor including a location based sensor; a memory and processor for executing image processing instructions for processing the digital images for automated detection of the incidents, generating object data based on the processing, generating incident data including the object data and the images; and a network interface for sending the incident data over a communications network to the server during operation of the vehicle on the roadway. Also included are both interactive and autonomous possesses for implementing the device.

21 Claims, 18 Drawing Sheets

(56) References Cited

U.S. PATENT DOCUMENTS

2018/0330526 A1    11/2018  Corcoran
2019/0034735 A1    1/2019   Cuban et al.
2020/0293791 A1*   9/2020   Womack ................ G06V 20/52

OTHER PUBLICATIONS

Subhasisdas, et al.; "Traffic Sign Detection Mobile App CS 231M-Project"; Jun. 30, 2014, pp. 1-2 XP055857826, Retrieved from the Internet: URL:https://web.stanford.edu/class/cs231m/spring-2014/proposals/sdmm.pdf [retrieved on Nov. 4, 2021].

Tuny Yu-Chih, et al.; "Use of Phone Sensors to Enhance Distracted Pedestrians' Safety"; IEEE Transactions on Mobile Computing., vol. 17, No. 6, Jun. 1, 2018, pp. 1469-1482, XP055857868, US ISSN: 1536-1233, DOI: 10.1109/TMC.2017.2764909, Retrieved from the Internet: URL:https://yctung.github.io/files/publication/tmc17-bumpalert.pdf.

* cited by examiner

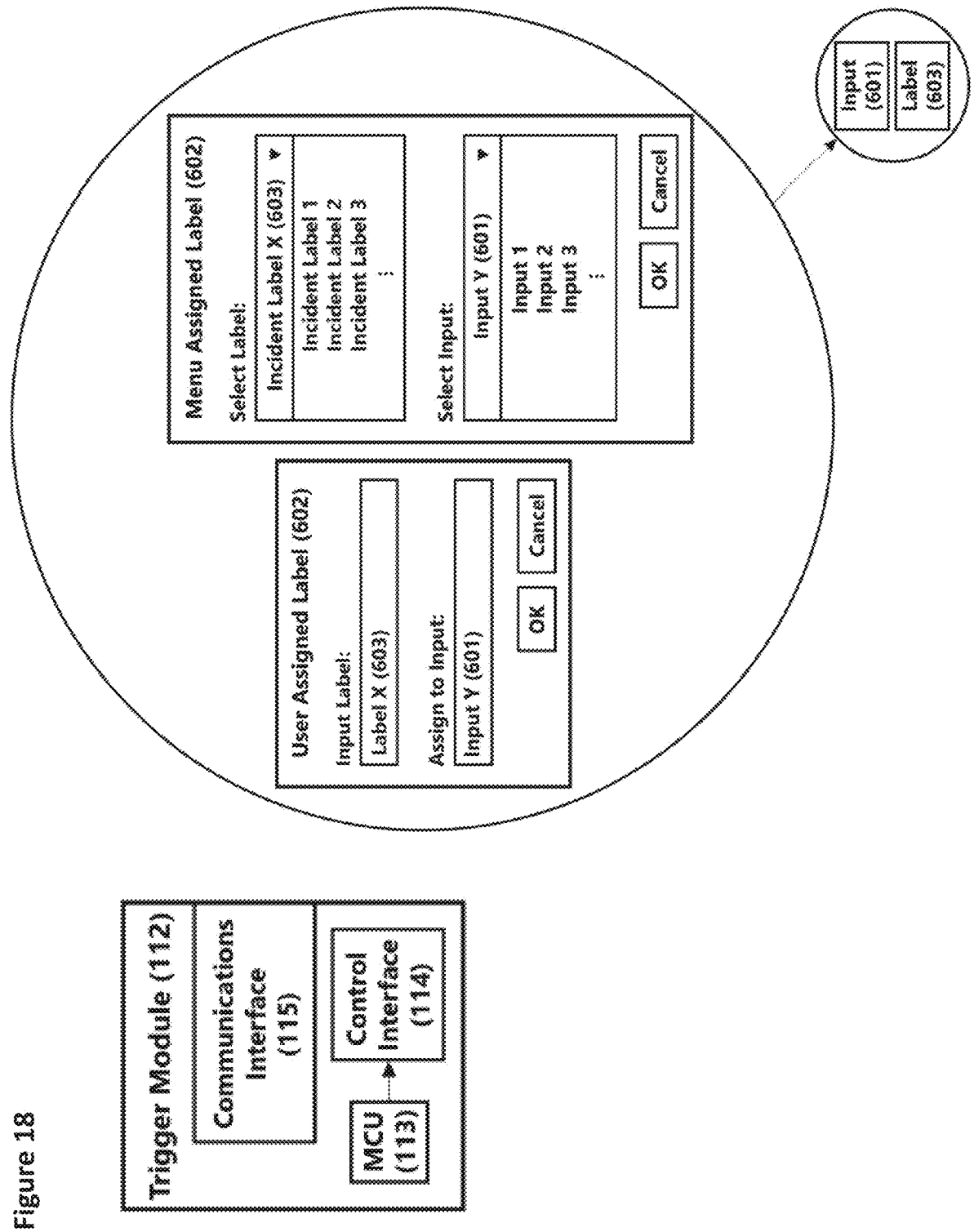

SYSTEM AND METHOD FOR INTERACTIVELY REPORTING OF ROADWAY INCIDENTS ON AN AI DEVICE

CROSS-REFERENCE TO RELATED APPLICATION

This application is a continuation-in-part application of U.S. patent application Ser. No. 16/930,070 filed on Jul. 15, 2020 entitled "SYSTEM AND METHOD FOR DETECTING AND TRANSMITTING INCIDENTS OF INTEREST OF A ROADWAY TO A REMOTE SERVER"; the entire contents of which are hereby incorporated by reference.

FIELD

The present invention is related to image acquisition for road related incidents.

BACKGROUND

Although many technologies exist for surveying the roads, oftentimes the costs and constraints make it less appealing for practical use. Many solutions require modifications to the vehicle, costly attachments, computers and training to use. Usually these technologies specialize in surveying a single component of road condition. To detect the full spectrum of incidents expected to keep roads maintained, the most common and effective practice is still largely manual. Surveyors drive vehicles down roads and stop their vehicle when they find an object of interest. They take a picture, and then note down the incident details to revisit. This is a slow and costly method, oftentimes leaving a backlog of roads that are overdue for reassessment. As municipalities grow, it becomes harder and harder to stay on top of all the incidents in the system.

Municipalities occasionally outsource road assessment to companies which utilize specialized vehicles employing a wide array of sensors, including cameras, thermal, vibration, radar and laser. While providing a greater level of detail, a specialized vehicle is required to complete the task. The vehicle sensors require extensive calibration, and the processing of the data requires specialized systems and knowledge to produce a report. The costs are extensive, and therefore, such assessments are typically done periodically, where the period duration typically ranges from one year to ten years.

While there have been occasional instances of applications aimed at identifying road based incidents in video or images, such processes are typically done by first acquiring a data set (in the form of video and geo-positioning data), and then uploading the data to a specialized server where it is processed. The process is cumbersome as often the dataset is too large to transmit over cellular networks. Thus, disadvantageously, current systems must rely upon access to the complete image dataset only once the vehicle has returned to the image processing facility.

Further, today, many fleet vehicles utilize dashcams. Dashcams are camera devices which are mounted on the windshield on a vehicle. Dashcams are typically used in order to capture video clips for situations where claims may take place. Dashcams can record video in vehicle or out of vehicle. Some example of use of dashcams in vehicles include identifying fault in collisions for insurance purposes and ensuring conformity and compliance to processes and procedures. Dashcams are typically used in any vehicle and are used in private vehicles, waste management vehicles, taxis and ridesharing vehicles, public service vehicles, snowplows, amongst others.

The data from the dashcams is stored locally on the device on a non-volatile memory, such as solid-state memory, disks, flash drives, hard drives, etc. The dashcam data is accessible through wired or wireless connection to a dash camera. It may be removed from a vehicle upon incident (such as the case when there is a collision), and connected to a PC using a USB cable. The video can also be wirelessly uploaded to a server at the end of a shift (as may be the case with vehicle fleets, such as snowplows and taxis).

However, it is recognised that uploading a large amount of data is not always the efficient way to access the data, as not all recorded data can be equally important. Dashcams can also be connected to a variety of a sensors which generate incidents in order to tag, or bookmark, chunks of the video which may be of interest. Examples may include duress buttons for taxi drivers, accelerometer events (i.e. rapid acceleration/deceleration, or collisions), amongst other types of sensors and incidents. Those events can then be automatically uploaded at the end of a trip using wifi, or be uploaded using a cellular connection.

Dashcams can also have driver facing cameras which monitor the driver's attention by using artificial intelligence (AI). They may note if the driver is holding something (food or beverage), note if the driver is falling asleep, holding a cellphone, or looking away from the windshield.

Artificially intelligent devices are nowadays making their way into vehicles for automated incident detection of objects of interest outside of a vehicle, and reporting incidents which require the attention of the responsible party to repair. Examples of deficiencies of interest including road cracking, deformations and/or distortions in road, road patches/seals, road damage, street signage issues, manhole issues, drainage issues, pavement marking issues, road obstruction issues, or sidewalk issues.

Such artificially intelligent devices can be called smart cameras. Smart cameras identify issues on a roadway at a rate and efficiency beyond those of human capabilities, and report them through video clips or images tagged with additional sensor data such as GPS coordinates. Smart cameras can note and map hundreds of potholes in the span of a short drive. However, smart cameras may also make mistakes and miss deficiencies which they have not seen before, or not properly trained to identify.

Training an AI model constitutes a large portion of the development time and determines what objects a model can detect, classify or segment. It is important to note that a model can only find objects that the model had been trained to find. Some incidents may not be that common, and as such it can be difficult to obtain a sufficient data sample in order to reliably train a model. Due to the vast amount of data required, and the time and effort to annotate datasets to train comprehensive models, having a camera being able to automatically identify every possible deficiency is an unrealistic proposition. Further, in some circumstances, the operator of an AI enabled device may have a lack of confidence in the inferred results of the device, in particular for those devices providing a continuous stream of real-time inferences and associated information.

SUMMARY

It is an object of the present invention to provide an image acquisition system and/or method to obviate or mitigate at least one of the above presented disadvantages.

Provided is a system and method that supplements or otherwise adjusts the use of a device with artificial intelligence capabilities, interactively, together with incidents logged by a human operator of the device, for providing a system that simultaneously can identify deficiencies and issues of interest on a roadway using artificial intelligence and human input/interaction. The system and method are deployed to a vehicle, where the system automates collection of road related objects and/or incidents. A user of such a system can encounter scenarios where they would want to capture data (image, GPS/GNSS position etc.) of an object or incident, but the artificial neural networks of the system may have not been trained for the particular object or incident that the operators are interested in, or do not provide this functionality at an acceptable level of accuracy. It also may be an advantage for the operator to manually adjust/interact with a previously captured image, or otherwise manually record and adjust a newly captured image, in order to facilitate a more complete assessment of the roadway and surrounding conditions.

In order to interactively tag relevant data of such potentially untrained incidents using the AI device, further functionality is provided by artificially intelligent systems to supplement operator intervention (e.g. adjustment/interaction) by tagging of event(s) preferably without interfering with the core AI functions as programmed. In this manner, it is advantageous to have a plurality of different processes performed by the AI device, e.g. manually interactive as well as autonomous, such that the different processes can be done in parallel and/or in series. It is also recognised that the operator can choose to skip or otherwise bypass for one or more selected images the autonomous AI image processing, or any parts thereof.

Current technologies for surveying roads can be extremely costly, requiring complex installation of specialized sensors on a vehicle. These technologies require extensive training and experience to operate and are typically limited only to analysis of pavement condition. Due to the high cost and limited capabilities of the available technologies, municipalities are currently relying on simple manual inspection to cover the detection of all road related incidents. Further, existing on board imaging systems used for navigation of a vehicle are not optimized for acquiring appropriate images containing objects of interest with respect to a road surface. As such, using a specialized device containing a camera that is mounted to the vehicle is desired.

Municipalities send their maintenance workers to drive the service vehicles on roads where they must visually locate road related concerns while on patrol or a service call. When workers spot a potential concern they are required to pull over and get off the vehicle to closely investigate the issue and manually initiate an incident or a work order using whatever system they have in place. It may be logged by pen and paper or utilizing a computerized tablet or smart phone.

Getting off the vehicle for each detected issue is not only time consuming but also put workers in a dangerous situation. Contrary to the current technologies available and the method that is implemented to detect road related incidents, the system provided here is capable of automated identification and reporting of a wide variety of road related incidents (e.g. various types of pavement damage and degradation, road sign damage, road debris, obstructions and other incidents visible from inside of a vehicle), including operator implemented adjustment while the proposed system is in operation. It is also disadvantageous to require the operator to manually record and comment on every picture taken. Also, it is disadvantageous for the operator to have no ability to interact with capturing/processing of images in AI enabled autonomous processing of images during navigation of roadways and surroundings.

The system can comprise: device—a mobile computing device such as smartphone, or embedded computer system with built in or peripheral camera(s) and application utilizing neural network(s) and machine learning work together with server(s) that process and store data received from single or multiple devices, serve as gateway to users via web access and present data to users in a meaningful and intuitive manner.

The user can have a single device mounted on a vehicle or deploy multiple devices deployed on their fleet to have access to an up-to-date insight of their roads. The data created from the incident detection can be used to automate the opening of service requests and/or work orders which helps streamline the process of resolving incidents.

A first aspect provided is a system mounted to a vehicle for identifying incidents of a roadway and transmitting the incidents to a server, the server located remotely from the system, the system comprising: a device having: a camera for obtaining digital images; at least one sensor including a location based sensor; a memory and processor for executing image processing instructions for processing the digital images for automated detection of the incidents, generating object data based on the processing, generating incident data including the object data and the images; and a network interface for sending the incident data over a communications network to the server during operation of the vehicle on the roadway.

A further aspect provided is a method for identifying incidents of a roadway and transmitting the incidents to a server, the server located remotely from the system, utilizing a memory and processor for executing instructions to: instruct a device mounted on a vehicle, the device having a camera for obtaining digital images and sensor data using at least one sensor including a location based sensor; execute image processing instructions for processing the digital images for automated detection of the incidents, generating object data based on the processing, generating incident data including the object data and the images; and send the incident data over a communications network to the server during operation of the vehicle on the roadway.

BRIEF DESCRIPTION OF THE DRAWINGS

Exemplary embodiments of the invention will now be described in conjunction with the following drawings, by way of example only, in which:

FIG. 18 is a further embodiment of a process of mapping of functional commands that can be sent by a trigger module according to embodiments of the system as shown in FIGS. 1-17.

DESCRIPTION

Figure 1:
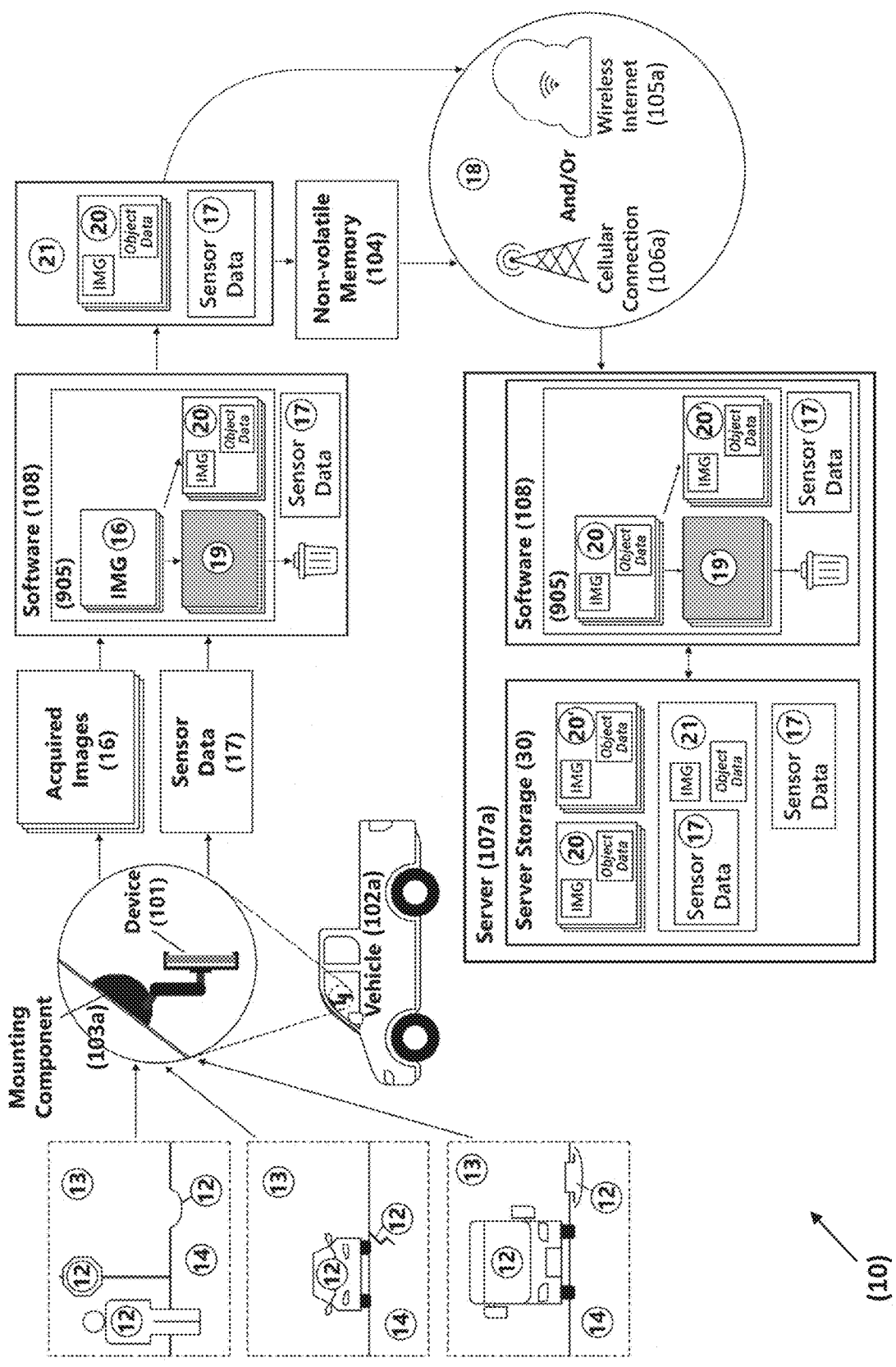
FIG. 1 shows components of a system for automatically detecting objects and incidents, and storing and transferring them to a server.
Figure 13:
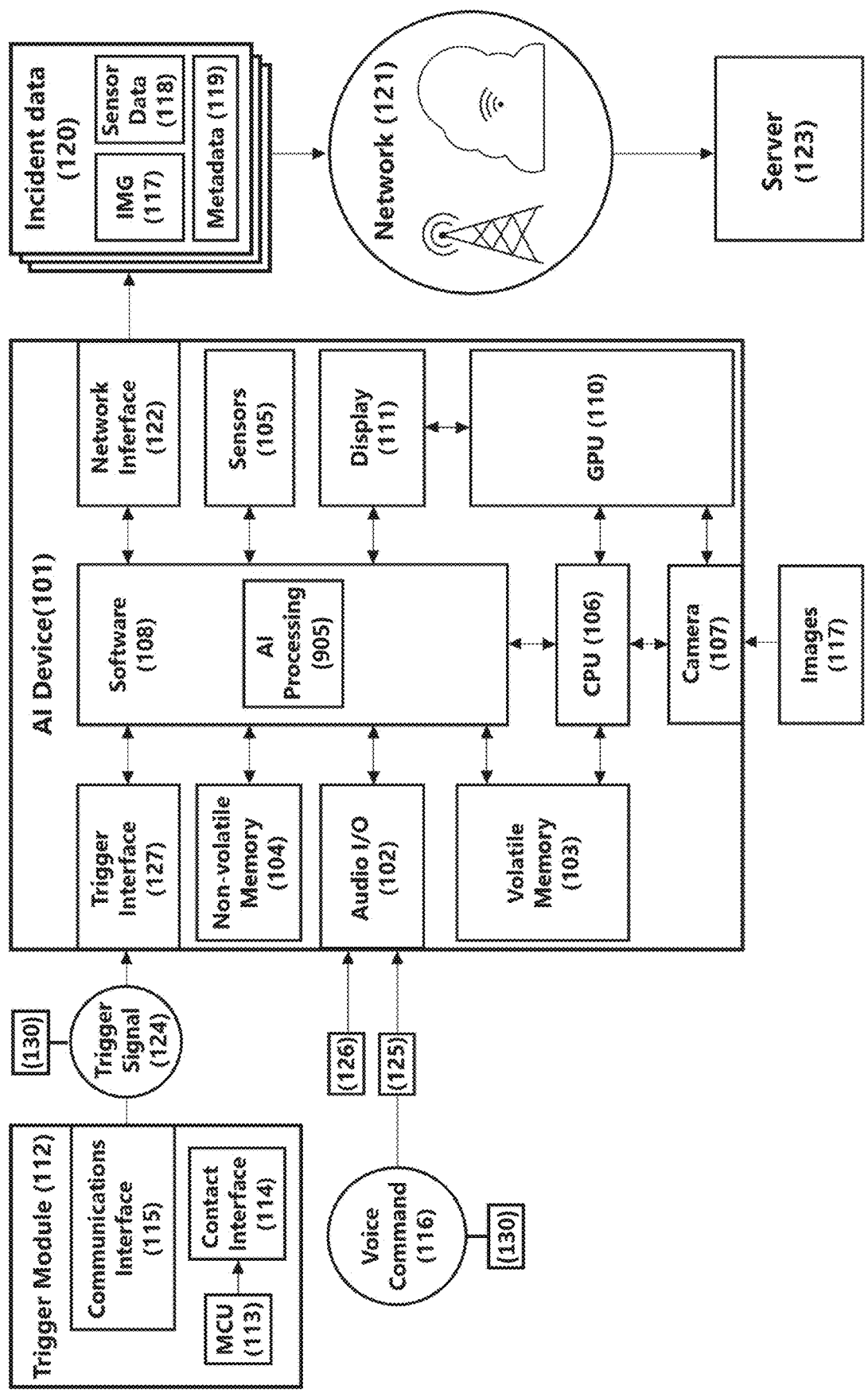
FIG. 13 shows a further embodiment to the system of FIG. 1 for acquiring incident data and storing and transferring to a server.

Referring to FIGS. 1 and 13, shown are systems 10, 10' designed to automate identification and reporting of road related incidents/conditions/objects 12 (e.g. pavement damage, street sign damage, debris on road, etc.) with respect to a road surface 14 and/or adjacent road surface 14 surroundings 13 in real time. The road related incidents/conditions/objects 12 are hereafter referred to generically as objects or incidents 12, for ease of description purposes only. Digital images 16, 117 (referred to interchangeably as images 16 or images 117) are taken by one or more imaging devices 101, e.g. a smartphone or other portable imaging device preferably with network connection capabilities to a communications network 18, 121 (e.g. wireless network 105a, cellular network 106a, etc.), referred to interchangeably as network 18 or network 121. Only selected data portions 20 (e.g. image frames 16a,b,c,d—see FIG. 2) of the images 16 can be transmitted over the network 18 by the device 101 to a remote server 107, 123 (referred to interchangeably as server 107a or remote server 123) for subsequent processing/reporting, as further described below, such that image discard data 19 is excluded (see FIG. 4) from object data 21 (also referred to interchangeably as incident data 120—see FIG. 13) transmitted to the server 107a.

Unprocessed image(s) 16 can be transmitted by the device 101 over the network 18 to the server 107a for subsequent processing as they are acquired in real time (subject to network 18 connectivity constraints) or after being temporarily stored on the device 101. It is also recognized that both resultant processed image data 20 and unprocessed images 16 can be transmitted to the server 107a by the device 101 over the network 18 as well together with data 21 that may include the sensor information 17. In any event, it is recognized that it is advantageous for the systems 10, 10' to be configured to preferably send acquired data 21 by the device 101 to the server 107a, in order to take advantage of additional image 16 processing and capabilities on the server 107a. Further described below (for example with reference to FIG. 13) is the advantageous adjustment (e.g. augmentation) of operation of the device 101 in view of operator input (e.g. trigger signal 124 and/or voice commands/signals 116) using a manual (or otherwise referred to as interactive) acquisition process 803a (see FIG. 15). For example, the interactive acquisition process 803a can be operated by the operator in parallel with the autonomous incident detection process 307.

Referring again to FIGS. 1 and 13, it is recognized that one advantage of the current system 10, 10' is that storing and/or sending of the object data 21 can occur in real time while the device 101 continues collection and processing of additional digital images 16 for a second section of the roadway 14 different than the first section of the roadway 14 associated with the sent object data 21. As such, the system 10, 10' is configured to continuously store/send respective sets of object data 21 for respective differing sections of the roadway 14 on a real time basis and/or scheduled basis, dependent upon appropriate network 18 connectivity between the device 101 and the server 107a. Accordingly, sending of the data of interest 21 over the network 18 can include queuing a set of the intended data 21 in memory 99, 104a before transmission to the server 107a. As discussed, the image data 20 and associated content data 21 and sensor data 17 can be affected (e.g. adjusted or otherwise augmented interactively) by the signal(s) 116, 124. It is recognised that the content data 21 can also be referred to as incident data 120 (e.g. containing images 16, 117, sensor data 17, 118 and metadata 20, 119).

The device 101 is mounted by a mounting component 103a to a body of a vehicle 102a (e.g. car, truck, bus, etc.), such that an imager 500 (e.g. camera 107, 500—see FIGS. 5, 13) has a viewpoint of the road surface 14 and optionally any desired adjacent surroundings 13 (e.g. roadside, curb, horizon, overhead, etc.). Accordingly, during operation of one or more vehicles 102a along the road surface 14, the imager(s) 500 (also referred to interchangeably as camera(s) 107) of the device 101 record/capture the images 16 according to the configured viewpoint (as facilitated by orienting the device 101 with respect to the road surface 14 and/or adjacent surroundings 13 as per the capabilities of the mounting component 103a). It is recognized that the captured images 16 will contain recorded data of the objects 12, which will be identified by image processing instructions 905 (stored in memory 99 provided by computing infrastructure 100 of the device 101—see FIG. 7), also referred to generically as neural network(s) 905.

Figure 7:
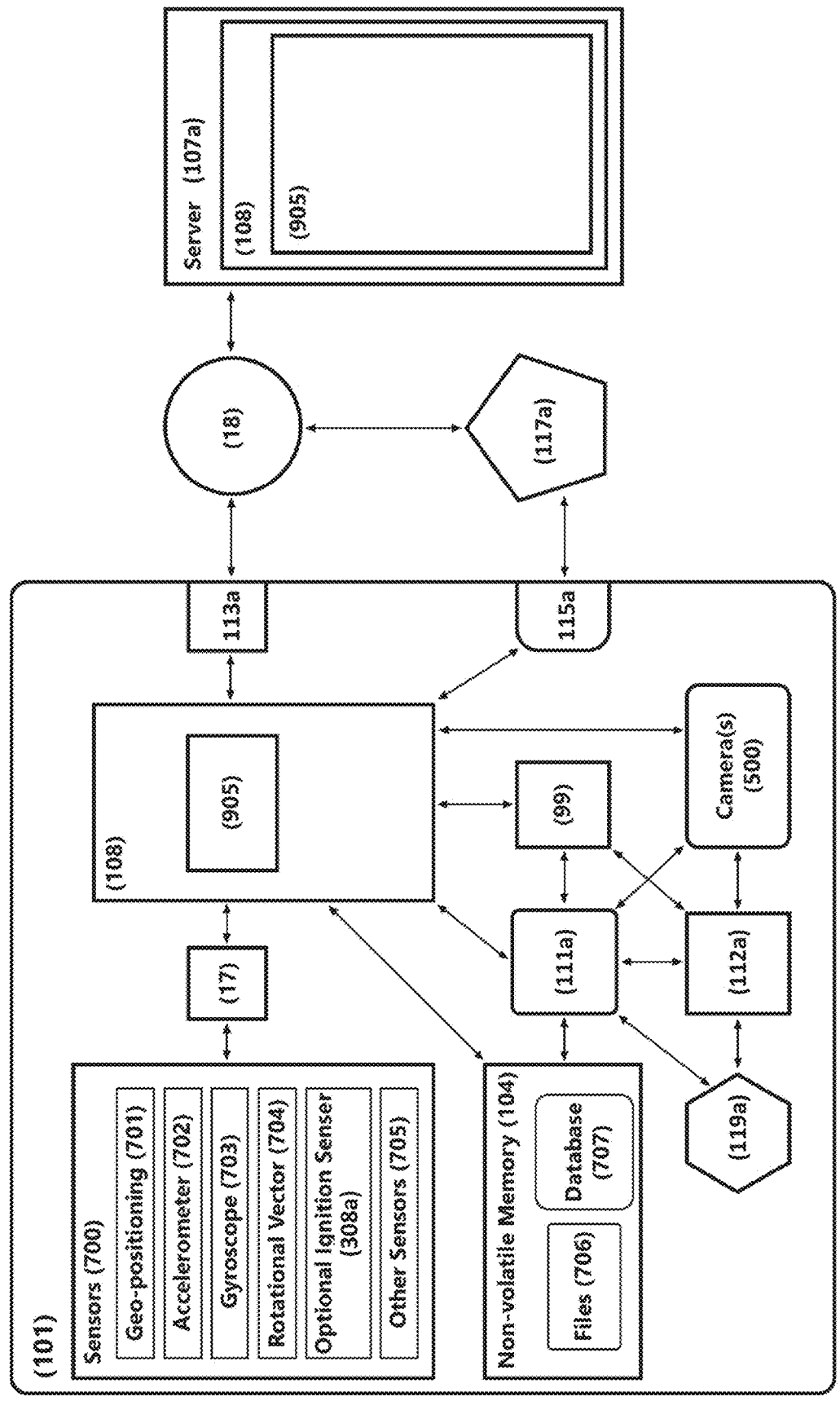
FIG. 7 shows example sensors used by the device to detect and store additional information along with each of the incident images captured of the system of FIG. 1.

Referring to FIGS. 1 and 7, the system 10, as an example, can utilize device 101 (e.g. a mobile computing device such as smartphone, smart camera or embedded computer system) physically coupled to the vehicle 102a (an automobile to which the device 101 is attached) by the mounting component 103a (i.e. attaching the device 101 to the vehicle 102a). In general, the device 101 executes software 108 (i.e. stored instructions) which collects image data 16 (the digital images 16) from the device's 101 camera(s) 107, 500 (the imagers 107, 500) and infers (i.e. determines, identifies) any objects 12 present in the images 16 using the neural network(s) 905 (e.g. image processing instructions 905) by way of a computer processor 111a (also referred to as CPU 106—see FIG. 13) and/or a graphics processor 112a (also referred to as GPU 110—see FIG. 13). The device 101 transmits the data 20 (containing information about the objects 12 identified from the images 16) along with acquired sensor 700 information 17, 118 to the server 107a (via the network 18 utilizing the cellular connection 106a or wireless connection 105a, for example). The device 101 can store data (e.g. images 16, processed data 20, sensor information 17) in non-volatile memory 104a (of the computing infrastructure 100) prior to transmitting any of the data 20/sensor information 17 over the network 18. The processed data portions 20 (containing the identified object(s) 12 of interest) and/or sensor information 17 can be referred to generically as object data 21 (e.g. see FIG. 1). As discussed herein, the embodiment of image 16 processing by the device 101 is considered only one example. As such, it is recognized that processing of images 16 can be performed by the device 101 alone, by the server 107a alone, or by both the server 107a and the device 101 as provided for in FIG. 4 for the shared/distributed processing environment 400a.

The server 107a can facilitate as gateway to users (of the device 101) to make data available to other users (e.g. road supervisors, construction managers, asset managers etc.) in a meaningful and intuitive manner by way of accessing any of the data 20/sensor information 17 received by the server 107a. It is recognized that as one embodiment, the resultant processed data 20 containing information of the identified objects 12 (from the images 16) can be portions of the images 16 themselves. Alternatively, or in addition to, the resultant processed data 20 can also include metadata (e.g. descriptions/descriptors) of the objects 12 identified from the images 16 by the image processing instructions 905. For example, the descriptions/descriptors of the objects 12 can include object type (e.g. road sign, pothole, road debris, etc.), object size (e.g. 100 $cm^2$ wide by 20 cm deep), etc. In any event, it is recognized that the resultant processed data 20 represents only a portion of the total images 16 data recorded by the imager 500, such that images 16 (and/or the descriptions/descriptors representing the images and their image contents) not containing objects 12 (of interest) are excluded (e.g. the image discard data 19) from the resultant processed data 20 sent over the server 107a over the network 18, as one example embodiment.

Device 101

It is recognized that the device 101 is an integral part of the system 10. Referring to FIGS. 1 and 7, the device 101 can be consist of a plurality of hardware and software components that are configured to automatically collect visual, location and sensor data (e.g. images 16 and sensor information 17) while affixed to the vehicle 102a travelling along the road surface 14. Components that typically make up the device 101 are embedded in the computing system/infrastructure 100, typically inclusive of the central processing unit (CPU) 111a and/or the graphics processing unit (GPU) 112a and memory 99, 104 including a high speed volatile memory such as a ram as well as non-volatile memory, any of which facilitates the device 101 to execute its software 108 (e.g. operating system, image processing instructions 905, etc.). The device 101 may also have a read only memory 99 for storing instructions necessary for operation of the device 101. Further, the non-volatile memory 104a can be associated with storing files 706 associated with operating system(s), component driver(s), application(s), and media, alongside other software applications resident in memory 99 of the device 101. The device operating system (e.g. part of the software 108) can be such as a windows operating system, android operating system, linux operating system, or other operating system, whether embedded or not.

The device 101 can also have one or more data transmitting and receiving components (communication components operating a network interface 113a to the network 18—also referred to as network interface 122—see FIG. 13) which can be wireless. Further, the device 101 can interface with external wireless communication components 117a via wired connector 115a, such as a USB connection or an ethernet connection, in order to transmit the data 20 and sensor information 17 over the network 18 to the server 107a, as an example. The physical wired connection 115a may also be to a device which itself is wireless and transmits wirelessly to a network 18.

In terms of sensors 700, the device 101 can have, by way of example, a geo-location sensor 701 or a geo-positioning sensor 701, provide location based information using satellite (such as GPS, GNSS, glonass, galileo) or cellular tower locations to determine device positioning information (as part of the sensor information 17). The device 101 may also utilize sensors 700 related to its positioning, location and orientation such as accelerometer sensor 702, gravity sensor/gyroscope sensor 703, rotational axis sensor 704 and/or other sensors 705. The device 101 may, in some configurations, utilize a battery 307a (see FIG. 3) which can facilitate operation of the device 101 even when connection to vehicle power 302a is temporarily interrupted. For example, in the event that the vehicle 102a is temporarily shut-off, such as when filling gas, the device 101 can continue to operate on its battery 307a charge, in order to effect the image processing of the acquired images 16 and subsequent sending of the resultant processed data 20 and sensor information 17 over the network 18 (see FIG. 4), as an example.

Further, the device 101 can have a user interface 119a including a display 111 (see FIG. 13), built-in or external, in order to display information from the device 101, to an operator of the device 101, the display information such as but not limited to the camera 500 field of view (viewfinder), the orientation of the device 101, status indicators, settings, parameters, and other information related the installation, configuration operation, and maintenance of the device 101.

As further described below, the device 101 can execute the software 108 (including the artificial intelligence neural network(s) 905) for detection, classification and/or feature extraction of objects 12 of interest in the acquired images 16 in order to infer (e.g. determine) what object(s) 12 are present in images 16, the position of the object 12 in the images 16, and other relevant information. The software 108 can also collect, process, store and transmit sensor information 17 from its sensors 700 for the geo physical location (e.g. GC a,b,c,d—see FIG. 2) in which the image 16 was acquired with respect to the road surface 14 (i.e. geographical coordinates of the portion of the road surface 14 that contains the objects(s) 12).

Further to the above, it is recognized that the device 101 components can be packaged together in a common housing (not shown) or some components can reside externally to the device 101 and connected via currently common interface connector 115a such as a USB port. Examples of electronic devices that can be configured to function as the device 101 can include smart phones, smart cameras and embedded computer systems. For example, a smartphone 101 can be defined as a mobile device that contains components within to run the software 108. This device 101 can be ideal for a portable installation facilitating for easy transfer between different vehicles 102a. Example of currently available capable smartphones are Samsung galaxy s10, s10+, s20 models, Samsung note s10, s10+ models, LG g8, iPhone 11 pro, iPhone 11. It is expected that many of the newer smartphone models by the majority of the smart phone manufacturers can also perform as a device 101 when enabled with the software 108 (i.e. including the neural network(s) 905 as further described below).

For example, a smart-camera 101 can be defined as a camera with image processing capabilities (e.g. software 108) that is capable to execute the instructions of the artificial intelligence neural network(s) 905. For instance, a camera 101 containing artificial intelligence enabled chipsets/GPUs 112*a* such as Intel Movidius, Nvidia Cuda, Texas Instrument Sitara, Qualcomm Adreno series, etc. Alternatively, the camera 101 can be packaged together with an embedded CPU 111*a* (such as the likes made by companies such as Intel, Amd or Arm) which facilitates execution of the artificial intelligence neural network 905. The camera sensors 700 and transmission components (e.g. network interface 113*a*) can be embedded or externally connected, as desired.

For example, the embedded computer system 101 can be defined as a computing device 101 that is designed to operate (via the software 108) with some resistance to shock, vibration and temperature fluctuations. Sensors 700 are embedded and/or provided as peripheral (i.e. external) devices. The embedded computer system 101 can be considered for permanent installation in the vehicle 102*a* or for installations with multiple cameras 500. Current examples of embedded computer systems 101 include Nvidia Jetson AI platform, Google coral edge series, raspberry pi series, rugged industrialized embedded computers specifically environmentally hardened for use vehicles 102*a*, or other computing devices 101.

Example Embodiments for Imagers 500, Also Referred to as Cameras 107, 500

Figure 5:
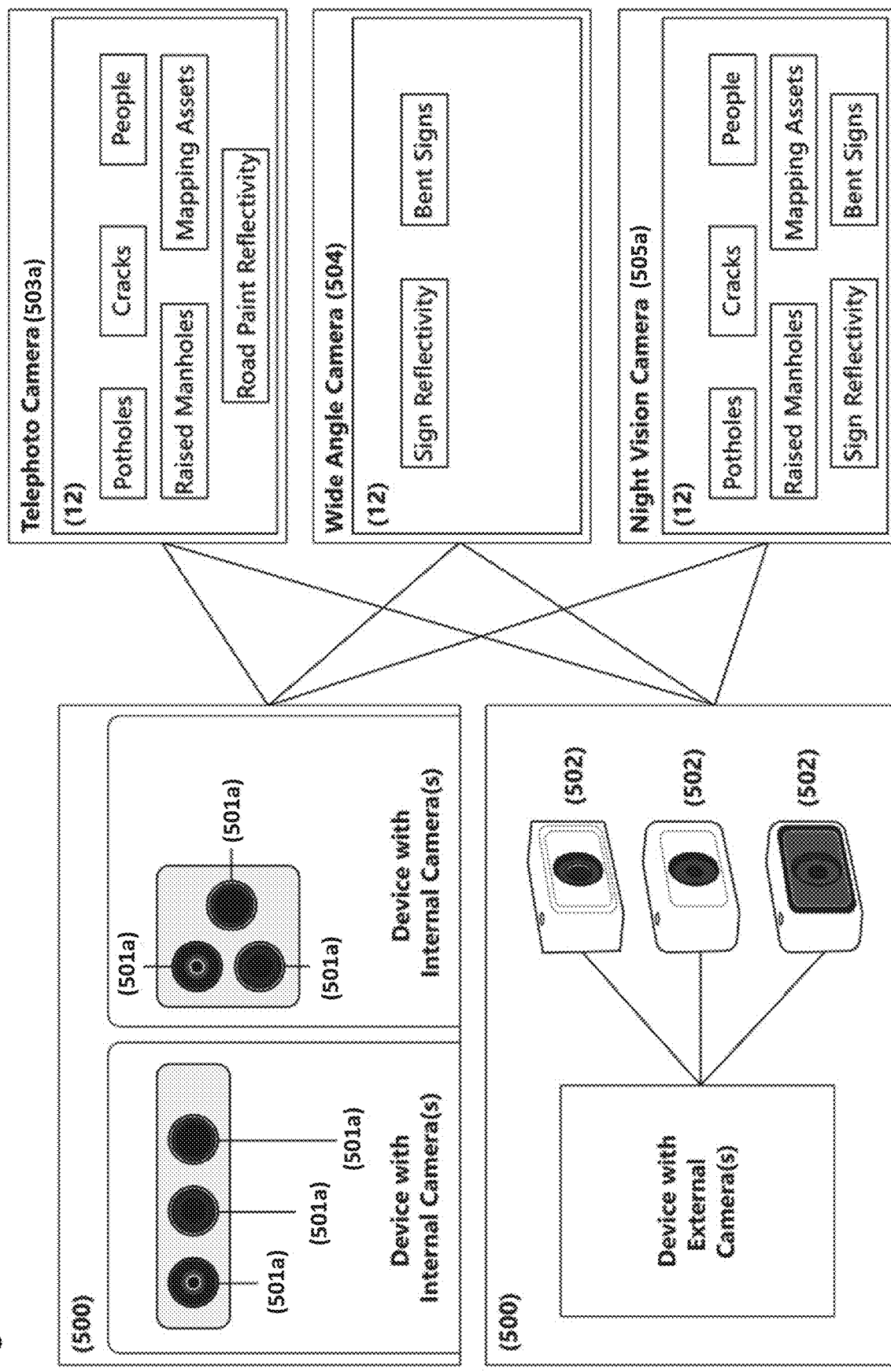
FIG. 5 shows device camera options and examples of objects that different lenses are used to capture of the system of FIG. 1.

Referring to FIG. 5, the device 101 can be equipped with internal camera(s) 501*a* or external camera(s) 502 which can be of different types such as telephoto 503*a*, wide angle 504*a*, or night vision 505*a*, or other types of cameras 500 (e.g. imagers 500), used to record a digital image 16 as acquired by the device 101 as the vehicle 102*a* traverses along the road surface 14. It is recognized that some of the images 16 acquired will contain object(s) 12 of interest, while others of the acquired images 16 will not contain any desired object(s) 12 of interest. As further discussed below, the acquired images 16 can be embodied as a series/plurality of image frames 16*a*, 16*b*, 16*c*, 16*d*, for example (see FIG. 2). The image frames 16*a*, 16*b*, 16*c*, 16*d* comprise the plurality of images 16 acquired by the device 101 as the vehicle 102*a* travels along the road surface 14 (see FIG. 1).

As the device 101 primary sensor is a camera 500, the device 101 can include at least one camera 500. Depending on the configuration of the device 101, the device 101 can encase one or more cameras 501*a* (for example, if the device 101 is a modern smartphone). The device 101 can also be encased in a camera 501*a* (for example, if the device 101 is a smart camera, or an AI enabled camera). The camera(s) 500 can also be attached to the device 101 externally 502. For example, the device 101 can be an embedded computer connected to an external camera via a wired or wireless interface. The device 101 can utilize internal camera(s) 501*a* and external camera(s) 502 at the same time. For example, a smart phone 101 can utilize its built in camera 500 to process images 16 acquired facing the front of the vehicle 102, whereas wired or wireless cameras 500 could be mounted on the sides and/or back of the vehicle 102*a* transmitting images 16 to the smartphone 101.

The device 101 can have different type(s) of camera(s) 500. Some examples of different types of cameras 500 include telephoto 503*a*, whereas the camera 500 is optimized to capture images in the distance; wide angle 504*a* camera(s), whereas the camera 500 is optimized to detect an image 16 with a wide field of view; and/or a night vision 505*a* camera, whereas the camera 500 is optimized to acquire images at low light settings.

Different camera(s) 500 can be used for different use cases. For example, a wide angle camera 504*a* may be used to detect issues with signage 12 (for example, a damaged sign), whereas a telephoto 503*a* camera can be used to detect road defects 12 (for example, cracks or potholes); and an infrared camera 505*a* can be used for night time image 16 acquisition. The types of incidents 12 noted in FIG. 5 are for illustration and do not mean that the incidents 12 depicted are exclusive to the camera 500 type as given by example.

Further, a device 101 can utilize multiple cameras 500, internal and/or external simultaneously. For example, the device 101 can be attached to a vehicle's 102*a* windshield and have both a telephoto 503*a* and a wide angle 504*a* camera internally 501. The telephoto 503*a* camera may be used to detect road defects 12 (for example, cracks and potholes) and road issues 12 (for example, faded lane markings or open manholes), while at the same time, the wide angle 504 camera can be used to detect damaged signs 12. The same device 101 can also be connected to two external 502 cameras 500 mounted on the vehicle's 102*a* side windows, facing the roads and curb as part of the desired road surface 14 and surroundings 13 in the camera's field of view. The external cameras 500 can look for road damage 12 and curb damage 12.

In some use cases, different cameras 500 can be used under different circumstances. For example, at night when lighting conditions are poor, the device 101 can switch from one camera 500 to another optimized for night vision 505*a*. This may be done programmatically with the use of the software 108, based on schedule (for example, based on a sunset timer), image parameters (such as exposure or brightness), or a sensor 700 (for example, when a light sensor determines it is less than certain luminance level). It can also be done manually by a driver selecting a different camera 500 or selecting a "night mode" which includes the night camera 505*a*. Similarly, in some use cases, the same cameras 500 can be used with different camera settings. Examples of settings that may be adjusted for night time operation include frame rate, resolution, aperture, ISO, brightness, and/or shutter speed. As an example, at night when lighting conditions are poor, the device 101 can switch from daytime camera settings to nighttime camera settings. This may be done programmatically with the use of software 108, based on schedule (for example, based on a sunset timer), image parameters (such as exposure or brightness), or a sensor (for example, when a light sensor determines it is less than certain luminance level). It may also be done manually by a driver selecting a different camera or selecting a "night mode" which includes the camera night time settings.

Some digital cameras 500 can give access to almost all the image 16 data captured by the camera 500, using a raw image format. An example type of the cameras/imagers 500 can include digital image sensors using metal-oxide-semiconductor (MOS) technology. Another type is digital semiconductor image sensors, including the charge-coupled device (CCD) and the CMOS sensor. Another type can be the NMOS active-pixel sensor (APS). As technologies improve, more sensor types may be available to work with the cameras 500.

Images 16, 117

The vehicle 102a uses imagers/cameras 500 to record the series of digital images 16 (as acquired by the device 101) while the vehicle 102a traverses along the road surface 14. It is recognized that some of the images 16 acquired will contain object(s) 12 of interest, while others of the acquired images 16 will not contain any desired object(s) 12 of interest, as determined by the image processing instructions 905. As further discussed below, the acquired images 16 can be embodied as a series/plurality of image frames 16a, 16b, 16c, 16d, for example (see FIG. 2). The image frames 16a, 16b, 16c, 16d comprise the plurality of images 16 acquired by the device 101 as the vehicle 102a travels along the road surface 14 (see FIG. 1). The images 16 can be embodied as captured individual still image frames 16a, 16b, 16c, 16d and/or embodied as captured video containing the individual frames 16a, 16b, 16c, 16d, as desired. As shown by example, image frames 16b and 16d contain objects 12, while image frames 16a and 16c do not contain any objects 12. Further, it is recognized that the plurality of image frames 16a, 16b, 16c, 16d are captured sequentially with respect to one another, i.e. distributed sequentially over recorded time and distance along the road surface 14, as further discussed below. As discussed, the images 16 may actually contain potential objects 12 of interest, (e.g. a pothole), however these potential objects 12 of interest could be processed as discarded image data 19 and thus not included in the resultant processed image data 20 (e.g. as provided by the device 101 and/or the server 107a). It is recognised that these images 16 can be captured according to the various triggers, such as autonomous incident detection 307, recognized voice command 305, and/or trigger signal 124 resulting in the interactive operation 803a (see FIGS. 15,16) capturing incident data 120.

One example of discarding a potential object 12 is where a geo coordinate GC a,b,c,d matches an already transmitted object 12 of interest in a previous transmission object data 21 to the server 107a. In this manner, duplication of objects 12 in the data 20 can be advantageously inhibited. Another example where a potential object 12 is retained in the resultant processed object data 20 is where the geo coordinate GC a,b,c,d does match the GC a,b,c,d of the object 12 in a previous transmission of object data 21, however a state of the potential object 12 has changed (e.g. a state such as a size of the object—a pothole size of the potential object 12 has increased over the size of the same object 12 reported in previously transmitted object data 21 for the same pothole 12 at that identified GC a,b,c,d).

Figure 2:
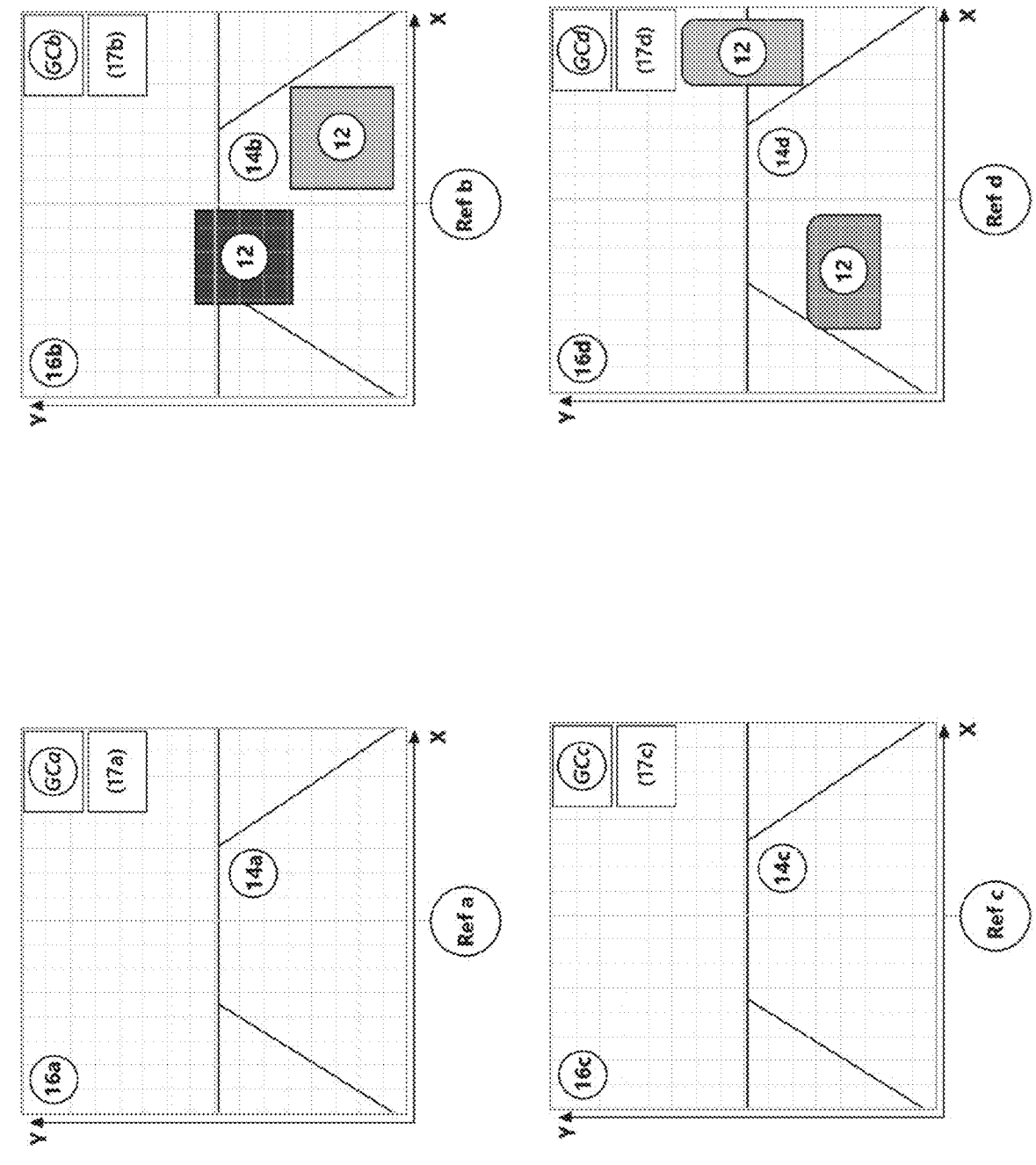
FIG. 2 shows an example series of images of the system of FIG. 1.

For example, as shown in FIG. 2, the selected image frames 16a, 16b, 16c, 16d of the plurality of images 16 provide for some imaged portions 14a,b,c,d of the road surface 14 or surroundings 13 containing objects 12 while others do not. As an illustrative example, the respective geo coordinates GCa,b,c,d (e.g. sensor information 17a,b,c,d) for each image frame 16a,b,c,d of the images 16 can be used to represent contiguous sections (overlapping or non overlapping in geographical coordinates) of the road surface 14 or surroundings 13 portions 14a,b,c,d. As such, it is clear from the example image frames 16a,b,c,d provided that image road surface/surrounding 14a (in image frame 16a) and road surface/surrounding 14c (in image frame 16c) do not contain any objects 12. On the contrary, image portion 14b (in image frame 16b) and image portion 14d (in image frame 16d) do contain objects 12. Further, for example, geo coordinates GCa,b,c,d can represent physical geographical coordinates (e.g. provided by sensors 700 of the device 101 associated with at what geographical position the vehicle 102a was at on the road surface 14 when the particular image frame 16a,b,c,d was recorded). As such, as further discussed below, the image processing instructions 905 are used by the device 101 to determine that image frames 16b,d contain object(s) 12 and image frames 14a,c do not contain object(s) 12. Further, it is recognized that each image frame 16a,b,c,d can have a positional reference frame REFa,b,c,d, such that the physical location of the object 12 within the image frame 16b,d can be specified. Also as discussed below, it is a distinct advantage of the current system 10 to have an ability to identify those images 16 (e.g. image frames 16a,c) that do not contain any objects 12 of interest and thus can be discarded and thus not be included as part of the object data 21 (e.g. transmitted to the server 107a— see FIG. 1). As further discussed below, it is recognized that just because a particular image frame 16a,b,c,d contains an object 12, as identified by the image processing instructions 905, the identified object 12 may still subsequently be discarded by the image processing instructions 905 for a number of reasons (see below).

As such, any discarded image data (e.g. discarded data 19—see FIG. 4)) from the images 16 constitutes bandwidth transmission savings for communication of the object data 21 between the device 101 and the server 107a. Further, any discarded image data 19 (e.g. entire frames 16a,b,c,d and/or selected portions of an image frame 16a,b,c,d) from the transmitted object data 21 can also result in downstream data processing/storage savings by the server 107a. It is clear, as discussed below, that the system 10 can take advantage of a split image processing framework 400a, see FIG. 4 further discussed below, such that a first portion 402a of the image 16 processing can be performed on the device 101 itself (i.e. prior to transmission of the object data 21 to the server 107a), while a second portion 404a of the image 16 processing can be performed on the server 107a post receipt of the acquisition data 21. For example, the image processing instructions 905 can be used as a first image processing portion 402a to identify objects 16 of interest and thus discard/exclude data 19 representing entire frames 16a,b,c,d (or portions of frames 16a,b,c,d) before transmitting the acquisition data 21 (image, image metadata/objects, and sensors data 17). The server 107a can then be tasked with identifying the relevance of the objects 12 of interest in the transmitted data 21, including for example the physical position (e.g. REFa,b,c,d) of the objects 12 in the frames 16a,b,c,d included in the object data 21 as part of the second image processing portion 404a. It may also discard or re-acquire/refresh incident images 16 based on a timer that expires (for example, a certain number of days has elapsed) or based on distance from previously noted incident (as the GPS may not be 100% precise), and as such, data 19 can be discarded based on previously recorded incident.

Figure 6:
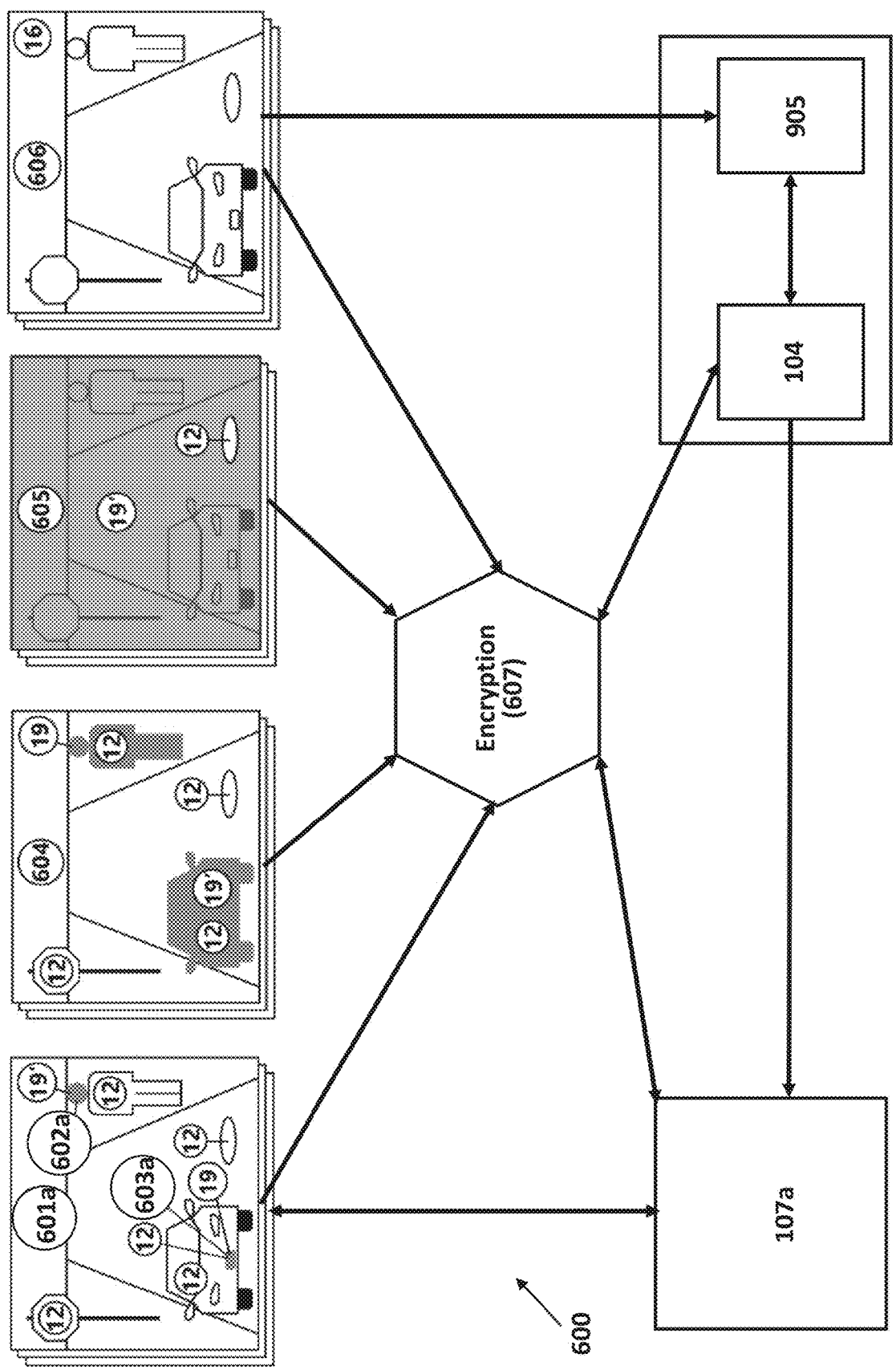
FIG. 6 shows an example of image capture, redaction and other processing before being encrypted and stored in device or transmitted to the server of the system of FIG. 1.

Accordingly, the image discard data 19 is considered as those portion(s) of image 16 data that does/do not contain determined object(s) 12 of interest by the image processing instructions 905, e.g. as implemented by the processor(s) 111a, 112a of the device 101. Examples of the image discard data 19 are shown in FIG. 6. For example, image information 601a, 604, 605 shows example image data content 20 as included (e.g. image data of the images 16 representing the identified object(s) 12 of interest) as well as image discard content 19 as discarded. As discussed, the discarded image content 19 can be withheld from inclusion in the object data 21 transmitted to the server 107a (see FIGS. 1 and 4).

In terms of format, a digital image 16 can be an image 16 containing digital data content (e.g. both data 19 and data 20 as present prior to processing) representing picture elements, also known as pixels, each with finite, discrete quantities of numeric representation for its color intensity or gray level that is an output from its two-dimensional functions fed as input by its spatial coordinates denoted with x, y on the x-axis and y-axis, respectively (e.g. positional reference frame REFa,b,c,d). The image would be acquired either as raw image data available in various formats such as YUV RGB, HSL, HSV, or other image color spaces and encodings as available from the camera 500 device. The data (e.g. both data 19 and data 20 as present after to processing) may be available in the form of coordinates which can be scaled similar to vector images. Vector images can have the unique advantage over raster graphics in that the points, lines, and curves may be scaled up or down to any resolution with no aliasing. The points determine the direction of the vector path; each path may have various properties including values for stroke color, shape, curve, thickness, and fill. As such, it is recognized that part of the image 16 acquisition and subsequent image processing (by the image processing instructions 905) can be used to incorporate data 19, 20 which can be overlayed on the image in a vector graphics or a separate raster image and flattened/merged into the image 17 itself to display the detection 12 in the image 16. The data 21 may be overlayed/incorporated into the image data 20 or stored and sent separately, with association to the respective image 16. As discussed above, images 16 can be acquired through digital cameras 500, which use any of several image file and color space formats known in the art.

It is recognized that the images 16 can be compressed using any known compression technology, before they are sent as part of the object data 21 (as discussed) to the server 107a. It is also recognized that image compression is not used by the device 101 (e.g. by the image processing system 900—see FIG. 9) to identify objects 12 of interest in the images 16, in order to produce the processed image data 20. In other words, data compression can be utilized downstream of generation of the processed image data 20 (used to separate or otherwise remove the image discard data 19 from the overall plurality of image data 16 acquired initially by the camera(s) 500 of the device 101).

For example, the camera 500 and/or the image processing instructions 905 can utilize digital image compression, for those portions of the images (e.g. frames 16a,b,c,d determined to contain object(s) 12 of interest), before transmitting such image data 20 in the data package 21 (e.g. see FIG. 1). For example, digital image compression technology can incorporate discrete cosine transform (DCT), a lossy compression technique. For example, as an image format for any image data of the object data 21, JPEG compresses the image content down to relatively smaller file sizes. For example, the DCT compression algorithm of the JPG format can be used.

Vehicle 102a

The device 101 is intended to be used when deployed in the vehicle 102a. In many cases, the vehicle 102a can be a vehicle that is operated on behalf of an organization which can be governmental, quasi-governmental or a private company. It can also be used voluntarily by individuals as a crowd-sourced application.

Examples of governmental organizations include all levels of government, including national, federal or republic government; provincial, territorial or state government; municipal government, including municipalities, upper tier municipalities (such as metropolitan, regional, county or other name used to describe major upper tier municipalities), or lower tier municipalities (such as city, village, township, town, community, or other name used to describe). The governmental organization may also be a special organization, such as a reserve, resort, other name that is used to describe the local government of a certain geography and population. Examples of quasi-governmental organizations would be government-owned or supported organizations. Those could be organizations established as part of a public-private-partnership or a concession to build, maintain and/or operate an asset or a service over a period of time. They could be separately incorporated but the government may have full ownership, majority ownership, or minority ownership. The government's representatives can sit on the board of such organizations. Examples of quasi-governmental organizations include toll road concession companies, bridge concession companies, transportation and/or transit authorities, and/or utility or telecom companies. A private company can simply be a private company that is the owner of the asset that is to be inspected, or contracted on behalf of the owner to do so.

The vehicle 102a can be a service vehicle dedicated to patrolling an area for the specific purpose of identifying incidents/objects 12 on behalf of the organization. The vehicle 102a can be a car, a truck, a golf cart, a tractor, an atv, a bicycle, an e-bike, a motorbike, a motorcycle, a snowmobile, a van, or a customized utility vehicle, for example. The vehicle's 102a primary purpose can be different than acquiring incidents/objects 12, but augmented with the device 101 mounted for a supplemental function of incident/object 12 detection on behalf of the organization. Examples include garbage trucks, snowplows, operational service vehicles, utility vehicles, road and sidewalk sweepers, public transportation vehicles such as buses, school buses, and transportation vans or taxis. The vehicle 102a can also be a private vehicle owned by an individual, whereby the individual contributes incident object 12 data detected by the device 101 on a good will to the organization, or for monetary compensation. The vehicle 102a can also be an autonomous vehicle 102a operated privately or by an organization, whereas the autonomous vehicle 102a can be equipped with the device 101 to automatically detect incidents/objects 12 in the area in which it operates.

Mounting Component 103a

The device 101 is intended to be mounted in the vehicle 102a using the mounting component 103a. Typically, the device 101 can be mounted to the vehicle's 102a windshield or a portion of the body, though it can also be attached to the dashboard, the side windows, the back windows, or the vehicle 102a frame, as desired. The mounting component 103a configuration can be different for different vehicle 102a/device 101 combinations. For example, depending on whether the device 101 is a smartphone, a smart camera, or an embedded computer with external camera different mounting configurations can be used. Different mounting configurations can also be used depending on whether the device 101 is to be permanently affixed to the vehicle 102 or transferable between different vehicles 102a. The vehicle 102a can utilize the mounting component 103a of different types. For example, the mounting component 103a can be attached to the vehicle 102a via a suction cup, a sticky tape, glue, or screws and bolts, for example. The mounting component 103a can allow for an easy removal of the device 101 by having the device 101 easily detach from the mounting component 103a. The mounting component 103a itself can also have multiple parts which facilitate detaching parts of the mounting component 103a together with the device 101.

Non Volatile Memory 104

The storage capabilities (e.g. memory 99, 104, etc.) of the device 101 can have the non-volatile memory 104 associated for storing files 706 associated with operating system(s), component driver(s), application(s), and media, alongside other files used in software applications. The non-volatile memory 104 can be embedded in the device 101, an add-on, and/or a peripheral. For example, smartphones currently come with built in non-volatile memory 104, which can be expanded using non-volatile memory 104 add-ons (for example, micro-sd memory). Embedded computers typically come with a variety of hard drives, flash drives, and interfaces which allow for including one or more non-volatile memory 104 storage components.

The device's 101 software 108 can store digital data, such as the acquired incident images 16, data portions 20 of the images 16 including data about the identified objects 12 from the images 16, and associated sensor 700 data (e.g. sensor information 17) onto the non-volatile memory 104. It is recognized that the data portions 20 are those determined excerpts (e.g. frames 16a,b,c,d) from the total images 16 that contain the objects 12 of interest.

The device 101 (e.g. via software 108) can store the images/data 21 to the non-volatile memory 104 prior to transmitting over the network 18 for a variety of reasons. For example, cellular 106a connectivity may not be reliable, and the data 21 would have to be stored temporarily before transmitted. If cellular connection 106a or wireless connection 105a to the internet 18 is not available (e.g. out of cellular network coverage or out of the wireless range) during operation, the software 108 will store the images 16, 20 and their associated data 17 to the device's 101 non volatile memory 104. Once the connectivity has been restored, the software 108 will resume uploading the object data 21 to the server 107a.

Some organizations may also opt to utilize wireless connectivity 105a in order to save on cellular data costs, and as such, the data 21 would be stored until such time that the device 101 has access to wireless 105a access point, which is connected to the network/internet 18. The device 101 may also benefit from a performance, power, and/or heat management perspective to only transmit data once the vehicle 102a is idle (for example, idle in traffic or in a parking lot). The device 101 may also be benefit from a performance, power, and/or heat management perspective to initiate an upload process as a scheduled process as opposed to an ongoing process.

The files 706 and/or database 707 (representing any of the images 16, sensor information 17, and/or data portions 20—i.e. processed images 16) may be in an encrypted format in the memory 104 to secure the information. The files 706 and/or database 707 are deleted from the non volatile memory 104 when they are successfully uploaded to the sever 107a. The data 16, 17, 20 can be stored on the non volatile memory 104 in various file formats. Image data can be stored as compressed or uncompressed files such as jpegs, bitmaps, webp, png, and other common image formats. The associated sensor data 17 can be stored as a metadata file (for example, an xml file), a table file (i.e. a csv or a txt file), or in the database 707. The files 706 may also be stored in a common file 706 format or in a proprietary one.

Wireless Connection 105a

The device 101 can include the wireless connection 105a network interface in order to connect to the server 107a. For example, a wireless connection 105a may be wireless lan or wi-fi, operating at common frequencies such as 2.4 ghz, 5 ghz, or other frequencies typically associated with ieee 802.11 or other wireless standards. The wireless connection 105a has the advantage that it typically allows to upload a large volume of data without the cost of cellular data usage.

Cellular Connection 106a

The device 101 can include a cellular connection 106a network interface in order to connect to the server 107a. For example, the cellular connection 106a can utilize technologies such as 3g, 4g, lte, 5g or other technologies used for access to cellular towers. The cellular connection 106a provides for communications with the server 107a on a constant, frequent or periodic basis, allowing the incident information/asset data 12 (contained in the object data 21) to be generated as communications are taking place. It is expected to be used in many scenarios including when cellular cost is not a major issue, when cellular connection is available, when faster response to incidents is necessary, and/or when the device 101 does not have access to wireless connectivity 105a.

Server 107a

The server 107a is responsible for the organizing, storing, processing and disseminating of the object data 21 uploaded by the device(s) 101. A single server 107a can host a plurality of users, whether governmental users, quasi-governmental users, or private organizations. A single server 107a can communicate with a plurality of devices 101 as clients of the server 107a. The object data 21 of each client is securely segregated from each other where one user cannot access the object data 21 of other users, unless a user purposely marked their data for sharing, for example. When the server 107a receives object data 21 from a device 101 through the internet 18, the image data (e.g. frames 16a,b, c,d) containing objects 12 of interests are stored in a server storage 30 to a folder which may be allocated specifically to the particular device 101 and user's organization. It can be also organized by date, road segments, or other hierarchal structure, as desired. The server 107a can store image data 16, sensor data 17, object data 21, resultant processed data 20, resultant processed data 20' and/or discard data 19, 19', as desired. For example, the device 101 can send the discard data 19 to the server 107a, as part of the object data 21 or subsequent to sending the object data 21, as desired.

Accordingly the discard data 19, 19' can be defined as the data removed from the images 16 in order to produce the object data 21 (e.g. containing the processed images 20). For example, the discard data 19 could be inclusive of one or more whole frames/images 16a,b,c,d that are dropped (e.g. removed from the images 16 and/or sensor data 17) before sending the resultant object data 21 (as a result of utilizing the image processing instructions 905 on the captured images 16 and/or sensor data 17). For example, the image processing instructions 905 can also include utilizing the sensor data 17 in order to identify the objects 12 and/or discard data 19. For example, the sensor data 17 (such as direction and/or GPS data) can be used by the device 101 to recognize and extract the discard data 19 from the image data 16. For example, images 16 captured are associated with sensor data 17 during their capture (e.g. direction of vehicle travel and GPS data for recognizing the geo position of the captured images 16). As such, when new subsequent images 16 are taken, having sensor data 17 (e.g. direction and/or GPS data) matching that sensor data 17 of the previously recorded images 16, the newly acquired images 16 can be discarded (either in whole or in part). The newly acquired images 16 could be considered by the device 101 (as a result of executing the image processing instructions 905 on the previous images 16 and newly acquired images 16 and their associated sensor data 17) as duplicate data in view of the match in sensor data 17 between the previous images 16 and the newly acquired images 16.

Additional information, such as sensor data 17, geographical coordinates GCa,b,c,d, direction of travel, date/time, pitch, and/or data of the object data 21 describing the object 12 of interest in the image can be associated to each incident image (e.g. image frame 16*a,b,c,d*) and also stored into one or more database(s) 30 on the server 107*a*. The server 107*a* is depicted in the system 10, 10' as a single server 107*a*. While it may be deployed as a physical server, there may be more than one server 107*a* segmented by geography (for example, Canada, US, Mexico or other countries), by architectural function (DNS, runtime, database, storage, image processing, reporting, or other function), by capacity (for example, users 1-1000 reside on server 1, whereas users 1001-200 reside on server 2), logically (such as a virtual machine that runs on a server cluster, or on a cloud), or in other common ways in which servers which provide software as a service are setup. For greater clarity, the word server 107*a* and server(s) 107*a* will be used interchangeably throughout the description, figures and claims as the system 10, 10' could be setup to use one or more physical, virtual or cloud based servers 107*a*.

Software 108

The software 108 can be responsible for acquiring image 16 data from the camera 500, acquiring geographical positioning data 17 from the geo-positioning sensor 701, collecting sensor(s) data 17, collecting other system information such as date and time, identifying incidents 12 and assets data 12 using image processing function(s) and neural network(s) inference workflow(s) of the image processing instructions 905, and reporting the incident/asset data 12 (considered of interest) through communications of the object data 21 with the server(s) 107, for example. The software 108 is responsible for other functions, which are relevant to the operation of the unit, such as storing images and data to the device's 101 non volatile memory 104 in an encrypted or not encrypted, redacted or not redacted format, and controlling the content on the device's 101 user interface 119*a*, if available. The software 108 may also provide functions pertaining to the configuration, calibration, and operation of the device 101. The software 108 may also communicate with the server(s) 107*a* for the purpose of downloading updates, settings, configuration parameter(s), neural networks(s), data and/or files. The software 108 may also communicate to the server(s) 107*a* of sending non-incident information, pertaining to the performance, status or diagnostic information for the device 101.

Figure 3:
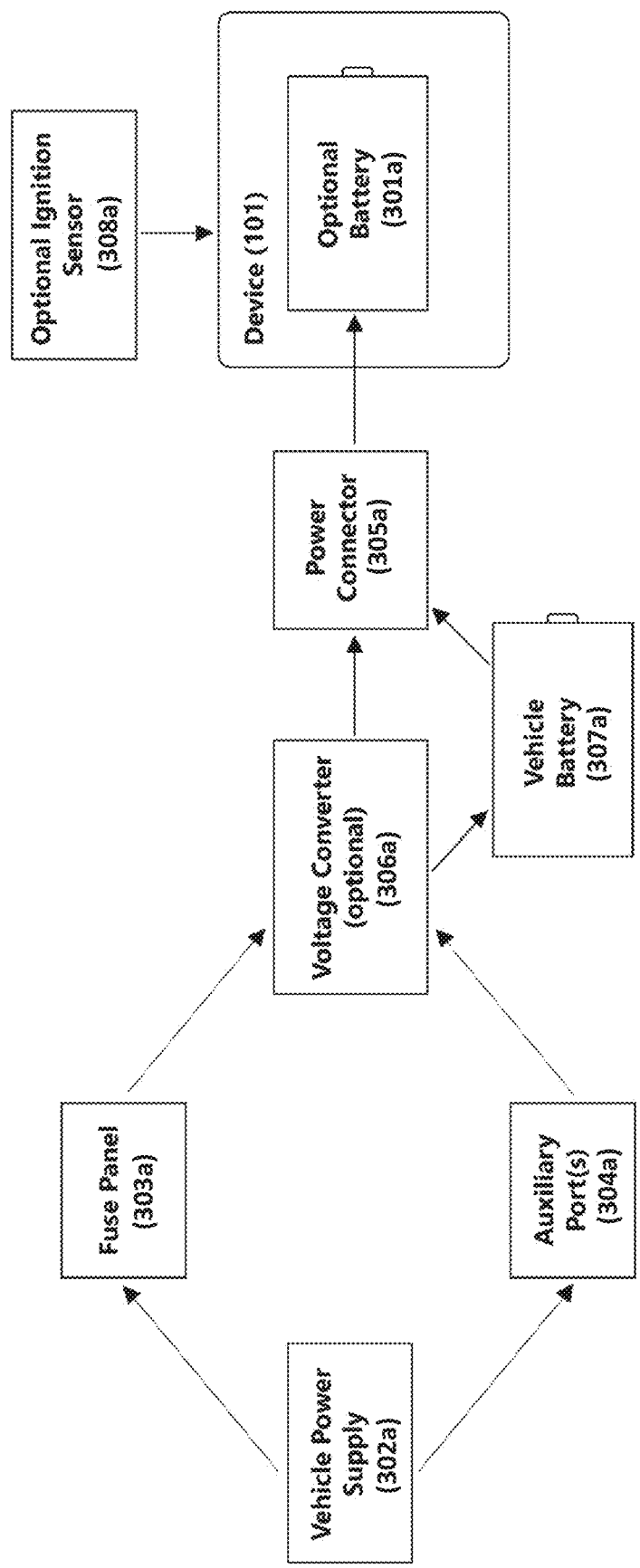
FIG. 3 shows options for powering a device of the system of FIG. 1.

Referring to FIG. 3, shown is a variety of options which the device 101 can be powered. A device 101 such as smartphone, smart camera or embedded computer system, with an optional battery 301*a* that is connected through a power connector 305*a* to a vehicle battery 307*a* or to a vehicle power supply 302*a* through a fuse panel 303*a* or auxiliary port(s) 304*a* directly or through a voltage converter 306*a*. The device 101 may have an optional ignition sense 308*a* port to know when to the device 101 on or off as to not drain its own battery 301*a* and/or the vehicle battery 307*a*. The device 101, may have a battery 301*a* that allows it to operate for a period or to keep it in a suspended state for a period of time without a direct connection to power. For example, nearly all smart phones today come equipped with a battery 301*a*.

The device 101 typically connects to the vehicle's 102*a* power supply 302*a* through the vehicle's 102*a* fuse panel 303*a* or through auxiliary port(s) 304*a* which are typically known as automobile auxiliary power outlet, car outlet, automotive power socket, automobile outlet, or vehicular outlet. The auxiliary port(s) 304*a* may be with a USB connector, a plug connector, a socket connector, or other commonly used connectors. A vehicle's 102*a* power supply 302*a* voltage typically ranges from 9v to 36v. The device 101 may be a smart phone, a smart camera, or an embedded computer with varying power requirements. Depending on the compatibility between the device's 101 power requirements and the vehicle's 102*a* power supply 302*a* voltage, a voltage converter 306*a* may be required. The power load supplied by the vehicle's 102 electrical system would typically allow the device 101 to operate and charge its battery 301*a* (if exists) simultaneously.

Depending on the configuration of the vehicle 102*a*, when it is idle or turned off, power available to the auxiliary port(s) 304*a* may be shut off to protect the vehicle 102*a* battery from being drained. The device 101 can be connected to the vehicle 102*a* power through a power connector 305*a* with a compatible header. For example, if it is a smartphone the power connector 305*a* may be a USB-c, a lightning plug, or another charging cable variant. The other side of the power connector 305*a* may be a USB, a socket plug, a wire harness, or other connector that is aimed to connect the device 101 to the power supply 302*a* through the power system. The device 101 may also utilize proprietary or standard cables for power connector 305*a* for other device 101 variants. In the event the device 101 is an embedded computer, it may be connected directly or indirectly to the vehicle's battery 307*a*. It may also have an ignition sense 308*a* interface that will communicate to the device 101 when to turn off or on as to not to drain the vehicle's battery 307*a*.

Privacy & Security

Referring to FIG. 6, shown is a privacy/security framework 600 including capabilities provided by the image processing instructions 905 for the redaction (e.g. generation of discard data 19, 19') of personally identifiable information 601*a* such as faces 602*a*, license plates 603*a*, or other objects 12 containing personally identifiable information 604 such as cars or people. In certain circumstances the framework 600 has the option to redact whole image 605 other than objects 12 of interest (also referred to as the resultant image data content 20), depending upon a defined privacy criteria. The framework 600 has the option to utilize unredacted images 606, with processing on device 101 and/or server 107*a*. The system may use secure encrypted image 607 storage 104 on the device 101 and/or server 107*a*. It may also utilize secure encrypted 607 communications to the server 107*a*. It is recognized that the images 16 once processed (examples as processed image results 601*a*, 602*a*, 603*a*, 604, 605, 606) can be referred to as the processed image portions 20 (i.e. such that the data content of the processed image content 20 does not contain the discard image data 19, 19').

For example, discard data 19, 19' can include data such as but not limited to: portions of images 16 which are being blurred; images 16 which are determined to not contain incidents 12; and/or images with incidents 12 which are being discarded due to their position (i.e. duplication in relation to an overlapping incident 12 as discussed above with respect to previous images 16 and newly acquired images 16).

As such, the image portions 20 contain less image data content than the unprocessed images themselves 16 (as acquired by the imager 500). It is the image portions 20 (the result of processed images 16 as performed by the image processing instructions 905) themselves that can be included as processed image data 20 in the object data 21 transmitted to the server 107a over the network 18, for example. It is recognised that image 16 portions can refer to inter frames (i.e. some whole frames that are retained/dropped) or intra frames (i.e. area(s) within image 16 that are retained/dropped). The privacy/security framework 600 is one example of how the data of the images 16 can be reduced (by identifying and thus extracting the discard data 19, 19') by the image processing instructions 905 before the object data 21 containing the objects 12 of interest are communicated to the server 107a or otherwise stored as processed image data 20' in the storage 30 by the server 107a. It is recognized that an object 12 of interest included in the object data 21 can also be in redacted form (e.g. blurred out or pixel substituted), as such the included object 12 of interest in the resultant object data 20 can also include a reduction in its data size. It is recognised that pixel blurring can result in an increase in data size of the object data 21 (as compared to the same images 16 containing non blurred content). It is also recognised that pixel substitution/deletion can result in a decrease in data size of the object data 21 (as compared to the same images 16 containing non substituted/deleted content). Further, it is recognized that a particular image data 16 (e.g. image frame 16a,b,c,d—see FIG. 2) can include redaction data 19, 19' (e.g. substituted or blurred image frame portion(s)) as well as object(s) 12 of interest. Accordingly, any particular image data 16, prior to processing, can include only "to be determined" image discard data 19, 19' only "to be determined" object(s) 12 of interest, or both "to be determined" image discard data 19, 19' and "to be determined" object(s) 12 of interest. It is recognized that "to be determined" can also be referred to as "potential" or "candidate", as desired.

Considering that the system 10 is intended to be operated in the public space, and it is expected to be used extensively in public spaces and by governments and quasi-government organizations, the system 10 can have one or more privacy and security options intended to address regulations or guidelines regarding the collection and storage of data including personally identifiable information (pii) in the images 16. In relation to data, pii may be pictures which uniquely identify individuals. Examples of personally identifiable information include images of people's faces 602 or of a vehicles' license plate 603a. It may also include house addresses. Sometimes, the objects 12 themselves may identify an individual, for example a fairly unique car or house. Governmental organizations typically have regulations and legislations related to the handling and storage of pii. Images 16 acquired by governments are also typically subject to freedom of information requests. As such, in many occasions governments do not want to store pii. Governments and organizations responsible for maintaining assets are also typically subject to litigation and claims related to incidents causing property damage, personal injury, and/or death. Images 12 which are acquired by device 101 may occasionally be used as evidence against the system user in claims. As such, some users would only wish to retain the incident 12 data, but not any other information. For example, an image 16 may report an incident 12 of a pothole, but in the image 16 peripheral there may be a broken sign 12 not detected by the system. Such image 16 can then be used as an evidence against the owner of the information in claims. The system 10 can store an acquired image 16 containing as an incident 12 as an unredacted image 606 containing all of the images' 16 original information. However, the device's 101 software 108 can have options built in to exclude pii and other non-detected related data, using the privacy/security framework 600 as discussed above.

Users opting to redact information may use the image processing instructions 905 to redact the whole image 605 (e.g. image 16) other than the detected object(s) 12 of interest. The object(s) 12 of interest can be maintained in the picture 16, whereas the remainder of the picture 16 can undergo image processing intended to redact the image 16 in order to generate the resultant processed image data 20, 20' and the discard data 19, 19'. The object(s) 12 of interest, can result in image data 20, 20' in which all image data 16 is redacted other than the object(s) 12 of interest. For example, a pothole 12 may be an object 12 of interest identified by the system 10. After the image 16 redaction process, see FIG. 9 by example implemented as system 900, the only object 12 that is not redacted in the resulting image data 20, 20' can be the pothole 12 itself.

Users may also use the image processing instructions 905 to redact pii using object redaction 604 feature aimed to redact potential objects 12 containing pii, such as vehicles, cars and people. It may also only blur objects which are pii, such as license plates 603a and faces 602a. In this instance, only the pii objects 601a and/or objects containing pii 604 will be redacted (included in the discard data 19) whereas the rest of the image 16 will remain untouched and thus such content being used as the resultant processed image data 20, 20'.

The redaction operation of the image processing instructions 905 could obfuscate the details in the image 16 parts which are to be redacted (i.e. included in the discard data 19, 19'). Examples of redaction operations used to generate the discard data 19 can be pixel substitution and/or blurring. Pixel substitution is a process where pixels occupied by the object 12 of interest (whether such boundaries are semantic segmentation instances or bounding boxes) are replaced by pixels of a single color or a pattern of colors, or otherwise treated as an absence of image data 20, 20'. A blur is a visual effect function that makes the details in resultant image data 20 appear fuzzy or out of focus. The redaction operation can take place on the device 101 or on the server 107a, depending on whether the first image processing portion 402a or the second processing image portion 404a is utilized (see FIG. 4) for the particular redaction operation.

Figure 4:
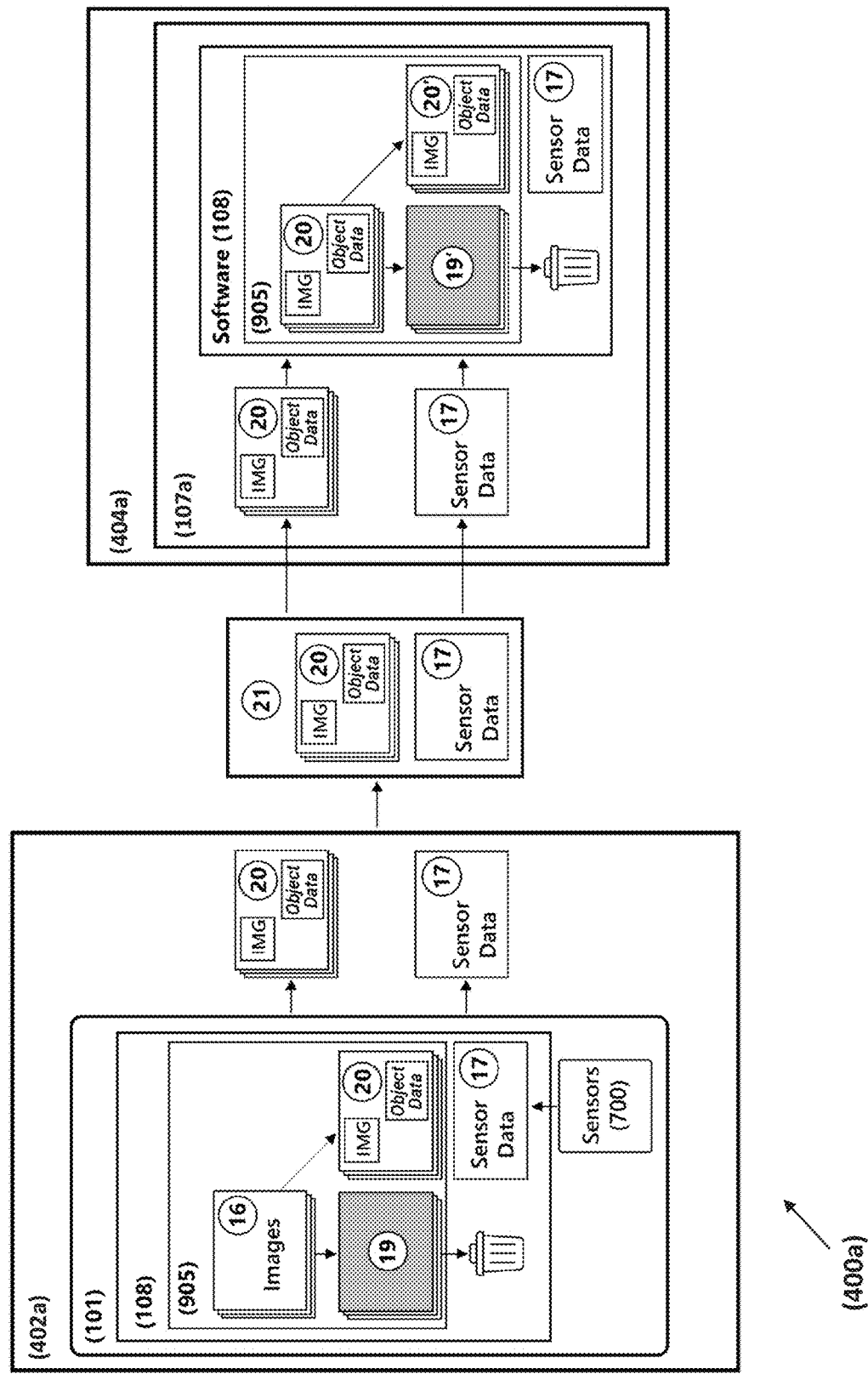
FIG. 4 shows an example split processing framework for the system of FIG. 1.

For example, referring to FIG. 4, the first image processing portion 402a can be used to generate discard data 19 (using pixel substitution) and the resultant image data 20 (that includes object(s) 12 of interest), such that the resultant image data 20 is included in the object data 21 and transmitted to the server 107a. Once received, the server 107a can use a set of image processing instructions 905 to implement pixel blurring and/or additional pixel substitution, thus generating further discard data 19' as extracted from the resultant image data 20 of the object data 21. The server 107a would then store modified object data 21' in storage 30, which includes the resultant image data 20 other than the extracted discard data 19' (see FIG. 1).

In the event that the resultant images 601a, 604, 605, 606 and their associated data are stored on the internal non volatile memory 104, the resultant images 601a, 604, 605, 606 and data may be encrypted using a modern encryption algorithm by the image processing instructions 905, which would obfuscate the files 706. Therefore, in the event that the device 101 is stolen from a vehicle 102a or lost, the information (e.g. object data 21) stored on the device 101 would not be easily accessible. Communication of the object data 21 to the server 107a may place over encrypted communications to ensure that the data is secure in transit.

Finally, stored information (e.g. object data 21) may be encrypted on the server 107*a* to ensure that the data is secure while at rest.

Referring to FIG. 7, the device 101 can have a variety of sensors 700. In addition to camera(s) 500, the device 101 is equipped with a geo-positioning 701 sensor. The device 101 may also include an accelerometer 702 sensor, gyroscope 703 sensor, rotational vector 704 sensor, and other sensors 705 that can provide information 17 regarding the movement, position and/or orientation of the device 101 and/or the vehicle 102*a* on which it is equipped. The sensor(s) 700 and camera(s) 500 data 17, 16 is processed by the software 108 (including the image processing instructions 905) before being sent to the server 107*a*, as discussed herein. The sensor data 17 and image data 16, 20 may be stored on the device 101 non volatile memory 104 in the form of file(s) 706 or database 707 entries prior to being transmitted to the server 107*a* as object data 21.

The device 101 includes a geo-positioning sensor 701 to determine its geo-spatial coordinates 17. Geo-location, or a geo-positioning sensor 701, provide location based information 17 using satellite (such as GPS, GNSS, glonass, galileo) or cellular tower locations to determine device positioning information, which is associated with the images 16 (e.g. geo coordinates GCa,b,c,d—see FIG. 2). In addition, the device 101 in many instances will have additional sensors 700. For example, modern smartphones 101 on the market today have a variety of sensors 700 embedded right onto them, which provide information that can be used to determine the device 101 orientation, pitch, magnetic pole direction, geo-spatial position, velocity, acceleration, shock, vibration and other data 17 related to position and movement. The device 101 may include an accelerometer sensor 702 used to measure the acceleration force 17 applied to the device 101 across its x axis, y axis and z axis. The force may or may not include the force of gravity. The acceleration data 17 will typically be available as meters per second squared ($m/s^2$) though it may be in other units (for example voltage) that can be converted to such units. The device 101 may include a gyroscope sensor 703 used to measure the rate of rotation across the device's 101 x axis, y axis and z axis. The gyroscope data 17 will typically be available as radians per second (rad/s) though it may be in other units (for example voltage or frequency) that can be converted to such units. The device 101 may include a rotational vector 704 sensor used to measure the degree of rotation across the device's 101 x axis, y axis, z axis and an optional scalar product or quaternion. The rotational vector data 17 will typically be degrees, though it may be in other units (for example voltage) that can be converted to such units. The device 101 may include other sensor(s) 705 to measure a variety of other conditions 17 related to the movement, acceleration, forces applied and position of the device 101. For example, the device 101 may include a gravity sensor 700, which would measure the force of gravity 17 in relation to the device 101. Other sensor(s) 700 may also be magnetometer which can determine the device's 101 position 17 in relation to the magnetic north or true north. Other sensor(s) 705 may also include hardware and/or software monitoring of the device 101 components. Examples of sensors 700 can include battery level sensor, battery temperature sensor, CPU temperature sensor, GPU temperature sensor, ambient temperature sensor, CPU core utilization, CPU overall utilization, luminance sensor, proximity sensor, and other built in sensors available for the device 101.

Any and all of the above discussed sensor type data (i.e. sensor data 17) can then be associated with camera(s) 500 images in order to determine additional insights. For example, the sensor data 17 may be used to derive ridership experience, level of vibration, the speed in which the vehicle 102*a* is travelling, whether the device 101 is within a geo-zone, or the estimated geo-positioning of an object 12 detected in an image 16 in relation to the device 101. The sensor data 17 may also be used to optimize the performance of the device 101 in relation to the current heat, power and processing situation.

The sensor(s) 700 and camera(s) 500 provide for data 17, 16 to be acquired and processed by the software 108. The resultant processed data 16, 17 (e.g. using the first data processing portion 402*a*) is then either transmitted to the server 107*a* or stored on the device 101 non volatile memory 104 until transmission can take place. The data 16, 17, 20 may be stored as file(s) 706 in variety of formats, such as xml, csv, txt, or in a proprietary format. The data 16, 17, 20 may also be stored in a database 707. The data 17, 20 may be stored and transmitted in encrypted on non-encrypted format.

The data 17, 20 may be further processed on the server 107*a* using the second data processing portion 404*a*. For example, it may be correlated with road segments, assets, and other information to derive additional insights. For example, what roads or assets were inspected. It may also be used by the server 107 for detecting alerts related to device constraints (heat, power, or processing capabilities) on the device 101.

The GPS/GNSS receiver (i.e. position sensor 701) can be used to record (sensor data 17) the location coordinates GC a,b,c,d where the incident 12 occurred so that the location of the incident 12 can be presented. GPS can also be used by the instructions 905 to determine the speed the vehicle 102*a* is travelling which is used to activate speed enabled features within the application (e.g. software 108 features of screen lock, driver attention warning). In addition, the GPS data 17 can be used as breadcrumbs' to track the road surfaces 14 that have already been inspected, thus when the instructions 905 are used to compare the geo coordinates GC of the newly acquired images 16, those images 16 being determined as duplicates (i.e. having matching geo coordinates GC to previously acquired images 16) can be discarded/excluded from the object data 21. Furthermore, GPS data 17 can used by the software 108 to determine if roads 14/surroundings 13 being scanned are within a defined geofence zone, otherwise detections 12 will be ignored.

The accelerometer and magnetometer sensors 700 can be used by the software 108 to determine the vehicle's 102*a* direction of travel. Being able to determine when vehicle 102*a* direction of travel is necessary for the system 10 to present which side of the road (e.g. North, east, west or south bound lane) is being scanned by the system 10. It can also help to identify the incident 12 location in relation to the device 101 or the vehicle 102*a*.

In view of the above, the rotational vector sensor 704 can be used to determine the device 101 orientation, including pitch, facing direction, vibration and bumps and such information 17 is sent to the server 107 together with the image data 20. Further, it is envisioned that the device 101 can keep track of rotational vector sensor 704 information 17 for the purpose of integrating the data with data obtained from images 16 for the purpose of detecting road quality and road roughness levels as determined by the level of "vibration" or "bumps" detected by the sensor 704, and such data is sent to the server 107*a* for the purpose of being correlated to the image data 20 uploaded.

The accelerometer 702 sensor can determine the device's 101 acceleration force along its x axis, y axis, z axis and such information 17 is sent to the server 107a together with the image data 20. The gyroscope sensor 703 sensor can determine the device 101 orientation 17, and such information 17 is sent to the server 107a together with the image data 20. The other sensors 705 can be such as magnetometer 705 sensor to determine the device 101 orientation 17, and such information is 17 sent to the server 107a together with the image data 20. The device 101 can keep track of the location, via the sensor(s) 700, in which the device 101 was present through gps breadcrumbs or routes as evidence that the device 101 inspected the area.

Figure 8:
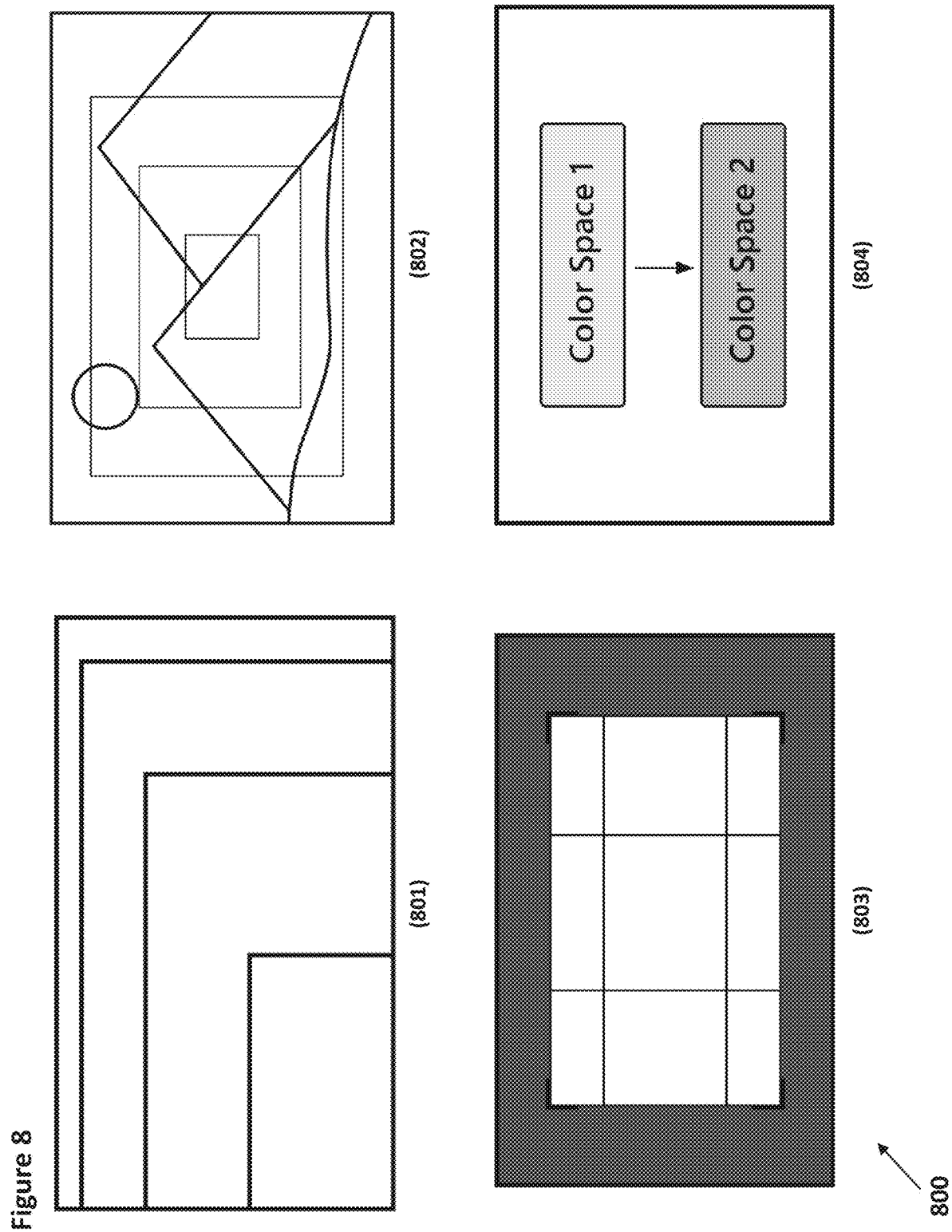
FIG. 8 shows example image processing operations of the system of FIG. 1.

Referring to FIGS. 4 and 8, one example of a distributed processing system 400a is a first image processing portion 402a for image pre-processing, which is the process of manipulating and/or adjusting the image 16 data acquired by the camera 500 to provide that the data received for neural network 905 processing is inputted in a way which will optimize the results and performance of the system 10, 10' (i.e. optimize the quality and quantity of the resultant image data 20 in the object data 21).

For example, using the software 108, a resolution for the image 16 data can be selected from one of the camera's supported resolutions 801. The camera resolutions 801 can be represented as a name, such as 8k, 4k, 1080p, 720p, hd, or other common names. It can also be represented as a resolution, representing the number of pixels and typically in a format of width×height, for example 7680×4320, 3840× 2160, 1920×1080, 1270×720, or other resolutions. In many instances, neural networks 905 can be optimized to accept images 16 in certain resolution, typically referred to as "input shape". For example, an image 16 can be acquired by the camera 500 at a resolution of 1080p (1920 pixels×1080 pixels). However, the neural network 905 model can be trained on images 16 scaled down to the size of 300 pixels×300 pixels. The software 108 then needs to resize, or adjust the resolution 801 of the image 16 dimensions from 1920 pixels×1080 pixels to 300 pixels×300 pixels in order for the neural network 905 to process it appropriately. The neural network 905 model can have a different input shape than 300 pixels×300 pixels it may be higher (for example, 600 pixels×600 pixels) or smaller (for example, 224 pixels× 224 pixels). Typically, the larger the model "input shape" or resolution, the slower the images 16 will be processed, however the larger the "input shape" resolution is, the more details will be retained in the image 16 which may increase the model's effective detection parameters, such as accuracy, recall, precision, f-score and other such metrics.

The software 108 can also facilitate for a field of view adjustment 802, the field of view adjustment 802 can be optical zoom level adjustment, if supported by the peripheral camera 500 of an embedded computer system 101. If further magnification is required to calibrate the camera's 500 field of view, the digital zoom level can be adjusted through the software 108 to achieve the desired optimal field of view. The software 108 may also select from a variety of internal camera(s) 501a or external camera(s) 502 in order to adjust the field of view 802. Different field of view may be optimal for different use cases on vehicle(s) 102a. For example, the height and pitch in which the camera 500 is mounted may be different for a bus, a service truck, or a sedan, and may require different zoom levels in order to cover the same number of lanes. Similarly, different field of views may be preferred for different objects 12. For example, signs 12 may favor a wider field of view that covers the surroundings 13 whereas road defects 12 may favor a narrower field of view covering the road surface 14.

The software 108 can also facilitate for cropping 803 parts of the image 16. Cropping the image 16 allows to omit areas which typically do not require neural network 905 processing. For example, if the camera 500 is mounted on a windshield, the top 20% of the image 16 may typically be sky, whereas the bottom 10% of the image 16 may be a dashboard or a hood of a vehicle 102a. By cropping parts of the image 16 which are not relevant, those areas are less likely to generate false detections 12 or false incidents 12. In addition, in the event that the neural network 905 "input shape" is lower than the acquisition resolution, by cropping out irrelevant portions of the image 16, less detail is lost in the resizing operation of the image 16. Cropping 803 may also be used for extracting a portion of an image 16 for additional image processing and/or inference activities 905. For example, a car 102a may be detected 12 by a neural network 905 and then cropped from the image 16. The cropped car 102a may then be either redacted 604 or processed through a neural network 905 that is trained to identify license plates in a picture 16. Operations related to redaction such as personally identifiable information redaction 602a, 603a object redaction 604 and/or image redaction 605 are also considered image processing operations as performed by the software 108 and related instructions 905.

In the event that the image 16 data acquired by the device's 101 camera(s) 500 is in a format that is not compatible or optimized to be used with the neural network 905 architecture or library, color space conversion 804 may be required. Examples of color spaces include yuv, rgb, hsv, hsl, cmyk and others. Even within color spaces, there are variations in the container, structure, channels, order, format, decimal system which may require conversion. For example, a file may be represented in bytes, words, or hexadecimal. Another example is that rgb channels may be ordered as bgr. Another example is that extra channel may be present to represent transparency (rgba).

Once the image data 16 is preprocessed by the first image processing portion 402a by the device 101, e.g. using image processing instructions 905, then the resultant object data 21 would be sent to the server 107a for implementation by the server 107a of image processing instructions 905 during a second image processing portion 404 by the server 107a, which then results in the resultant object data 20' being stored in the storage 30 (see FIG. 1). As such, it is recognized that the device 101 can have the image processing instructions 905 as an embodiment of the system 10, 10'. As such, it is recognized that the server 107a can have the image processing instructions 905 as an embodiment of the system 10, 10'. As such, it is recognized that both the server 107a and the device 101 can have the image processing instructions 905 as an embodiment of the system 10, 10'. The device 101 and the server 107a can have different variations, configurations, and parameters relating to the image processing instructions and neural network(s) 905 used.

Figure 9:
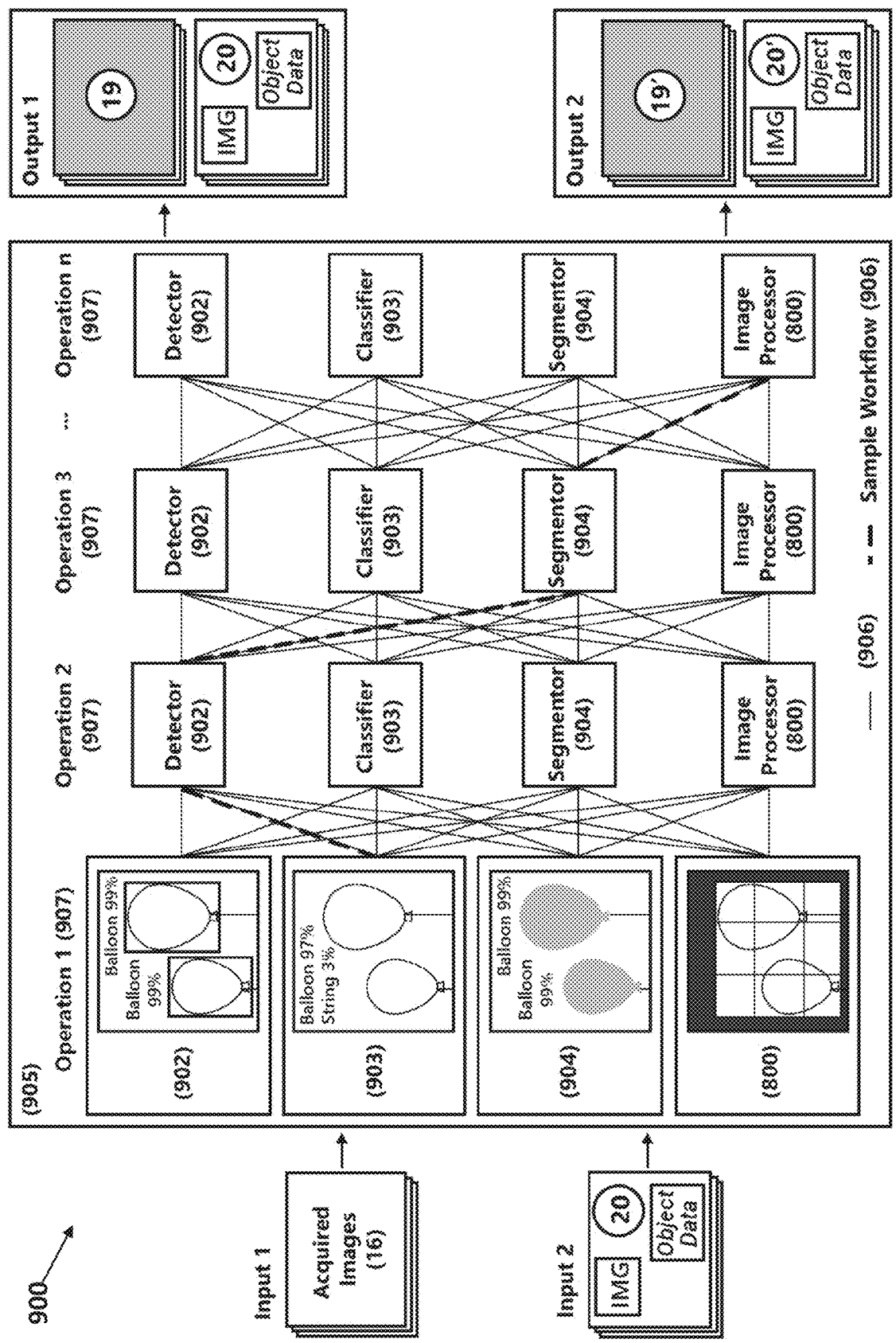
FIG. 9 shows example workflows of image processing functions and neural networks processing of the system of FIG. 1.

Referring to FIGS. 1 and 9, shown is an example of image processing system 900 implemented by the software 108 (including the image processing instructions 905) on the acquired images 16, in order to produce the processed image data 20 to be included with the object data 21 transmitted to the server 107a. It is recognised that these processing instructions 905 of the system 900 are used in the regular AI process 301—see FIGS. 15, 16. It is also recognized that the example of image processing system 900 implemented by the software 108 (including the image processing instructions 905) on the resultant image data 20, in order to produce the processed image data 20' to be included with the received sensor information 17 stored in the storage by the server 107*a*.

The software 108 can include image instructions 905 (e.g. including artificial intelligence neural networks 905), for image 16 processing and inference for flexible workflows 906 inclusive of neural network(s) 905 inference operations 907 including detection 902, classification 903, and segmentation 904, in order to generate the discard data 19, 19' as well as the resultant processed image data 20, 20'. It is recognized that the workflows 906 can include a plurality of different numbers/combinations of the operations 907 in any order, as configured in the image processing instructions 905, in order to identify, classify and segment any object(s) 12 in the image(s) 16 under consideration. The system 900 also depicts processing 800 of images 16 containing object(s) 12 of interest in relation to incidents. One image 16 may have several different workflows 906 applied to it. The object(s) 12 of interest are also referred to as classes 12. The class 12 refers to one of the output categories for the object(s) 12 of interest. For example, they may include but are not limited to: pothole 12, car 12, person 12, sign 12, etc. The network(s) 905 can detect, classify, and/or segment one or more classes 12 (also referred to as object(s) 12 of interest) in the image 16.

It is recognized that the identified object(s) 12 of interest are included in the processed image data 20 while the discard data 19 is excluded from the processed image data 20, as one embodiment, such that the processed image data 20 and the sensor data 17 is transmitted to the server 107*a* as object data 21.

Further, it is recognized that the identified object(s) 12 of interest are included in the processed image data 20' while the discard data 19' is excluded from the processed image data 20', as one embodiment as implemented by the server 107*a* using the object data 21 obtained from the device 101.

Further, it is recognized that the identified object(s) 12 of interest and discard data 19 are included in unprocessed images 16 sent to the server 107*a* by the device 101 as the object data 21 (including the sensor data 17). Once received, then the server 107*a* would then process the images 16 as processed image data 20 while the discard data 19 is excluded from the processed image data 20, as one embodiment as implemented by the server 107*a* using the object data 21 obtained from the device 101.

Typically, image(s) 16 acquired by the device's 101 camera(s) 500 are available in some initial resolution, color space, and formatting. It is expected that in many cases, the image(s) 16 may need to undergo image processing 800 operations to optimize their compatibility with the neural networks 905 used and the object(s) 12 of interest which they are trained to identify. Some examples of image processing 800 operations are resizing or adjusting resolution 801, field of view adjustments 802, cropping 803, and/or color space conversion 804, as shown in FIG. 8 by example only.

As such, the image processing 800 operations can include the resolution of the image 16 can be set based on the available resolutions present on the camera 500 device, whether available as resolutions or as a name representative of the resolution. Further, the field of view can be adjusted via adjusting the optical zoom levels of the camera(s) 500. Further, the field of view can be adjusted by a digital zoom process, wherein the picture 16 is magnified and only the parts of the image 16 that remain within the original dimensions are processed. Further, the region of interest 12 in the image 16 can be set. Once set, the region of interest 12 will be cropped. Further, the image processing can include color space conversion, whether from one space to another, or adjusting the formatting, order and/or channels of the utilized color space.

For example, the processing instructions 905 (e.g. neural network 905) can be defined as a set of functions, operations and/or instructions which facilitates for the system 900 to train itself based on annotated datasets, commonly referred to as "ground truth". Once trained, the system 900 can then infer on new datasets. The process is known as machine learning. The neural network(s) 905 utilized in the system 900 can be primarily geared towards identifying object(s) 12 of interest in images 16 for automated incident identification and reporting. Once processed using the image processing instructions 905, the system 900 outputs the processed object data 20, shown by example in FIG. 6. Further, software 108 is configured to construct the object data 21 by associating the sensor information 17 (e.g. including geo coordinate data GC a,b,c,d) for each of the objects 12 of interest. It is recognised that during the processing of the images 16 using the image processing instructions 905, some of the image 16 data acquired will be discarded in view of the discarded image 16 data does not contain any objects 12 of interest as determined by the image processing instructions 905 as executed by the processor 111*a* and/or GPUa 112 of the device 101 (see FIG. 7). It is recognized that discarded image 16 data can be referred to as discarded data 19 (see FIG. 4), such that discarded data 19 is not included in the object data 21 and is thus can be inhibited from being transmitted over the network 18 to the server 107*a*.

The neural network(s) 905 utilized can have a plurality of architectures which pass the image 16 through a sequence of layers operations 907 which are aimed at aggregating, generalizing, manipulating and/or modifying the information of another layer for the purpose of inferring, detecting, classifying and/or segmenting objects 12 in images 16. Examples of some typical operations in neural network(s) 905 are: (a) convolution; (b) rectification; (c) fully connected; (d) pooling layer (e) bottleneck and/or (f) loss layer.

The architecture of the system 900 can be a neural network 905 architecture such as: (a) single shot detector (ssd), (b) you only look once (yolo), (c) convolutional neural network (cnn), (d) region-based convolutional neural network (rcnn), (e) fast region-based convolutional neural network (fast rcnn), (d) faster region-based convolutional neural network (faster rcnn), (e), mask region-based convolutional neural network (mask-rcnn), (f) region-based fully convolutional networks (r-fcn), or other published or proprietary neural network 905 architectures.

When a neural network 905 is trained on an image 16 set (e.g. a series of image frames 16*a,b,c,d*), it can set certain parameters commonly known as weights. The parameters, or weights, are typically stored in a model file, or weights file. The neural network 905 utilized in the system 900 can be trained using published, well known, weights files as the basis. For example, mobilenet (such as mobilenetv1, mobilenetv2, mobilenet v3), inception (such as inception v1, inception v2, inception v3), vgg, or other popular pre-trained networks, and can be composed of different number of layers (for example, resnet50, resnet101). However, the concept of such pre-trained neural networks 905 is the same whereas a base architecture with base weights is modified whereby one or more of the last or final layers is modified to detect or classify a set of objects 12 of interest, which may be identical, exclusive, partially inclusive, or fully inclusive of the original trained objects and may include new objects not present in the original neural network 905. Neural network(s) 905 may also be of a proprietary custom architecture with weights or parameters which are trained from scratch.

The neural network(s) 905 may be utilized as a detector 902, see FIG. 9. A detector 902 typically identifies an object 12 of interest in image(s) 16, and the location of the object 12. The location of the object 12 is typically in the form of a bounding box represented by coordinate(s) REFa,b,c,d and/or distance(s) in relation to a point of reference 902 in the image 16, see FIG. 2. A detector 902 may also provide a score, typically known as confidence, which represents how sure the neural network 905 is in the object 12 detection. A detector 902 may also detect landmarks. Landmarks are points of reference in a known object 12. For example, in the context of a detector identifying a sign, the bottom of the sign pole and the top of the sign pole may be landmarks. Such landmarks can then be analyzed to derive further information about the status of a sign—for example, whether it is crooked or not.

The neural network(s) 905 can be utilized as a classifier 903. A classifier 903 has a list of potential classes, or object types, which it is trained to identify in a picture. When processing image(s) 16, a classifier 903 typically returns a list of potential object(s) 12 in the image 16, sorted by the model's confidence of their presence in the image 16. The neural network(s) 905 can be utilized as a segmentor 904. A segmentor 904 typically segments image(s) 16 into regions. The regions are then typically predicted to belong to a certain class 12, or type, which allows to extract a mask, or a pixel blob, that represents the class 12. A segmentor 904 can also separate instances of the object(s) 12 into separate object(s) 12 representing one or more classes 12. For example, a segmentor 904 may identify a pothole 12, and also the shape of the pothole 12, which will allow to estimate its surface area and severity.

The neural network(s) 905 can be designed and/or optimized to be used on the device's 101 gpu, cpu or both. The workflows 906 may utilize one or more neural network(s) 905, and the neural network(s) 905 may be used in a sequence. One neural network(s) 905 can responsible for detecting 902 objects and/or regions of interest in the image(s) 16, and one or more additional neural network(s) 905 can be responsible for classifying 903 the objects 12 and/or regions of interest already detected in the image(s) 16. For example, a neural network 905 may detect 902 a pavement crack 12, crop it with image processing 800, and then another neural network 905 classifies 903 it as a longitudinal type of crack 12. It could also be used to verify that the first detection is correct. For example, the first neural network 905 may detect 902 a pothole 12, crop it using image processing 800, and pass it to a classifier 903 which confirms it is a pothole 12 and not a manhole. In some situations, this process provides the opportunity to classify 903 the object 12 of interest using a higher resolution, since the detector 902 may infer on a scaled down version of the image 16, whereas the cropped image 16 would be inferred at a higher resolution.

One neural network 905 can be responsible for detecting 902 objects 12 and/or regions 12 of interest in the image(s) 16, and one or more additional neural network(s) 905 is responsible for detecting 902 additional objects 12 and/or regions 12 of interest in the already detected area(s) of the image 16. For example, a neural network 905 detects a car 12 and then another neural network 905 detects a license plate 12 on the cars 12. One neural network 905 can be responsible for detecting 902 objects 12 and/or regions 12 of interest in the image(s) 16, and one or more additional neural network(s) 905 can be responsible for extracting landmarks (1005 see FIG. 10) from the objects 12 and/or regions 12 of interest in the image 16. For example, a neural network 905 detects a pothole 12, and then another neural network 905 will identify its topmost point, bottom-most point, leftmost point, and rightmost point, and return those in a coordinate format respective to the image 16, or in a coordinate format respective to the object/region 12 of interest.

Further, the neural network inference can be processed on the Device GPUa (in addition to the CPU 111a resident in the computing infrastructure 100). The neural network 905 can infer multiple classes 12 simultaneously. Further, one or more of the neural networks 905 can be simplified by approximating the neural network to floating-point numbers for the purpose of reducing the memory and processing requirements. Such reduced neural networks, sometimes known as Quantized neural networks, are then used on the Device 101 CPU 111a.

As discussed, the image processing instructions 905 can include utilizing sensor data 17 to interpret/decide upon objects of interest 12 and/or discard data 19. For example, sensor data 17 (such as GPS data associated with the images 16) can be used (as configured in the image processing instructions 905) by the device 101 (and/or server 107a) to discard a portion/whole image frame 16a,b,c,d from inclusion in the object data 21.

Figure 10:
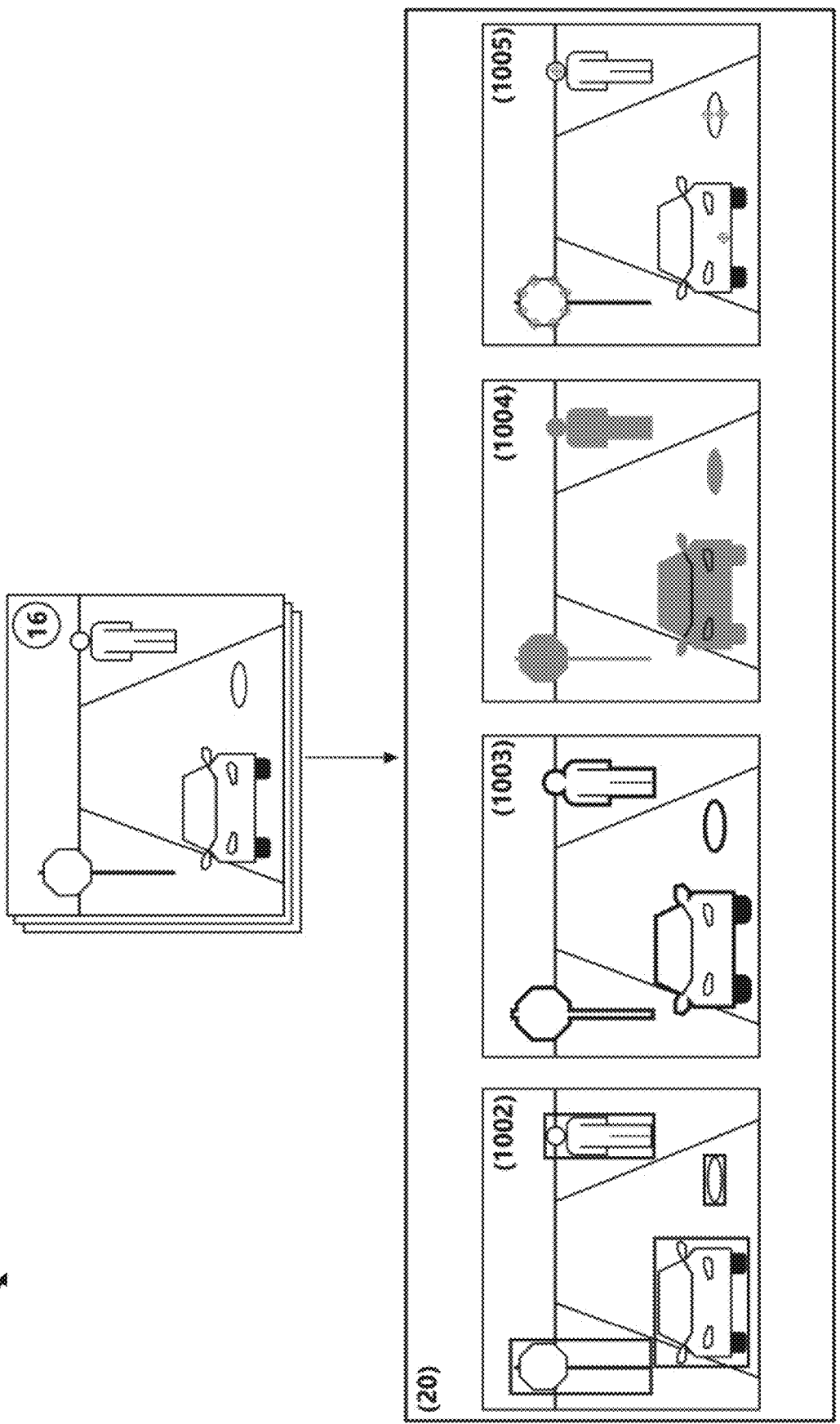
FIG. 10 illustrates different ways of identifying objects of interest using different neural networks of the system of FIG. 1.

Referring to FIG. 10, shown are example inference results 1000 obtained from the image processing instructions 905 (e.g. neural network(s) 905). Neural Network(s) Inference results 1000 of a processed image 16, including bounding boxes 1002, polygons 1003, masks 1004, and landmarks 1005 as part of the resultant processed image data 20. When the system 900 is processing an image 16 through a Neural Network 905, it returns inference results in the form of data 20. The data 20 is typically a list or array of things 12 it is trained to find, typically known as classes 12 and typically represented as a class id which can be correlated with a name (i.e. class 1 is person, class 2 is car, etc) and numerical score. The score typically represents the Neural Network's 905 confidence in the class 12 as identified in the image 16.

The Neural Network 905 can also provide additional information, per object 12, as to where the object 12 is found in the image 16 in the form of a Bounding Box 1002, which is typically a rectangle that is encompassing the object 12. The Bounding Box 1002 information could be provided in a variety of formats which could be used to construct a rectangle. For example, it could be two opposing coordinates (i.e. top left, bottom right) in the rectangle, or a center coordinate provided also with width and height parameters. The Neural Network 905 can also provide additional information, per object 12, as to where the object 12 is found in the image 16 in the form of a Polygon 1003, which is typically a series of connected points that are encompassing the object 12. The Polygon 1003 information could be provided in a variety of formats which could be used to construct it.

The Neural Network 905 can also provide additional information, per object 12, as to key features of the object 12 in the form of Landmarks 1005, which is typically one or more points which are expected to be present in the object 12. Landmarks 1005 could represent many things. For example, landmarks could represent lane markings 12 and edge 12 on a road. They could represent the top and bottom of a sign post 12. They could represent the top and bottom edge of a pothole 12. Neural Network(s) 905 can learn to identify any landmark(s) 12 in any object 12. The coordinates for the Bounding Boxes 1002, Polygons 1003, and Landmarks 1005 may be absolute pixel coordinates in the image 16 (in relation to top left corner of the image), they may also be relative to another point in the image 16. The coordinates may also be provided in the form of a fraction, or percent of the image 16, which could then converted to the pixel representation.

The Neural Network 905 can also provide additional information, per object 16, as to where it is found in the image 16 in the form of a Mask 1004, which is also known as instance segmentation. The Mask 1004 information typically maps, on a pixel level, which pixels in the image belong to a specific object 12. The system 900 can identify one or more object 12 types, or classes 12, in the same image 16, using one or more Neural Network(s) 905. For example, it may identify signs 12, potholes 12, people 12 and cars 12.

Since the system 900 facilitates automated incident 12 detection in the images 16, the Neural Network(s) 905 can have the option automatically (e.g. in the AI process 301) identify 307 incidents/objects 12, including such as but not limited to:
  (a) cracks, including some or all of the following crack types: longitudinal crack(s), linear crack(s), transverse crack(s), reflection crack(s), lane joint crack(s), widening crack(s), fatigue crack(s), alligator crack(s), crocodile crack(s), block crack(s), hair crack(s), edge crack(s), edge joint crack(s), slippage crack(s), and/or shrinkage crack(s). The cracks may be further differentiated by severity, such as the extent of the road to which the cracks apply and how wide the cracks are; and/or
  (b) deformations and/or distortions in the pavement, including some or all of the following: rutting, shoving, corrugation, depression, and/or upheaval; and/or
  (c) road repairs, including some or all of the following: asphalt patching, pothole patching and/or crack sealing; and/or
  (d) road damage, including some or all of the following: potholes, stripping or raveling.
  (e) street signage issues including some or all of the following: unreflective signs, bent signs, faded signs, obstructed signs, damaged signs, crooked sign, twisted sign, and/or vandalized sign; and/or
  (f) manhole issues, including some or all of the following: such as raised manhole, sunken manhole, and/or open manhole; and/or
  (g) drainage related issues, including some or all of the following: water pooling on pavement and clogged catch basins; and/or
  (h) pavement marking issues, including some or all of the following: faded markings, and unreflective lane markings; and/or
  (i) road obstruction issues, some or all of the following: debris on road, cadavers, and construction garbage bins/dumpsters which are obstructing the right of way; and/or
  (j) side walk issues, including some or all of the following: trip edges, cracks, chips, distortion and/or deformation.

In addition to identifying and reporting incidents 12 automatically in the AI process 301, the Neural Network(s) 905 can also infer in the process 301 for other purposes as well, such as but not limited to:
  (a) The Neural Network(s) 905 may assess environmental conditions which may affect the system functionality, including some or all of the following conditions: heavy rain, heavy fog, heavy snowfall, occluded windshield, daytime lighting conditions, night time lighting conditions, reflections on the windshield, and/or sun glare. The Device's 101 software 108 may then adjust its algorithm and parameters to optimize the system's performance under the identified environmental conditions. For example, an incident identified while the Vehicle's 102 windshield washer is in operation, the image would be discarded if the fluid spray blocked the field of view. Another example, if the road 14 is classified as completely covered in snow, pothole 12 detections would be excluded. The primary purpose of the environmental neural network 905 is to reduce erroneous incident occurrences, but it could also be used to report conditions and incidents. For example, if the road is covered in snow, it may be due the fact that the snow plows have not covered that road, which may be considered as an incident.
  (b) The Neural Network(s) 905 may assess the road 14 type in order to know which type of models, workflows, algorithms or Neural Network(s) 905 to apply. For example, the road 14 may be asphalt, concrete, gravel, dirt, trail or other types of roads.
  (c) The Neural Network(s) 905 may assess the road 14 conditions for the purpose of collecting road ratings for the roads which are travelled (such ratings may also be known as Pavement Condition Index). Examples of ratings may be a quantitative numerical value between 0 to 100, or a descriptive qualitative rating such as excellent rating, very good rating, good rating, fair rating, poor rating, fail rating, failed rating, failure rating, and/or other ratings descriptive of the pavement condition.
  (d) The Neural Network(s) 905 may identify object(s) 12 of interest representing assets which are in a good state, whereby the absence of those objects 12 over time may be an incident. For example, street signage (which can be damaged or dislocated by high winds), traffic signals (which can be out of order), street lights (which may be burnt), lane markings (which can fade). The presence of such objects 12 could be correlated with a GIS database and ruleset to generate absence incidents. If an asset has not been detected for a certain amount of time, it gets flagged in the system. For example, this could be used to indicate that a stop sign has potentially blown down due to high winds or that a speed limit sign has been obstructed by vegetation.
  (e) The Neural Network(s) 905 may identify object(s) 12 of interest representing object(s) which are to be redacted for privacy.

The system may, based on its programming, initiate and autonomous incident detection 307 process which would identify objects 12 or incidents of interest 12 and initiate the interactive image acquisition process 803a.

Figure 11:
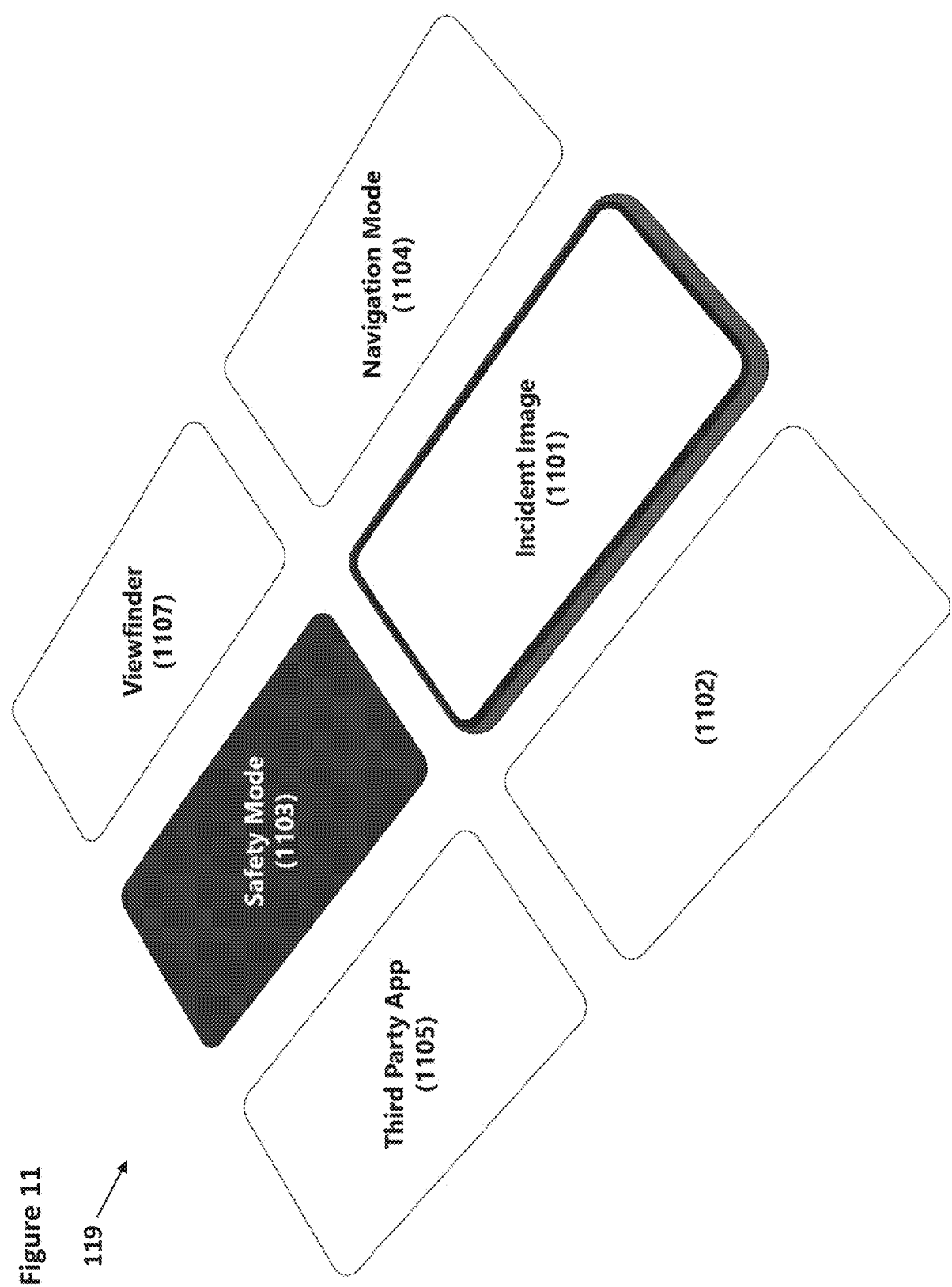
FIG. 11 shows different kinds of information on a display of the device of the system of FIG. 1.

Referring to FIGS. 11, 13 shown are example display options for a user interface 119a including view options such as an incident image 1101, user interface 1102, viewfinder 1107, safety mode 1103, navigation mode 1104, and a background mode allowing third party apps to run 1105. The device 101 can have a user interface 119a which may be integrated or external. For example, a smart phone or a smart camera 101 can have an integrated display 111 whereas an embedded computer 101 may or may not have it, depending on its configuration. The device's 101 software 108, depending on the programming, may display different options.

The device 101 may have a user interface 1102 screen that will allow the vehicle's 102a operator to choose different options pertaining to the operation of the system 10, 10'. The user interface and its settings, options and/or menus can be accessible through a touchscreen, built in button and/or a remote control. Typically, when the device 101 is initially installed or operated in a vehicle 102*a*, a viewfinder 1101 option will be enabled, which will allow the vehicle 102*a* operator to know that the device's 101 cameras 500 are aligned properly. The display 111 of the device 101 can be configured to minimize the distraction to the driver by turning off the screen or by displaying a warning message to not operate the device 101, when the vehicle 102*a* is in motion or even by disabling the user interface to prevent driver from interacting with the device when the vehicle 102*a* is travelling faster that a configurable threshold.

The display 111 can also be configured to assist the driver during operation by displaying a navigation 1104 screen. The navigation screen 1104 may show the device's 101 current position, and/or highlighted routes of roads 14 to patrol via a map interface 1104. The device's 101 software 108 may also run as a service in the background of the device 101, allowing a third party application 1105 to run on the device 101 while the software 108 is running in the background. For example, once the software 108 is started, other applications related to navigation, automated vehicle 102*a* location, work order management, dashcam video recorders, and other applications could be launched in the foreground. The third party applications may be launched by the software 108 and/or by the device's 101 operator.

Figure 12:
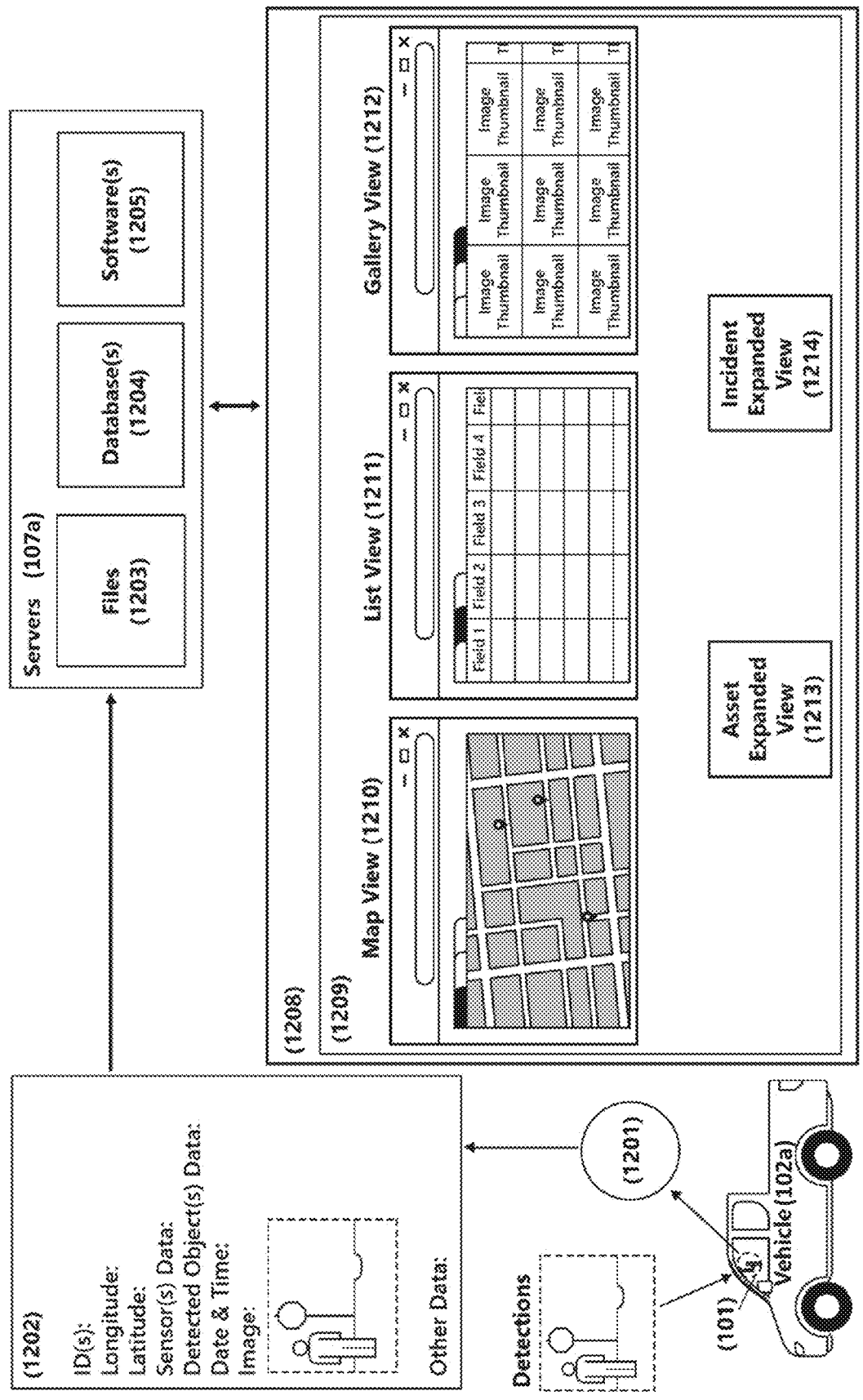
FIG. 12 shows automated incident identification reporting to users of the system of FIG. 1.

Referring to FIG. 12, shown is an example incident/object 12 identification and reporting operation 1200. Depicted by example is Vehicle 102*a* equipped with a Device 101. The Device 101 identifies object(s) 12 of interest which are to be reported 1201. The Device 101 then transmits data 1202 to the Server(s) 107*a*. The Server(s) 107*a* have files 1203, one or more database(s) 1204, and Software(s) 1205. The Server (s) 107*a* communicate with Client(s) 1208 (which may be the devices 101 or separate computing devices with a browser or software that provides access to the system 1200) which allow users to handle the incidents 12 using a user interface 1209 which may present the incidents 12 in a variety of ways including a map view 1210, list view 1211, and gallery view 1212. Object(s) 12 of interest identified and reported 1201 pertains to possible inference results (e.g. resultant processed object data 20, 20' and associated sensor data 17) as described in further detail in FIG. 10—Neural Network(s) Inference Results 1000.

Further, for example, data transmitted 1202 illustrates what typical incident data 12 contains, which can include some or all of the following:
 (a) IDs, which may include the Device 101 ID, image ID, detection ID, user ID, and/or other ID's allowing to associate the data;
 (b) Longitude: east-west position of a point on the Earth's surface. Different countries may use different names or system to describe the point;
 (c) Latitude: north-south position of a point on the Earth's surface. Different countries may use different names or system to describe the point;
 (d) Sensor(s) Data 17: described in greater detail with respect to FIG. 7—Sensors 700;
 (e) Detected Object(s) Data: described in greater detail in Neural Network(s) Inference Results 1000;
 (f) Date & Time: a date and time signature pertaining to the time and date that the incident was identified;
 (g) Image: a picture of the incident capture by the Device's 101 camera(s) 500. The image may be redacted; and/or
 (h) Other data: Other data pertains to other data that may be derived by the Device's 101 software 108 from its configuration, settings, sensor(s), database(s). For example, the direction to which the Vehicle 102*a* is travelling may be determined based on the Device's 101 sensors 700. Other examples of other data may include the road segment on which the incident was obtained, or the direction that the Vehicle 102*a* was facing, or a geo-zone in which the incident was obtained.

In view of the above, the incident data 21 is transmitted to the Server(s) 107*a* where it is processed by the Server(s) software(s) 1205 and organized and stored in database(s) 1204. Some data, such as uploaded incident images 20, 16 containing the incidents 12, may be stored in the form of Files 1203. The server 107*a* also provides for client(s) 1208 to securely log in to access a user interface 1209, which may be either a web application that can be accessed using a web browser or a client/server application that uses physical installation to a computer or a smartphone 101. Through the user interface 1209, clients can view incidents 12 detected by the device 101, which have already been uploaded to the server 107*a*, which can be visualized in a variety of ways, such as but not limited to:
 (a) a Map View 1210 which depicts a map, along with pins representing detected incidents and known assets;
 (b) a List View 1211 which depicts a table along with fields related to each incident; and/or
 (c) a Gallery View 1212 which depicts a gallery of incidents in the form of clickable images.

Further, by example, users can click on the pins to display more information 1214 about the incident 12 such as image, details of the detection, severity, the date and time the detection occurred. Through a click of a button, the detected incidents 12 can also be presented in a gallery view layout, where a thumbnail image of each incidents can be presented in a grid.

Client(s) 1208 pertains to software that is used to access the system 10. It can typically be a web browser, but it may also be a dedicated desktop application and/or a smartphone app. The Client(s) 1208 user interface 1209 may have different views to present the data the user. For example, when selecting the incident 12 or asset for which it is related in the appropriate view, more information is displayed to the user.

The Server(s) 107 may process the information (object data 21) in a variety of ways, for example, the Server(s) 107 can also associate incidents 12, through their GPS coordinates, to a road 14 network segment, which is a representation of a segment of a road 14, which typically includes geospatial and descriptive data, such as points, features and other fields—for example the class of the road (highway, local, regional), the street name, and/or the address range which it covers. Road segments are typically extracted from a geospatial database such as a shape file, KML file, KMZ file, XML, GML and/or other such popular formats used for the modelling, transport and storage of geographic information.

The Server(s) 107 may also have an asset database, particularly for road signs, manholes, and catch basins, where the GPS coordinates, direction of travel and type of asset are logged in for every detected asset when they are detected on the Device 101. This database can be used for inventory purposes or as a list for manual inspections.

The GPS coordinates 17 and sensor information 17 of the incident 12 or asset may further processed on the server to determine additional insights, including some or all of the following:

1) Nearest address;
2) Nearest road intersection; and/or
3) Nearest major road intersection.

It is recognised that the server 107a can be a physical server connected to the internet 18. Alternatively, the server 107a is a virtual server connected to the internet 18, and whereas it may be hosted on one physical machine or on a server cluster. Alternatively, the server 107a is cloud based and connected to the internet 18.

Referring to FIGS. 1, 13, a further embodiment of the system 10, 10' is shown that is designed to remotely acquire images 16, 117 (hereafter referred to as images 117) and related data 17, 20, 118, 119 (hereafter referred to as data 118, 119) of road related incidents 12 (see FIG. 1 and related described examples) from a device 101 intended for use in a moving vehicle 102a utilizing software 108 (including artificial intelligence modelling 905—see FIG. 9). The AI device 101 can utilize image processing 906 functions of the software 108, including using machine learning models (further described by example below) to automatically detect objects of interest within an images 117, as well as perform other inference operations such as but not limited to, classification, image segmentation, or other actions related to image based artificial intelligence. Certain embodiments of the present invention can relate to controlling a series of processes in the AI device 101, with respect to acquiring of the images 117, identification of objects(s) of interest, and/or the acquiring of the sensor data 118.

Further, in some embodiments, a trigger module 112 can be used remotely control device 101 operation using a set of commands (e.g. trigger signal 124) exchanged between the AI device 101 and the trigger module 112. In some embodiments, voice commands 116 in the form of vocalized words or phrases can control the device 101 operation. In any event, it is recognized that the use of the trigger module 112 (for trigger signals 124) and/or voice commands 116 can be used to augment the operation of the software 108 used to automatically detect the object(s) 12 of interest in the acquired images 117, i.e. utilizing the interactive incident acquisition process 803a (see FIG. 15)

As further described below, with relation to signals 124, 116, the AI process 301 uses the AI algorithms 905 to process the images 117 as acquired by the camera 107. The interactive interactive acquisition process 803a can be used by the operator to manually input or otherwise augment the incident data 120 autonomously detected 307 by the camera 107 and associated AI processing 905.

The system can utilize the device 101, designed to automatically collect images 117 from the device's camera 107, additional data 118 from the device's sensors 105, as well as additional data from the device's 101 operator (i.e. augmentation of the software operation 108) using the external trigger signal 124 and/or voice command/signal 116. The device 101 processes the incident data 120 (including the data 117, 118, 119 for example), in a workflow (see Examples in FIG. 9, 15, 16) for the purposes of conducting inference on the data 120, using artificial intelligence algorithms 905 of the software 108. The artificial intelligence algorithms/methods 905, in the form of software algorithms, can be deployed directly on the device 101 and utilize the device's 101 hardware (e.g. Volatile Memory 103, Non-Volatile Memory 104, CPU 106, GPU 110) in order to perform inference on images 117. Any or all of the software 108 pertaining to image 117 processing can also be deployed on remote server(s) 123, where the system 10, 10' can utilize cloud computing infrastructure in order to perform analysis on the acquired incident data 120.

Accordingly, the device 101 and associated software 108 performs the automated acquisition process 307 in order to generate the incident data 120. However, the operator can augment the content of the incident data 120, via implementing the interactive acquisition process 803a using the trigger signals 124 and/or voice command 116 signals, in order to provide supplemental incident data 117, 118, 119 as part of the incident data 120, as further described below (see FIG. 15).

Referring to FIGS. 1 and 13, the device 101 is affixed to the vehicle 102a travelling along the road 14. When in operation, the device 101 is typically configured to collect visual information of a scene in the form of digital images 117, and processes the image data 117 using the appropriate algorithms and methods 905 typically associated with computer vision tasks. Examples can include some or all of the following, in a workflow or independently: cropping, resizing or rescaling, transformation, image classification, object detection, semantic and instance segmentation, scene reconstruction. The device 101 can also process associated data such as data 118 acquired from other sensors 105 or from the operator via voice commands 116 or a trigger signals 124 in its software 108 workflows, via using the interactive acquisition process 803a.

The components that make up the device 101 are typically inclusive of a central processing unit (CPU) 106 and/or graphics processing unit (GPU) 110, memory including high speed volatile memory 103 and low speed non-volatile memory 104. All of which facilitate the device's 101 execution of the software 108 instructions (e.g. AI algorithms 905). Examples of software 108 types that could be present on the device 101 include operating system(s) software, drivers for the various hardware interfaces, software applications, databases, and software modules which may include image processing instructions, AI libraries, text to speech software. The device's non-volatile memory 104 can be used for storing these software 108 instructions necessary for operation, along with storing associated files necessary for operation. Such files may include operating system files, component driver files, application files, database files, configuration files, log files, media (such as images, audio, and video clips), and other files. The device's 101 operating system can include Windows operating system, Android operating system, Linux operating system, or other operating systems. The above are some example of types of software 108 and software 108 files which are associated with different embodiments of the device 101, but other types of software 108 and software 108 files may also be present.

In one embodiment, the device 101 can be packaged in a housing such that it contains all of the components of the device 101, whereas in other embodiments some components may reside outside of the housing and connected via common interface connector or using a wireless connection. The device 101 can be suited for mobile operation in a vehicle 102a and be installed in a manner that facilitates ease of transfer between separate vehicles 102a. Electronic devices 101 that may be suitable for use can include currently of the shelf smart phone devices, smart camera, or embedded computer systems. Smartphone 101 devices can include currently available phones including Samsung Galaxy S-series phones, Samsung Galaxy A-series phones, Samsung Note phones, LG G-series phones, iPhone 11 models, and can include the majority of modern models of smartphones, and future models thereof. Further, the device 101 may be a smart-camera 101 capable of executing instructions related to machine learning algorithms, including artificial intelligence neural networks 905. Devices 101 can include those containing chipsets supportive of processing highly parallel operations, such as devices containing large graphics processing units (GPU), and/or neural processing units (NPU), and/or Tensor Processing Units (TPU). Examples of chipsets include, Intel Movidius, Nvidia CUDA, Texas Instruments Sitara, Qualcomm Adreno series, etc.

The device 101 can be equipped with one or more camera(s) 107, and/or different types of cameras 107 to acquire incident images 117 while travelling along a road surface. The camera 107 or cameras 107 can be contained internally or externally, in relation to the device 101. In the case of external camera(s) 107, the device can interface with the camera 107 by use of a wired or wireless interface. Examples of types of cameras 107 include, telephoto, wide angle, infrared, thermal cameras 107, or camera 107 able to otherwise operate at different focal lengths, resolutions, shutter speeds and light spectrums. Different camera imagers 500, 107 (see FIG. 5) can be used for different use cases. Further, the device 101 can utilize multiple cameras 107 simultaneously, including one or more contained internally or externally. In some cases, different cameras 107 can be used under different circumstances. For example, at night when lighting conditions are poor, the device 101 can switch cameras 107 to one that is optimized for night vision. This can be done by the use of software 108 controls, based on a schedule (e.g. sunset timer), image parameters (e.g. exposure and/or brightness), or a sensor 105 (e.g. light sensor). Camera 107 may also be switched manually by a system user selecting a certain camera 107 mode based on the desired setting.

The device 101 can include a display 111 for displaying relevant visual information to the user, which may be integrated into the device 101 or provided externally. Additionally, the display 111 interface may be coupled with a user interface 119a allowing users to configure different options or settings pertaining to the operation of the system 10, 10'. The user interface 119a and its settings, options and/or menus can be accessible through a touch screen, built in button or button(s), gestures, and/or remote control. In initial installation of the device 101 in a vehicle 102a, typically a viewfinder option may be enabled, allowing the user to check alignment of the device's 101 camera 107 with respect to the road 14. The device 101 display 111 may also show notifications about incidents which are manually tagged by the device 101 operator, during operation of the software 108 (and associated AI algorithms 905) via the manual acquisition process 803a, as the vehicle 102a is travelling along the roadway 14.

The device 101 can include audio interface(s) 102 for acquiring and processing audio data 116 (voice commands) pertinent to the function of some embodiments of the current system 10, 10'. Audio processing is used for utilizing voice trigger capabilities for voice commands 116 in order to trigger a response within the software 108 to manually initiate a triggered incident data 120 acquisition process 803a. A microphone 125, coupled to the audio interface 102 can also be used for functionality of the process. Depending on the embodiment, a pre-amplification circuit (not shown) can be integrated into the device audio interface 102, or into the microphone 125. The microphone 125 can be embedded in the device 101 or connected externally. The device 101 may also include an internal or external speaker 126. The speaker 126 can be coupled to the audio interface 102. The audio amplifier can be integrated into the device 101, the speaker 126, or an enclosure including the speaker 126. The speaker 126 could be used to provide audible confirmations to the device 101 operator, to indicate whether an incident was captured successfully, as directed by the operator using the triggered operation (e.g. interactive incident acquisition process 803a). Audible confirmations can be a pre-recorded sound, such as a camera sound or a recorded sound of a person. It may also be a text to speech indication, in which the device 101 would be speaking to the operator.

The device 101 can store acquired incident images 117, sensor data 118, and operator metadata 119 into a storage medium 104 prior to transmitting to the server 123. It can do so to optimize power or data usage, or simply to queue data in the case that a reliable network 121 connection isn't available. Appropriate storage mediums for the task can include various forms of non-volatile memory 104. The acquired data 120 can be stored temporarily in the non-volatile memory 104, and deleted once successfully uploaded to the server 123. Furthermore, storage functionalities can include storing files associated with operating system(s), component drivers, application(s), media, and a plurality of other files associated with software applications. Acquisition images 117 stored on the non-volatile memory can be stored in various file formats, including JPEG, Bitmap, WebP, PNG, and other common image formats. Data 118, 119 acquired from the various sensors can also be stored in various file formats, including CSV, XML, JSON, in software databases or other formats for storing data 120. The non-volatile memory 104 can be embedded within the device's 101 housing, or in the form of add-on storage that is connected to the device 101 or inserted into storage slot(s) provided by the device 101. Examples of different types of non-volatile storages 104 currently popular with embedded systems include hard drives (whether disc based or solid state memory), and memory cards (such as microSD). Other types of non-volatile storage 104 may be used if the device 101 interfaces support it.

The device 101 can include a mounting component 103a, which couples the device to the body of a vehicle 102a, such that the imager 107 of the device 101 has a viewpoint of the road surface 14 and any desired adjacent surroundings 13. Typically, the device 101 has the option to be mounted on the vehicle's 102a windshield, dashboard, side windows, back window, roof, or frame. The device 101 may be mounted in the vehicle 102a or external to it. The mounting component 103a can have different configurations intended for use in different vehicle 102a types or even different device 101 configurations. For example, utilizing different a different mounting component 103a if the device 101 is a smartphone, smart camera, or embedded computer equipped with external camera(s) 107.

The artificial intelligence device 101 typically includes software 108, 905 configured to perform tasks useful in computer vision inferencing, but also for other artificial intelligence processing, such as sensor data analysis and audio transcription. The software 108, 905 can utilize various algorithms and models suitable for these types of tasks, by configuring the software 108, 905 to execute the necessary algorithms in certain sequential processes, and/or parallel processes. The device's 101 memory 99, 104 can be loaded with algorithms, and models, where the software 108, 905 is configured to run machine learning models, including artificial neural networks or other types of inferencing methods utilizing artificial intelligence 905. The device 101 may include common wired and wireless interfaces which can facilitate it to connect to a plurality of external components.

[Trigger]

Referring to FIG. 13, the trigger module 112 can be packaged in a housing such that it contains all of the components of the trigger module 112. The components comprising the trigger module 112 can include a microcontroller 113 and/or integrated circuits 113, used for monitoring the trigger module's inputs 114. If an input 114 (e.g. touchscreen, dedicated buttons, etc.) has been activated, then the microcontroller 113 executes a set of instructions to send a trigger signal 124 through the trigger's communication interface 115 to the AI device 101 that initiates the interactive incident image/data process 803a.

[Voice Activation]

It is recognized that incident reporting can take place by use of voice commands 116. In order to trigger the device 101 to capture incident images 117 and related sensor data 118, the physical triggering mechanism 112 could be replaced altogether or otherwise substituted on a case by case basis, by triggering the process 803a using predefined speech commands 116. The AI device 101 can have an audio interface 102 with audio input and output capabilities. The audio interface 102 can comprise an analog to digital converter used for processing analog voltage signals, from a microphone 125, into digital data, where it can be further processed. It can also comprise a digital to audio converter used for processing digital data into analog voltage signals, where it can be processed by a speaker 126.

The device 101 can be equipped with a microphone 125 for processing audio inputs 116. The microphone 125 can be internal or external in relation to the device 101, and can be comprised of different microphone 125 technologies. For example, it can be comprised of microphone 125 technologies such as dynamic, electret-condenser, MEMS, or other types of microphones 125 used to process audio into analog signals. The speaker 126 can be internal or external in relation to the device, and can be used to transmit audio signals sent to it by the device 101. The speaker 126 can be comprised of various speaker 126 technologies such as, an electro-dynamic speaker, piezoelectric speaker, MEMS speaker, or other types of speakers used to transmit analog audio signals. The speaker 126 and microphone 125 may have additional circuits or converting digital to analog or analog to digital signals (not shown).

Audio commands 116 can come in the form of predefined human speech commands 116 that is captured by the microphone 125 and processed through software 108 algorithms on the device 101. For example, a predefined speech command 116 can include the expression "Incident 1" that will cause the device 101 to perform the same action as activating a dedicated "Incident 1" input 114 via the trigger module 112. This voice/trigger activated action (of the device 101) could include some or all of the following steps: capturing the incident image 117, and relevant sensor data 118, tagging 119 the image 117 with "Incident 1", processing the image through the AI model 109, storing the incident data 120, and then sending incident data 120 to the server 123. The manual incident tagging 119 via voice commands 116 or signal 124 may be a separate process that the automated one all together (meaning no AI image operations 905 are done), or used in conjunction, before or after the AI 905 process such that the induced action (of the device 101 as caused by trigger 116, 124) is used to augment the incident data 120 collected via the autonomous process 307. The same process 803a could also be executed using the command 116 "road damage", or "road hazard", or any other collection of words in human language. The actual command 116 used for triggering the process 803a can be the same as the word used to tag 119 the image 117, or the words can be different. For example, the predefined command "Alpha" can execute the process 803a, but the image 117 can be tagged 119 with "stop sign damage". In this way, the operator can utilize the trigger signal(s) 116, 124 to initiate manual incidents capture 803a, or alternatively, augment, via the process 803a, the automated process 307.

Multiple speech commands 116 can be used to trigger the above process 803a, as well as the predefined command 116 words can be configurable by the user. The user of the system 10, 10' can choose from a list of words in their language of choice, but the amount chosen to be used as commands 116 can be limited as to not have the device 101 trigger the process 803a based on every word it picks up. The chosen words/phrases to be used as trigger commands 124, 116 can correlate or not correlate with the tags chosen for each input on the physical trigger module 112. For example, the same tags 119 assigned to each input 114 on the trigger module 112 can correspond to the predefined commands 116 chosen to trigger the process 803a and tag images 119. Alternatively, the tags 119 assigned to each input 114 on the trigger module 112 can be different from the predefined commands 116.

The voice command 116 functionality can be configured to be used in conjunction with the physical trigger module 112. For example, the input 114 on the trigger module 112 can be activated to initiate the incident image capturing process 803a, while the incident tag 119 is taken from the voice input 116. The voice input 116 can be processed by the speech recognition software 108 in order to extract the exact word or phrase, with the extracted word/phrase tagged 119 with the incident data 120. The words/phrases can be predetermined, or not predetermined and include any word/phrase in the user's language, since in this embodiment, the process 803a may be initiated when the physical input 114 on the trigger module 112 is activated.

The device's 101 audio interface 102 and software 108 can be configured to constantly process incoming audio 116 from the microphone 125 while the system is in operation. The devices 101 software 108 can utilize speech recognition algorithms in order to recognize whether a command 116, from the list of predefined commands 116, has been vocalized. An activation command 116 may also be setup, whereas the activation command 116 is an uncommon word or phrase, which would then notify the device's 101 software 108 to expect a follow up command 116. For example, saying "Hey ROVER, [activation command] tag shoulder drop off [incident command]'". The activation command 116 may be processed together with the incident command 116, or separately. If a command 116, in the form of an audio signal, is recognized by the software 108 algorithms used to recognize speech, then the incident image capturing process 803a will be initiated. If no command 116 is recognized, then the device 101 continues its regular operation 301. The choice of speech recognition algorithms can be a variety of models, methods and algorithms or natural language processing applications. It can include statistical methods, audio processing functions, machine learning, deep learning, and neural networks.

Alternatively, speech recognition can be performed through the remote server 123, subsequent to the device 101 transmitting audio command data 116 to remote server 123 over the chosen network 121. Speech recognition algorithms deployed on the server 123 can be configured to perform inference on the incoming audio command data 116 and return a response with the recognized word or phrase, which would then be incorporated as part of the workflow of the process 803a. The device 101 can further use the returned statement to make a decision on whether the command 116 is valid and initiate the process or whether to ignore the command 116.

In another embodiment, a hybrid function could be used, whereas the device 101 would recognize an activation command 116 (for example, "hey ROVER") using the device's software 108, after which it will record an audio clip 119 of the user command 116 to be sent to a remote server 123 for processing, and get in response a word or a phrase 116, which would be used to tag 119 the image (if the result is valid).

In another embodiment, it could also simply store the audio clip 119 with the incident data 120 to be transmitted over the network 121, and be processed and stored or discarded directly on the server 123.

[Network Interface]

The device 101 can include a network interface 122, used to communicate with and transfer data 120 to the server 123 over a network 121. The network interface 122 may be contained internally or externally, and can interface with the device 101 via wired connection or wireless connection. It can be used to communicate with the server 123 over a cellular network 121, wireless LAN 121, and/or wireless WAN 121. In the case of a cellular network 121 connection, the interface can utilize technologies such as 3G, 4G, LTE, 5G, or other technologies used to access cellular towers. Further, it can operate at common frequencies such as 2.4 ghz, 5 ghz, or other common frequencies associated with IEEE 802.11 or other wireless standards. The network connection provides for communication with the server 123 on a constant, frequent or periodic basis, allowing acquired incident data 120 to be transmitted as network communications take place. The device's 101 network interface 122 can utilize cellular networks 121 in scenarios where cellular network 121 connections are readily available, when cellular data costs are not prohibitive, when faster incident uploads are required, and/or when the device 101 has no access to other wireless networks.

Furthermore, the device 101 can upload acquired incident data 120 intermittently when a connection is not accessible. For example, the device 101 can include non-volatile storage 104 that can store the images 117, sensor data 118 and incident metadata 119 temporarily and when a connection is available, send the data 120 through the network 121 to the server 123. Some users may choose to only use wireless LAN connectivity in order to forgo cellular networks to save on data 120 costs. In this case, acquired incident data 120 could be stored until the device 101 has access to a wireless access point connected to the internet. The device 101 can be configured to transmit data 120 at a scheduled rate, in order to benefit from improved performance, power consumption, and/or heat management.

Additionally, images 117, sensor data 118, and metadata 119 may be processed to be more optimized for network transmission, which may include format conversion, compression, and/or encryption. Data 120 may be temporarily stored on the device 101 in the event that a network connection 121 is unavailable. In the event that a network connection 121 is available, transmitting the data 120 for further processing, storage, access and control. In some embodiments, acquired images 117 can be further processed where the image processing instructions 905 are configured to automatically detect and redact objects in the images 117 pertaining to personally identifiable information, e.g. people, cars, and/or license plates 12. These image processing instructions can be performed directly on the device 101, utilizing its AI functionality 905, or performed on the server 123 once the images 117 have been uploaded.

[Sensors]

Referring to FIGS. 7, 13, the device 101 can be equipped with a variety of sensors 105, 700 which may be contained externally or internally in relation to the device 101. The types of sensors 105 can be comprised of motion sensors, position sensors, environment sensors, location sensor, and other sensors commonly utilized in smartphone devices or embedded camera systems. The location sensor 105 can be used to obtain location data 118 which can be used to determine precise coordinates in regards to where incidents occurred. Location sensors 105 provide location based information using satellites such as GNSS, GPS, Glonass, Galileo, and in some cases cellular towers in order to determine positioning data of the device 101. The sensor data 118 is usually processed by the software 108 prior to being sent to the server 123. Further, the sensor data 118 along with the acquired images 117 can be stored on the device's 101 non-volatile memory 104 in the form of file or database entries prior to transmission to the server 123. In addition, the device 101 may contain additional sensors 105, which provide data 118 that can be used to determine device acceleration, orientation, magnetic pole, velocity, shock, vibration and other data 118 related to position and motion. An accelerometer 105 would be an example of a motion sensor 105. It can be used to measure acceleration applied in the x-y-z axes. A gyroscope 105 is another example of a motion sensor that may be utilized, where the gyroscope 105 can be used to measure the rate of rotation about the x-y-z axes. A rotational vector sensor 105 is an example of a position sensor that can be used to measure a wide range of motion-related tasks, such as detecting gestures, monitoring angular change, and monitoring relative orientation changes. The device 101 may also include a magnetometer 105 as an additional position sensor. It can be used to determine the device's 101 position in relation the magnetic north. Other sensors 105 can include sensors 105 such as environment sensors 105 that typically monitor environmental properties, such as ambient temperature, device temperature, light and humidity. Such sensors 105 can also be useful for monitoring the hardware and/or operating environment of the device 101.

Any and all of the aforementioned sensor data 118 can then be associated with images 117 acquired by the device's camera(s) 107, in order to obtain additional insights. In many cases the acquired data 118, 119 will need further processing to obtain the necessary information about an incident 12. For example, geo-positioning of an incident of interest 12 based on where the image 117 was acquired, vehicle speed, and/or zoning location. The sensors 105 and camera(s) 107 provide data 118, 119 to be initially processed by the software 108, then transmitted to the server 123 or stored temporarily on the device's non-volatile memory 104 if a network connection 121 is unavailable at the time. The data 118, 119 may be stored as file(s) 123 in variety of formats such as xml, csv, txt, or in a proprietary format. The data 118 may be stored in a database, as well as stored and transmitted in encrypted or non-encrypted format. The incident data 118, 119 and images 117 may be further processed on the server 123 using additional processing instructions deployed on the server 123 including, correlation with road segments, inspected roads and/or assets, and other useful information. An accelerometer (motion sensor), magnetometer (position sensor), and location sensors could be used by the software 108 to determine the vehicle's 102a direction of travel, which can be used to determine which side of the road 14 a vehicle 102a is travelling on when an incident 12 is acquired. It can also assist in determining more precise incident location in relation to the device 101 or vehicle 102a.

[Vehicle]

The system 10, 10' is intended to be used in a moving vehicle 102a operated by the user. The device 101 is typically mounted to the structure of a vehicle 102a using a mounting component 103a, such that the device's camera 107 has a viewpoint of the road surface 14 including adjacent surrounding 13 (e.g. roadside, sidewalk, overhead). During operation, the device 101 performs inference on an incoming stream of images 117 obtained from the connected camera 107. Based on results of the inference operations (typically performed using image processing and AI/machine learning models 905) of the incoming images 117, the device's 101 preconfigured software 108 determines whether to discard an image 117 or keep it, where it can be uploaded to a server 123 for further storage, access and control. In addition, the device's 101 software 108 may also utilize sensor data 118, trigger data 124, or voice command 116 data in order to determine whether to discard an image 117, or bundle it into incident data 120 for storage and transmission to the server 123.

In many cases, the vehicle 102a can be operated on behalf of an organization which can be governmental, quasi-governmental or a private company. It can also be used voluntarily by individuals as a crowd-sourced application. Examples of governmental organization include all levels of government, including national, federal or republic governments; provincial, territorial or state government; municipal government, including municipalities, upper tier local governments, or lower tier local governments. The governmental organization may also be a special organization, such as a reserve, resort, or other names that are used to describe local governments of a certain geography or population. Examples of quasi-governmental organization would be government-owned or supported organizations. Those could be organizations established as part of a public-private partnership or a concession to build, maintain and/or operate an asset or a service over a period of time. They could be separately incorporated but the government may have full ownership, majority ownership, or minority ownership. Example of quasi-governmental organizations include toll road concession companies, bridge concession companies, transportation and/or transit authorities, and/or utility or telecom companies. A private company can simply be a private company that is the owner of the asset that is to be inspected, or contracted on behalf of the owner to do so. The vehicle can be a service vehicle dedicated to patrolling an area for the specific purpose of identifying incidents/objects on behalf of the organization. The vehicle 102a can be a car, truck, van, golf cart, tractor, ATV, bicycle, e-bike, motorbike/motorcycle, snowmobile, or customized utility vehicle. For example, the vehicle's 102a primary purpose can be something other than acquiring incidents 12.

[Software]

It is recognized that the software 108 is an integral part of the system, implementing a plurality of instructions necessary for operation of the system. The software 108 can facilitate various instructions that make operation of the system more accessible users. For example, the software can facilitate for field of view adjustments. The field of view adjustment can be optical zoom adjustment, if supported by the peripheral camera 107 of an embedded computer system. If further magnification is required to calibrate the camera's 107 field of view, the digital zoom level can be adjusted through the software 108 to achieve the desired optimal field of view. The software 108 may facilitate selecting from a variety of internal camera(s) 107 or external camera(s) 107 in order to adjust the field of view. Different fields of view may be optimal for different use cases on vehicles 102a. As well as different fields of view dependent on the type of incident or object 12 being acquired, for example signs may require wider field view, opposed to road defects 12 requiring narrow field views. The software 108 may utilize different trigger inputs 114 or voice commands 116 for different camera(s) 107.

Multiple processing steps in the form of software instructions 108 can take place for the purposes of cleaning, filtering, cropping, adjusting, scaling and/or other instructions used for processing images 117, sensor data 118 operations or metadata 119 generation. Acquired images 117, sensor data 118, and metadata 119 are typically processed by the device 101 prior to resultant data 120 being transmitted 121 to the server 123. Where the server 123 may implement further processing instructions on the incoming data 120, prior to subsequent storage on the server 123. It is recognized, that the software instructions 108 can be an embodiment of the device 101, the server 123, or a combination of both server 123 and device 101. The device 101 and server 123 can have different variations, configurations, and/or parameters relating to the operations taken.

The software 108 can include image operations and AI instructions 905 for image processing and AI inference, as well as workflows for the image 117 processing capabilities and neural network(s) 905 inference operations. Some examples of inference operations include object detection, image classification, and instance segmentation. The AI and Image processing operations 905 can further analyze images 117, whether acquired under the trigger 112 or voice command 116 or regular device 101 operation to redact or discard certain image 117 data. The workflows may include temporary storage of the image 117 on the device's non-volatile memory 104, whether redacted or unchanged, prior to transmission to the server 123. It is recognized that the workflows can include a plurality of different combinations or number of operations in any order, as configured, in order to image process, as well as use AI to identify, classify, and segment any objects in the images 117 under consideration.

The software 108 may facilitate cropping portions of an image 117. This can be used for extracting parts of an incident image 117 that can contain personally identifiable information, extracted by additional image processing and/or inference activities. For example, a car 12 can be detected by a neural network 905 and then cropped from the image 117. The cropped car 12 may then be either redacted or processed through a neural network 905 that is trained to identify license plates 12 in a picture. Operations related to other forms of redaction such as object 12 redaction and/or image redaction are also considered image processing operations as performed by the software 108 and related instructions.

Referring to FIG. 9, in the case of images 117, the variety of image processing and AI neural network(s) 905 operations may be organized in workflows. Some embodiments of sample workflows that may be configured are workflows which may include neural network(s) 905 that may be utilized as a detector that typically identifies an object of interest 12 in image(s) 117 and location of the object 12, in the form of a bounding box. The detector may also provide a score, typically known as confidence. The neural network(s) 905 can also be utilized as a classifier. A classifier has a list of potential classes, or object types, in which it is trained to identify in a picture. A classifier typically returns a list of potential objects in the image 117 sorted by the models confidence. The neural network(s) 905 can be utilized as a segmentor. A segmentor typically segments image(s) 117 into regions. The regions are then typically predicted to belong to a certain class, or type. The neural network(s) 905 can be designed and/or optimized to be used on the device's 101 GPU 110, CPU 106 or both. The workflows may utilize one or more neural network(s) 905 and the networks may be used in sequence. One neural network 905 can be responsible for detecting objects 12 and/or regions of interest in the image 117, and an additional neural network 905 responsible for classifying detected objects 12. One neural network 905 can be responsible for detecting objects 12 and or regions of interest in the image 117, and one or more additional neural network(s) 905 is responsible for detecting additional objects 12 and/or regions of interest in the already detected area of the image 117. For example, one neural network 905 detects a car 12 and then another neural network 905 detects license plates 12 on the cars 12. One neural network 905 can be responsible for detecting objects 12 and/or regions of interest in the image 117, and additional networks 905 responsible for extracting landmarks from objects 12 and/or regions of interest.

[Server]

Figure 14:
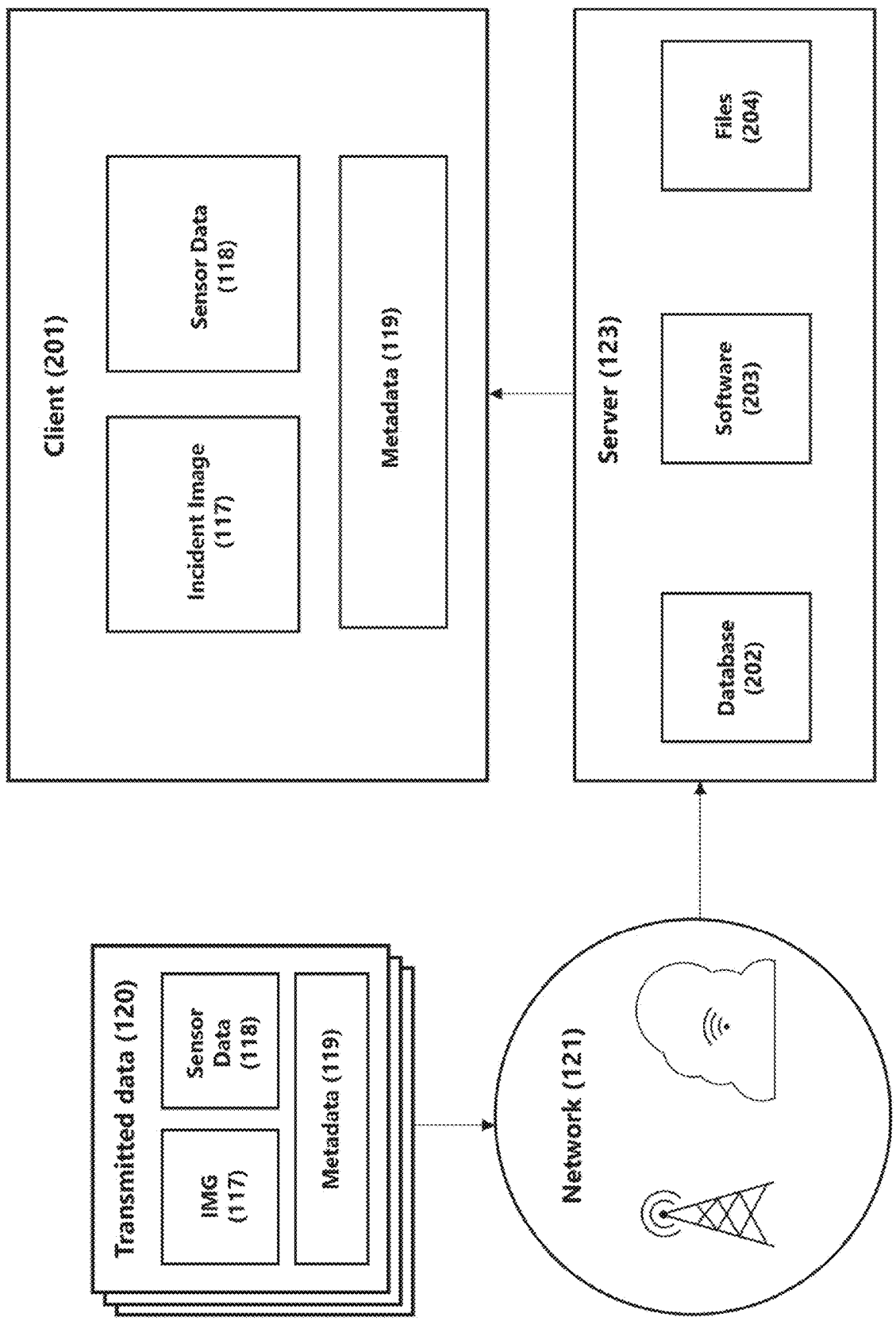
FIG. 14 illustrates an example client web interface of the system of FIGS. 1 and 13, including server and network communication.

Referring to FIGS. 13, 14, the server 123 is responsible for the organization, storage, processing and disseminating of the incident images 117 and other data 118 119 uploaded by the device 101. A single server 123 can host a plurality of users, whether governmental users, quasi-governmental users, or private organizations. A single server 123 can communicate with a plurality of devices 101 as clients of the server 123. The incident data 120 may be secured by encryption. It may also be organized into files, or database entries, and organized in a way that prevents other users from accessing data 120 that is not theirs, unless otherwise specified. As the server 123 receives incident data 120 from a device 101 via the internet through a network 121. The images 117 containing incidents of interest 12 are typically stored in one or more folders contained within the server 123. In some embodiments of the invention, these folders can be allocated according to the particular device 101 (such as unique ID or name) used for capture, the user's organization (such as unique id or name), and time at which they are acquired. The structure could use descriptive text or a hashed derivative.

Furthermore, the incident data 120 can be further segmented by preconfigured incident 12 types in the form of tags/labels 130, such as incident 1, 2, 3 and so on, or pothole, road hazard, obstructed sign and so on. These incident 12 tags/labels 130 correspond to the incidents 12 triggered by the trigger module 112. For example, incident trigger 1 on the trigger module 112 can be configured to be labeled as road damage 130, or obstruction 130, or vandalism 130, or any other label 130 the user decides to use. The incidents tags or labels 130 can also be based on voice commands 116. The image data 117 can be further organized by date, road, municipality, or other properties. The server 123 can further process the images 117 to remove, transform or redact portions of data 120. The discard data 19' can include personally identifiable information that may be included in an image 117. Sensor data 118 and derivative data 119, such as geographical coordinates, direction of travel, date/time, pitch and other obtainable data 118 119 can be associated to each incident images 117 as well as stored into one or more database(s) 202 on the server 123.

While the invention may be deployed on a physical server 123, the invention's server 123 functions may be segmented by various factors. It may be segmented by geography, whereby the system may have separate servers for Canada, USA, or other countries. It may be segmented by architectural function, for example DNS, runtime, database, storage, image processing, or other functions. It may be segmented by capacity, for example 1-1010 users on one server 123, 1011-2000 on another server 123. It may be segmented logically, such as a having virtual machines that run on server 123 cluster, or cloud. Many cloud providers, such as Amazon AWS, Google Cloud, Microsoft Azure, and other cloud providers offer a variety of ways to spin-up instances of servers 123 on a dedicated basis or on demand to customize the actual implementation of the server 123 infrastructure. Therefore, the word server 123 and servers 123 will be used interchangeably throughout the description, figures, and claims, as the system could be setup to use one or more physical, virtual or cloud based server 123. In some instances, the server(s) 123 may be hosted on premises using dedicated infrastructure provided by a customer.

In terms of format, a digital image 117 can be an image containing digital data content representing picture elements, also known as pixels, each with finite, discrete quantities of numeric representation for its color intensity or grey level that is an output from its two-dimensional functions fed as input by its spatial coordinates denoted with x, y. The image would be acquired either as raw image data available in various formats such as YUV, RGB, HSL, HSV, or other image color spaces and encodings available from the device's 101 camera 107. It is recognized that the images 117 can be compressed using any known or available compression technology, before incident data 120 is sent to the server 123.

Additionally, typical data 120 transmitted to the server 123 may contain some or all of the following:
(a) IDs, which may include the device ID, image ID, incident ID, user ID, and/or other ID's allowing to associate uniquely associate different data elements.
(b) Longitude: east-west position of a point on the Earth's surface. different countries may use different names or systems;
(c) Latitude: north-south position of a point on the Earth's surface. different countries may use different names or systems;
(d) Sensor data 118
(e) Date & time: a date and time signature pertaining to the time and date that an incident data 120 was acquired;
(f) Image 117: a picture of the incident capture by the Device's 101 camera(s) 107;
(g) Other data 119: pertains to other data that may be derived by the devices 101 software 108 from its configuration, AI capabilities 905, sensors 105 or user inputs such as trigger 112 or voice commands 116.

In view of the above, incident data 120 is transmitted to the server (s) 123 where it is processed by the server(s) 123 software(s) 203 and organized and stored in database(s) 202. Some data, such as uploaded incident images 117 may be stored in the form of files 204. The server 123 also provides for client(s) 201 to securely log in to access a user interface, which may be either a web application that can be accessed using a web browser, or application that uses physical installation on a computer or smartphone. Through the user interface, clients 201 can view incidents transmitted by the device 101, which have already been uploaded to the server 123, which can be visualized in a variety of ways, such as but not limited to:
  (a) A map view which depicts a map, along with pins representing acquired incidents 12;
  (b) A list view which depicts a table along with fields related to each incident 12; and/or
  (c) A gallery view which depicts a gallery of incidents 12 in the form of clickable images 117.

Further, by example, users can click on pins to display more information about the incident 12 such as image, details of the incident, date and time incident was obtained, and other incident data 120. Through a click of a button, the acquired incidents 12 can also be presented in a gallery view layout, where a thumbnail image of each incident is presented in a grid.

Client(s) 201 pertain to software that is used to access the system 10, 10'. It can typically be a web browser, but it may also be a dedicated desktop application and/or smartphone application. The client(s) 201 user interface may have different views to present the incident data 120 to the user. For example, when selecting the incident 12 for which it is related in the appropriate view, more information is displayed to the user.

The server 123(*s*) may process the information in a variety of ways, for example, the server 123(*s*) can associate incidents 12, through their GPS coordinates, to a road network segment, which is representative of a segment of road, which typically includes geospatial and descriptive data, such as points, features and other fields. For example, the class of the road (highway, local, regional), the street name, and/or the address range which it covers. Road segments are typically extracted from a geospatial database such as a shape file, KML file, KMZ file, XML, GML and/or other such popular formats used the modelling, transport and storage of geographic information.

The server 123(*s*) may also have an asset database, which may describe a variety of assets, such as road signs, manholes, and catch basins. The server 123 may automatically suggest a nearby asset for a certain incident 12 type (i.e. raised manhole) identified by a user. The association of incident to potential assets may be done on the device 101, the server 123 or both.

It is recognized that the server 123 can be a physical server 123 connected to the internet 121. Alternatively, the server 123 can be a virtual server 123 connected to the internet 121, where it may be hosted on one physical machine or on a server 123 cluster. Or, the server (s) 123 may be cloud based and connected to the internet 121.

Figure 15:
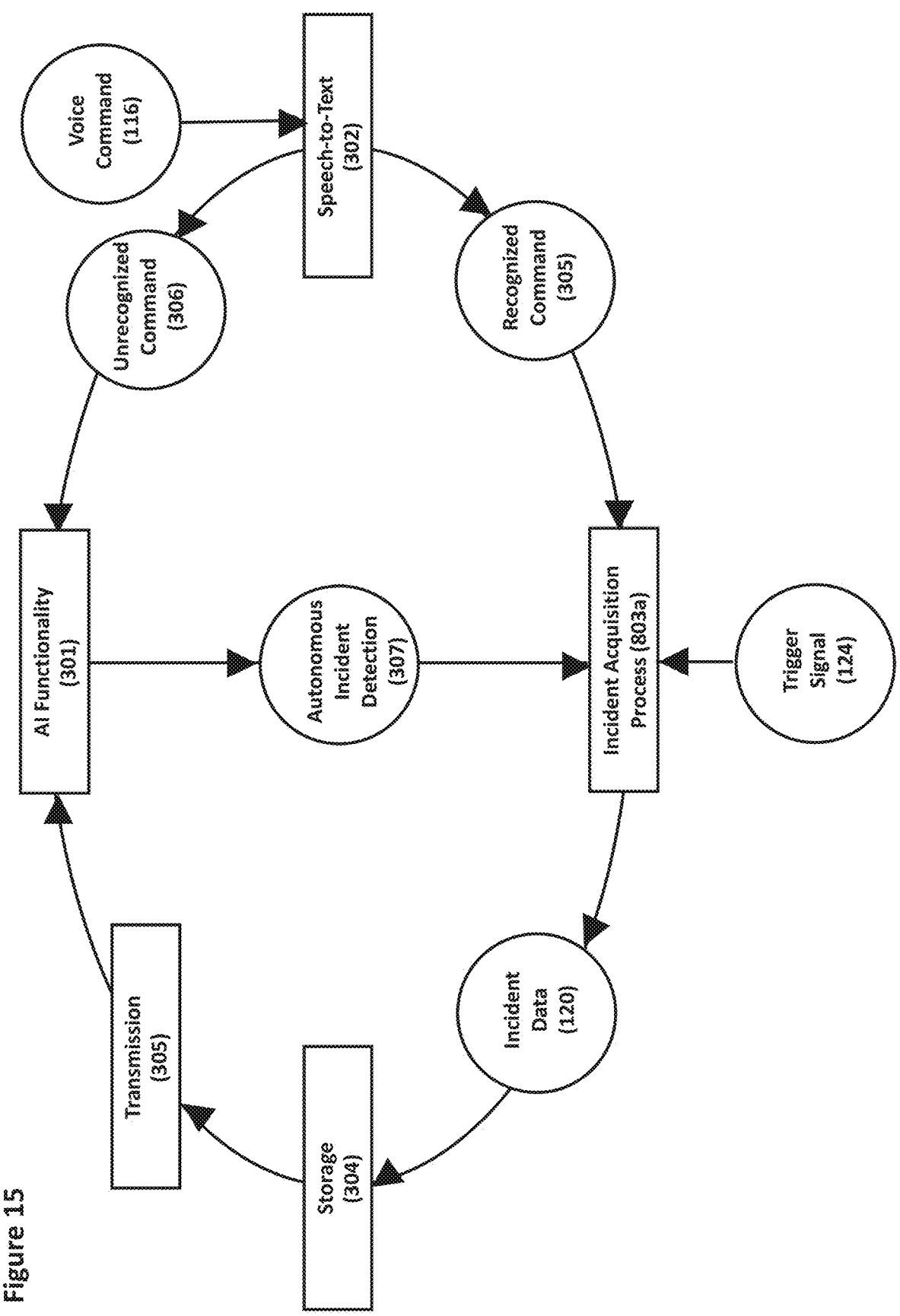
FIG. 15 shows an embodiment the systems of FIGS. 1 and 13 including various states and the various inputs used to initiate the states.

Referring to FIG. 15, shown is the utilization of the interactive process 803*a* working in conjunction to the autonomous process 307. This embodiment describes a state diagram displaying the various modules used to provide further functionality to devices 101 with AI functionality 905 and their interaction. Remotely controllable operations consist of initiating an incident acquisition process 803*a* that includes capturing incident data 120 including digital images 117 of the road related incidents 12, as directed by the operator via triggers 116, 124. The incident acquisition process 803*a* can be initiated by the trigger activation 124 or voice command 116. In the event of a voice command 116, this would be received and analyzed by a speech to text module 302, which helps to determine whether to capture the incident 12 and the incident information 120 via the process 803*a*. In the event of an unrecognized voice command 306, the system defaults to its regular AI functionality 301, as discussed herein. In such case, depending on different embodiments, no incident data 120 can be captured, or incident data 120 can be discarded from storage 304 in memory 103 or on local storage 104. In the event of a recognized voice command 305, the system 10, 10' moves to the acquisition state 803*a*, which captures one or more of the following: the incident image 117; sensor data 118; and incident metadata 119, which are then packaged to form incident data 120 suitable for storage 304 and transmission 305 to the server 123.

The storage state 304 invokes a process that stores incident data 120 that has been obtained from the acquisition process 803*a*. The storage state 304 can store the incident data 120 in a volatile memory 103 buffer or on a non-volatile memory 104 in order to store incident data 120. The default AI functionality 301 is typically configured to obtain image data based on a separate set of rules from the incident acquisition process 803*a*, and does so on an autonomous basis. The AI process 301 can also invoke the incident acquisition process 803*a* in which it can utilize for storing images 117, sensor data 118 and other metadata 119 derived from its image analysis and programming, and in the event that it considers the image 117 to be a positive match based on its configuration and programming, which also leads to storage 304 and transmission 305.

The transmission state 305 is invoked automatically when the incident data 120 is ready for transmission. Typically, all data stored on the device's memory 304 pertaining to incident data 120 are ready for transmission and deleted once they are uploaded to the server 123 in order to preserve space on the memory 104. The transmission state 305 typically defaults to the AI state 301 once it completes its functions, or in the case that no incident data 120 is stored in the memory 104, or in the event that network connectivity is unavailable, the system defaults to the AI state 301 in which the system 10, 10' can be configured to return to the transmission state 305 based on a schedule/timer in order to check network availability and whether incident data 120 is ready for upload.

It is recognized that multiple states/processes (some or all of the processes shown in FIG. 15) can be accessed at the same time using separate processes/threads. It is recognized that storing and/or sending of the incident data 120 can occur in real time while the device 101 continues collection and processing of additional images 117, sensor data 118 and metadata 119. Preferably, the acquired incident data 120 can also be transmitted in a real time basis and/or scheduled basis, dependent upon appropriate network connectivity between the device 101 and the server 123. Accordingly, sending incident data 120 over the network 121 can include queuing a set of incident data 120 in volatile memory 103 prior to subsequent transmission to the server 123. Selected portions of incident data 120 are transmitted over the network 121 by the device 101 over to a server 123 for subsequent storage on a database 202 and file system 204, for processing, storage access and reporting.

It is also recognized that FIG. 15 helps to illustrate the different states in which the device 101 can function, but due to the multi-threaded/multi-process method in which this technology is implemented in practice, more back and forth communication can take place between different processes/states, and more processes/states may be present.

In a typical cloud based deployment, the server 123 acts as a gateway to users of the system 10, 10', to make incident data 120 available in a meaningful and intuitive manner by way of accessing the data 120 transmitted to the server 123. It is recognized that as one embodiment, the incident data 120 containing information of the incidents of interest 12, can be portions of images 117. Alternatively, or in addition to, the resultant processed data 120 can also include parts or all of the metadata 119 of the acquired incident images 117.

Furthermore, the device 101 can upload incident data 120 intermittently when a connection is not accessible. For example, the device 101 can include non-volatile storage 104 that can store the incident data 120 temporarily and when a connection is available, send the data 120 through the network 121 to the server 123. Some users may choose to only use wireless LAN connectivity in order to forgo cellular networks to save on cellular data costs. In this case, acquired incident data 120 and images 117 would be stored until the device 101 has access to a wireless access point connected to the internet. The device 101 can be configured to transmit data 120 at a scheduled rate, in order to benefit from improved performance, power consumption, and/or heat management.

Figure 16:
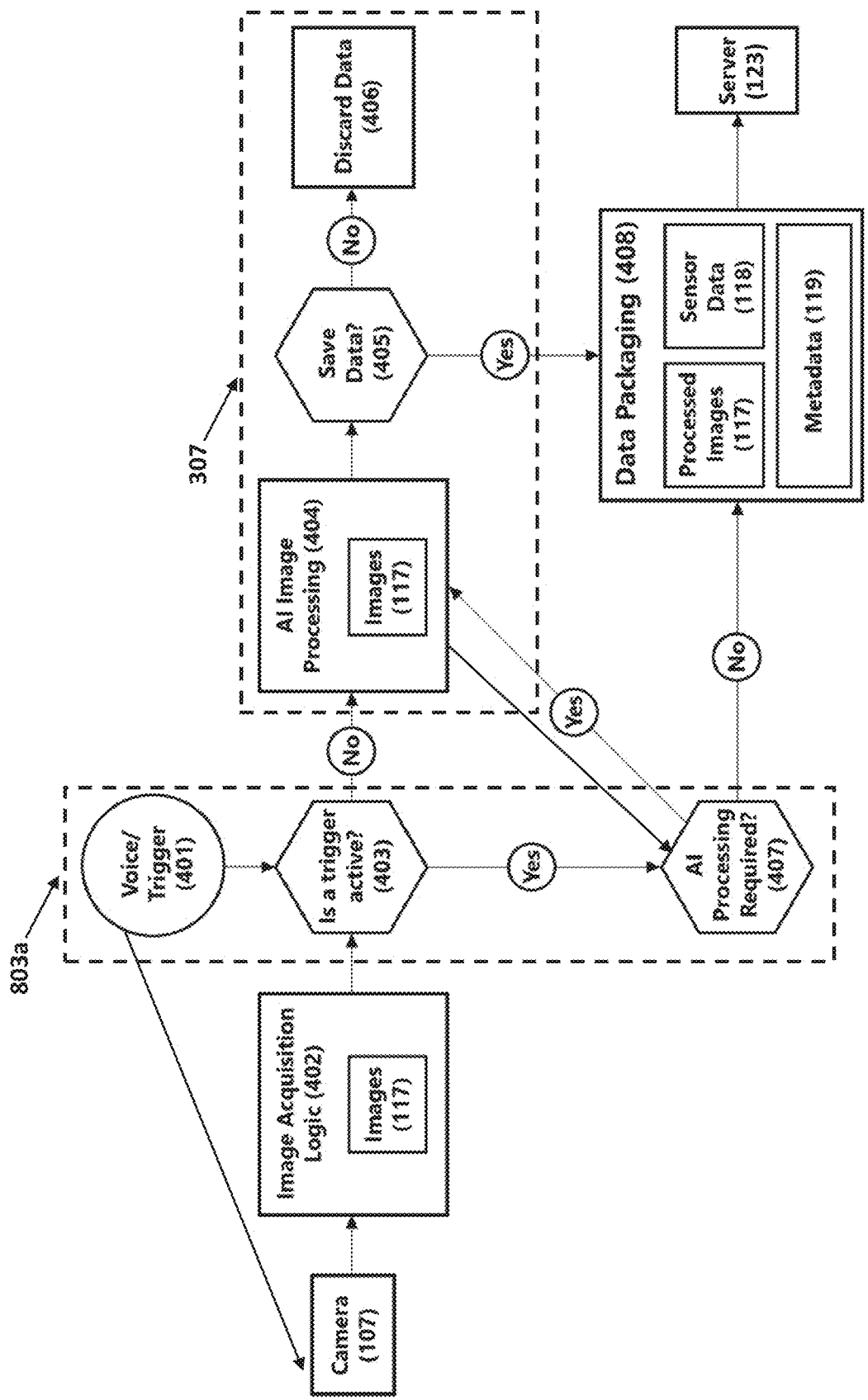
FIG. 16 is a flow diagram of an image acquisition process and discard process according to embodiments of the system as shown in FIGS. 1-15.

Referring to FIG. 16, shown is a flow diagram illustrating a workflow inclusive of the incident 12 acquisition process as well as clarifying the data 19' discarding process. The image acquisition logic 402 pertains to the method or processes, typically deployed as software 108 instructions, for collected image data 117 from the device's 101 camera 107. Typically, images 117 are collected from the camera 107 on a periodic basis where the frequency of collection is usually limited by the device's camera 107 sensor, 101 CPU 106 and/or GPU 110 capabilities, as the vehicle 102a travels along the road 14. The aforementioned image acquisition logic 402 may be connected to two different workflow paths, related to manual incidents 401 (activating the incident acquisition process 803a) or autonomous AI 404 analysis (using the process 301, 307). Typically, under normal operating conditions as per the autonomous process 301, the collected images 117 continue through to the AI image processing 404 task, where the AI inferencing operations 404 (utilizing the AI modelling 905) can be configured to generate identify incidents 12 in the images 117, add labels automatically 307, and optionally identify and discard 406 data (e.g. generate discard data 19' as discussed above) from the images 117. Depending on the software's 118 programming, the discard data 19' may be redacted from the image 117, or the whole image 117 may be redacted, or the entire image 117 may be regarded as discard data 19'. For example, if there is no object of interest 12 in the image 117, the image 117 can be discarded without being saved and transmitted.

In the event the entire image 117 is not discarded 406, the image data 117 and resultant data 118, 119 continues to the next packaging task 408 where it can be packaged with other relevant data. Other relevant data can include data related to the recently acquired image 117 such as relevant sensor data 118 that can include, for example GPS/GNSS coordinates, data pertaining to direction of travel and other sensor data 118 that may provide useful information of an incident 12. Metadata 119 may be included in the packaging process 408, and examples may include date and time information, incident label/tag and other relevant data that may provide useful information of an incident 12. Once the relevant data pertaining to an incident 12 has been packaged 408 in a server 123 friendly format, the incident data 120 can be stored on the device 101 in a file system or database and/or sent to the server 123 for long term storage and access.

Other workflows may be utilized by the aforementioned system operation in order to provide further functionality. Such as, in the event that a trigger 124 or voice signal 116 event 401 is detected by the software 108. Rather than to continue to process the (e.g. automatically) acquired image 117 using the AI processing 404, the image 117 can be directly passed to the data packaging 408 portion of the workflow, where it is packaged, then stored/sent to the server 123 as incident data 120.

There may be cases where images 117 acquired in this manner require image processing 404 in order to redact data 19' pertaining to personally identifiable information that may be present in a scene 12, or provide further analysis using software 108 instructions. The system 10', 10 is designed to typically be operated in a vehicle 102a travelling along public roads 14. Therefore, captured images 117 can contain private information of citizens such as, faces and/or vehicle license plate numbers 12. In some embodiments entire vehicles 12 and/or people 12 can be redacted 406 from an image 117.

Therefore, in certain embodiments, a determining whether AI processing is required 407 may be included to route the acquired image 117 to the AI processing task 404 in order to redact personally identifiable image. In some embodiments, the AI image processing 404 task may include alternate processing instructions in order to accommodate this workflow.

Under normal operating conditions, the image processing 404 task may discard the image 117 entirely, however, due to the manual person trigger it may be processed in a different manner. Whereas an alternate set of image processing instructions contained in the AI processing task 404 may be included in order to process acquired images 117 obtained from the trigger/voice 401 functionality. Where this set of instructions can typically be configured to only redact personally identifiable information from an image 117 and discarding 406 it. In some embodiments, the aforementioned requirements may be achieved by configuring the image processing task to accept inputs from the trigger/voice 401 outputs. In the event that a trigger/voice signal 401 is detected and image processing 404 is required, the task 404 can be configured to not discard 406 entire images 117 and to only redact portions of the image data 117. In some embodiments, the image processing operations for images 117 acquired by trigger/voice 401 functions may be deployed on the server 123 in the form of server side processing instructions 203. Where the images 117 are processed subsequent to being uploaded 409 to the server 123.

Figure 17:
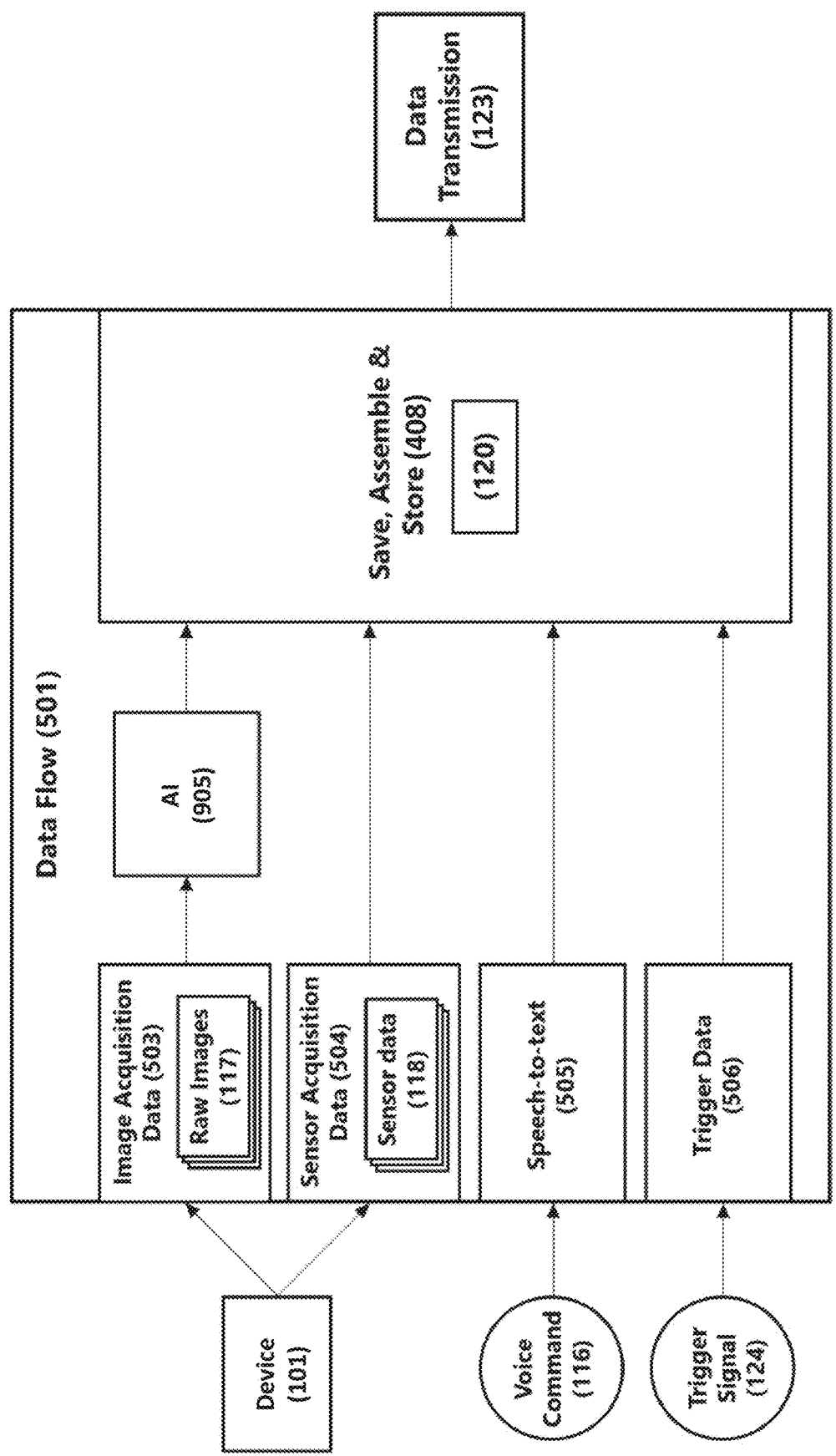
FIG. 17 shows a data flow diagram of using AI and human input to adjust and generate incident containing data acquired by the device of the system as shown in FIGS. 1-15.

FIG. 17 illustrates an example data flow 501 scheme utilized by the system 10, 10' to collect, assemble, store and send data 120 pertaining to incidents of interest 12. The device 101 inputs to the system 10, 10' come in the form of data such as images 117 and sensor data 118, collected from the device's 101 camera 107 and sensor 105 modules. The image data 117 and sensor data 118 can be queued/stored into image data buffer, sensor data buffer osr simply fetched/polled upon demand.

The sensor data acquisition 504 and image acquisition 503 processes are typically low level and done by the device's 101 embedded hardware and software 108. It is recognized that an embedded device 101 may have limited data acquisition capabilities—for example, limited frame rate or limited sensor refresh rate. It is also recognized that bottlenecks in the device's hardware 101, including CPU 106, GPU 110, camera 107, sensors 105, Non-Volatile Memory (104) and volatile memory (103) can inhibit the device 101 from processing all the collected data 117, 118, 119. There can also be processing delay in the underlying software 108 which can further limit the ability to process all data.

As such, in typical implementation, the software 108 would typically fetch the most recent image 117 and the most recent sensor data 118 based on the device's 101 processing ability. As such, some images 117 and associated sensor data 118 can be dropped.

The data flow 501 can include processing the image data 117 using AI image processing instructions 905. The results from the AI processing 905 provide descriptive output data 119 in various forms for each image 117, which can be used to determine whether the image data 117 contains incidents of interest 12. In the case of an incident 12, the AI 905 and related software 108 have the functionality to automatically to invoke the save, assemble, and send logic of the workflow 408. The sensor data 118 associated with the image 117 is automatically fetched 504, saved, assembled and sent with the image data 117 in the incident data 102.

Alternatively, the incident packaging logic 408 (see FIG. 16) can be invoked with the use of an external trigger device 124, or voice command 116. The trigger device 112 transmits a trigger signal 124 to the device 101, and includes data (e.g. label 130) from indicating the type of incident being obtained. This data 130 is forwarded to the packaging logic 408 where it is assembled with the image 117 and sensor data 118 along with various other data pertaining to the incident 119. The incident data 120 can be packaged for transmission to the server 123.

Shown in FIG. 16 is further details of the incident acquisition process 803*a* as initiated by the manual acquisition process signal(s) 116, 124, and the autonomous acquisition process 307. It is recognized that any of the processes described in the figure can occur in parallel and/or in series.

For example, in the case where an image 117 (captured the camera 107) is noted by the operator (e.g. seeing the captured image 117 on the screen 111—see FIG. 13), the operator can send a command signal 116, 124 in order to invoke the interactive process 803*a* for the noted image 117. For example, the command 116, 124 can be used by the operator to add additional labels 130 (and any other descriptive metadata 119) manually to the captured image 117, such that these additional labels 130 (e.g. descriptive material) may or may not have been noted under the autonomous process 307 (e.g. as resulting from the processing 404). One example trigger operation is where the operator notices a larger than normal pothole 12 in the image 117 and wants to make special mention of its location (and potentially other information such as size, etc). As discussed, the additional label(s) 130 can be selected via a list, as provided to the operator by the further processing function 407 of the system software 108 as invoked by the particular trigger signal/command 116, 124.

As such, it is recognised that FIG. 16 shows multiple triggers 116, 124, 307, for incident acquisition process 803*a* that can be applied to captured images 117, such that the results of the incident acquisition process 803*a* are then sent to the packaging module 408 for assembly of the incident data 120 for sending to the server 123. For example, one case is where for a particular captured image 117, at task 403 the software 108 recognizes no/lack of presence of a command 116, 124 (i.e. the particular image 117 is not flagged for interaction) and therefore the software 108 uses the AI process 301 (utilizing the AI methodology 905) to identify and label 307 incidents 12 and incorporate any resultant metadata 119 and sensor data 118 as discussed above. Once processed, the task 405 can be used to send the data 117, 118, 119 (including identification of incidents 12) to the packaging task 408 for assembly of the incident data 120 for communication over the network 121 to the server 123 (e.g. accounting for defined reporting intervals, address location of server 123 on the network 121, server requests for data, etc.). As such, it is recognised that the packaging task 408 is used by the device 101 to assemble and send the incident data 120 in the predefined reporting frequency/content format as expected by the server 123. It is recognized that in some embodiment, one process 803*a* will handle all incident acquisitions, automated 307 and manual 116, 124, whereas in other embodiments, there may be different variations/multiple instances/modules of the incident acquisition process 803*a* for different incident initiation options 116, 124, 307 which may be manual or automated.

It is recognised that the captured image 117 can be such an image 117 as automatically produced by autonomous operation of the camera 107 or otherwise requested by a command 116, 124. For example, the captured image 117 can be the result of the command 116, 124 requesting that the camera 107 take an image of a particular section of the roadway 14. In this case, the requested image 117 (as per the command 116, 124) can utilize the processing task 407 to process the image 117 using the AI process 301 before or after the process 803*a* is performed (e.g. interactive adding of label(s) 130 by the operator via the command(s) 116, 124). For example, at task 407, the device 101 can be instructed by the operator (via commands) 116, 124) to add the selected label(s) 130 interactively and them to simply pass the resultant image and label(s) 130 to the packaging task 408. Alternatively, at task 407, the device 101 can be instructed by the operator (via commands) 116, 124) to add the selected label(s) 130 interactively and them to pass the resultant image and label(s) 130 to the AI processing task 404 for AI processing (using the AI modeling 905) and eventual receipt by the packaging task 408. In this manner, the process 803*a* is applied first and then the AI process 301 and labeling 307 is applied second.

In view of the above, it is recognised that the device 101 can implement the some or all of the processes 116, 124, 301, 307, 803*a* in a number of different ways and in different order of operations. In terms of an image 117 autonomously captured by the camera 107 (e.g. not directed to specifically image capture via a command 116, 124 received by the camera operational logic):

1) for "no" presence 403 of a command 116, 124, the processes 404, 405, and 408 are utilized (and optionally 406) to result in the incident data 120 sent to the server 123;
2) for "yes" presence 403 of a command 116, 124, the process 803*a* (i.e. performing as an interactive image 117) is utilized to add label(s) 130 before processes 404, 405 and 408 can be performed to result in the incident data 120 sent to the server 123 (e.g. process 404 can be skipped on the device 101 for a particular interactive image 117); and
3) for "yes" presence 403 of a command 116, 124, the process 803*a* (i.e. performing as an interactive image 117) is utilized to add label(s) 130 after processes 404, 405 (and optionally 406) are performed, in order to affect the content of the incident data 120 before sending to the packaging task 408 (e.g. process 404 is used on the device 101 for a particular interactive image 117).

Further to the above, it is recognised that for an interactive image 117, the system 10, 10' can continue to autonomously (e.g. using processes 301, 307) to acquire, process and send images 117/incident data 120 reflective of the road 14 as the vehicle 102*a* is operated/travelling.

Further to the above, it is recognised that for an interactive image 117, the system 10, 10' can be paused (i.e. autonomous process 301, 307 is interrupted) until the interactive image 117 using the interactive process 803a is acquired and processed to generate the interactive images 117/incident data 120 reflective of the road 14 commanded 116, 124 by the operator as the vehicle 102a is operated/travelling.

The trigger/voice command activation process 803a can be used as an alternative to the AI processing 905 workflows 301. In this event, the latest image 117 and sensor data 118 are directly pulled from their respective buffers and assembled with the trigger data 124 and other relevant data commonly referred to as metadata 119. Assembly typically includes packaging the image 117, sensor 118, and meta data 119 together in a file format suitable for server 123 communication. Suitable file formats can include XML, JSON or other file formats. As previously mentioned, files are temporarily saved to the device 101 in the case that network communication is unavailable, in which communication will be attempted at a later time.

Voice command 116 functionality can be included as an alternative to trigger device functions 124 in order to invoke the package-to-send logic 408 directly. Voice commands 116 are sent by the user and are typically in the form of an activation phrase 116, 124 that the system 10, 10' is configured to listen for. The speech-to-text data 505 (also referred to as label 130) which includes utilizing the devices microphone 125 and audio interface 102 in order to execute the task of adding the data 130 to the incident data 120 via the AI package to send logic 408 step. The functionality is similar to the trigger device 124 functionality, in that it can invoke the packaging logic 408 as well as forwarding portions of metadata 119 (e.g. as obtained as labels 130) to be assembled with the rest of the data 120. This portion of metadata 119 typically includes the incident command 116, 124, which can be a portion of the phrase included after an activation phrase. The activation command 116, 124 can therefore also invoke the packaging logic 408, and then the incident command 116, 124 with associated label data 130 is assembled with the latest image 117 and sensor data 118, as selected initially via the command 116, 124 under interaction by the operator of the device 101.

The data packaging process 408 may include in the incident data 120 one image 117 and related data 118, 119 per incident. In another embodiment, the data packaging process 408 may include in the incident data 120 a series of images 117, or a video clip 117 related to the incident, together with the related data 118, 119. In another embodiment, the data packaging process 408 may include in the incident data 120 one or more incident image(s) 117 and related data 118, 119, as well as a video clip 117 of the incident data.

The number of additional images 117 may be programmed based on a number of frames 117 before and/or after the incident trigger 116, 124 was activated. It is recognized that the software 108 may store images 117 in memory 99, 104 for a certain period of time or up to a certain data volume and as such, it would be possible to retrieve images 117 that were acquired by the device's 101 camera(s) 500 before the incident capture 116, 124 was initiated.

The duration of the video clip 117 may be programmed based on a number of units of time (for example, seconds) before and/or after the incident trigger 116, 124 was activated. It is recognized that the software 108 may store images 117 or video chunks 117 in memory 99, 104 for a certain period of time or up to a certain data volume and as such, it would be possible to retrieve images 117 that were acquired by the device's 101 camera(s) 500 before the incident capture 116, 124 was initiated.

Referring to FIG. 18, the trigger module's 112 inputs 114 may consist of a control interface 114 that may comprise of one or more switches 114, such as push button switches, toggle switches, rocker switches, membrane switch, capacitive or resistive touch sensors, or any other type of mechanically or electrically actuated switching mechanism. The contact interface inputs 114 may consist of multiple inputs, where each specific input 601 can be made identifiable using instructions executed by the microcontroller 113 prior to communication with the AI device 101. For example, specific input 114 can be assigned a unique identifier 601 such as a number, string, or value. This identifier 601 can then be transmitted 124 by the trigger module 112 to the AI device 101. The AI device 101 can then parse the received signal 116, 124, and associate the identifier 601, selected interactive image 117 and sensor data 118 to an incident data package 120. The identifier 601 can be further associated, on the device 101, or the server 123, with a unique tag/label 603 (e.g. from the possible labels 130—see FIG. 13) from a set of predefined tags/labels 602 (e.g. label list). As part of the acquisition process, the device 101 or server 123 can then tag 130 the acquired incident image 117 and data 118 with the tag/label 603 associated with the identifier 601, based on the activated trigger input 114.

The assignment process from trigger inputs 114 to tags/labels 603 can be configured 602 by the user. For example, it can be configured 602 to assign the first identifier 601 on the trigger module 112 to a tag/label 603 such as "road hazard". Therefore, when the first identifier 601 is provided by the trigger module 112, i.e. as part of the command 124, the AI device 101 initiates the interactive acquisition process 803a, and associates the acquired image 117 and sensor data 118 with specified "road hazard" tag/label 603, prior to any further processing (optional) and transmission over the network 121 to the server 123. In general, the associated tags/labels 603 can be manually inputted by the user and assigned to any of the identifier(s) 601 of the trigger inputs 114 (e.g. commands 116, 124).

The communication interface 115 of the trigger module 112 can comprise of a wireless network interface controller 115, and/or a wired interface network interface controller 115. The interface 115 can be used to establish network communication with the AI device 101, as well as transmit commands 116, 124 to the AI device 101 in order to initiate the incident acquisition process. In the case of a wireless transmitter, the networking technology used to establish communication between the devices can consist of technologies such as, Radio, Bluetooth, BLE, Wi-Fi (IEEE 802.11), ZigBee, or other wireless communication protocols. In the case of a wired interface, the technology used to establish communication may consist of a variety of serial or parallel communication protocols such as, CAN, I2c, SPI, Ethernet, RS232, USB, 1-Wire or other serial communication protocols used to establish communication between embedded devices.

The trigger module 112 can comprise a display, such as an LCD screen, LED screen, OLED screen, segment display, ELD screen, or other types of displays used to display images, numbers, strings etc. The display can be used to feedback to the user in the form of visual notification(s), when an input 114 has been activated. The display can be used to display the incident tag/label 602 that is assigned to an input 114 when that input 114 has been activated. The trigger module's 112 display can be combined with the trigger module's 112 inputs 114, into one module 112 that can perform both of these functions. For example, with the use of a touch screen display, the trigger module 112 can implement capacitive or resistive touch inputs, while displaying feedback information on the screen.

Further to the above, it is recognised that the functionality of the device 101 and associated process 803*a* can be configured to facilitate when the operator is following the images 117 being recorded, the operator would be able to select an image 117 (or video portion) and then ask the system process 803*a* to manually add descriptors/labels 130 to the image 117 or to otherwise redact or unredact portions. For example, an operator action 114 (button push or voice command) can grab the latest picture 117 in the sequence buffer and add digital information 130 to it. The digital information 130 can be pre-programmed (i.e. button 1—pothole) or chosen out of a list/tagged with text (i.e. hey rover—tag pothole), see FIG. 18 and related description.

Further, the operator can also ask the system via command 116, 124 to take a specific picture 117, i.e. point the camera 500 to a selected incident or region. In this case, the autonomous incident detection 307 can be temporarily halted (optional as one embodiment) while the camera 500 is being directed interactively by the operator. Otherwise, a separate picture 117 can betaken by the operator, using a different device, and thus this separate picture 117 can be sent to the smart camera 101 and then the operator can interactively adjust the picture 117 using the capabilities of the smart camera 101 (e.g. one or both of the processes 307, 803*a*).

It is noted that in some cases, the camera 500 field of view can already cover most the field of view in front of the windshield, meaning that whatever the driver sees, the device 101 is also likely to be see. The AI operations 301 grabs pictures 117 individually and analyzes them 307. When the interactive action 803*a* is taken, either the (e.g. last) picture 117 in memory is used (i.e. the last picture 117 that was analyzed by the AI) or a new picture 117 is taken, as per preferred embodiments. That picture 117 is then tagged with additional descriptive information 130—either pre-programmed or chosen out of a list/tagged with text, see FIG. 18.

Further, from incident 12 tagging perspective, the AI tagging incident process 307 looks for certain objects/incidents 12 and it can be an independent process from the operator tagging incidents using process 803*a*. There may be some overlap in the incident 12 acquisition 116, 124, 307 types for the different processes in interacting with the interactive acquisition process 803*a*. Once an incident 12 has been tagged by an operator, the whole image 117 can be labeled with an incident tag 130, 603. The AI may then process 307 the image 117 to identify and redact personal information (people/cars), and look for other types of incidents 12 and tag them. If it is missed on the device 101, the server 123 can also analyze the image 117 redact the information.

We claim:

1. A system mounted to a vehicle for identifying a plurality of incidents of a roadway external to the vehicle and transmitting the identified incidents to a server, the plurality of incidents pertaining to the roadway surface itself, the server located remotely from the system, the system comprising:
    a device having:
        at least one camera for obtaining digital images of the roadway surface;
        at least one sensor including location-based sensor;
        at least one memory and at least one processor for executing image processing instructions including artificial intelligence (AI) for processing the digital images for automated detection of the plurality of incidents, in order to determine the identified incidents based on the instructions, generating object data based on the processing and incident data including the object data and the digital images; and
    a network interface for sending the incident data over a communications network to the server during operation of the vehicle on the roadway.

2. The system of claim 1 wherein the AI performs the automated detection to identify the plurality of incidents on a roadway in a moving vehicle by utilizing operations related to image processing and AI inference on the digital images.

3. The system of claim 2 wherein the system includes an interface for receiving an input from the operator of the device for interactive tagging of incidents of the incident data, including at least incident images and incident location from the at least one sensor for transmission to the server.

4. The system of claim 3, wherein the device communicates with an external trigger module.

5. The system of claim 4, wherein, when activated, the external trigger module initiates an incident capture, storage and transmission of the incident data to server.

6. The system of claim 5, wherein the trigger module input activates a tagging of a selected one of the plurality of incidents in the incident data with an added label.

7. The system of claim 3, wherein the system is capable of capturing audio data using a microphone and/or an audio interface.

8. The system of claim 7, wherein a voice command initiates a capture, storage and transmission of the incident data to server.

9. The system of claim 8, wherein different voice commands result in different incident tags.

10. The system of claim 8, wherein the voice commands are transcribed and analyzed locally on the device using speech-to-text algorithms or the AI.

11. The system of claim 8, wherein the voice commands are transcribed and analyzed remotely using speech-to-text algorithms or the AI on a remote server.

12. The system of claim 3, wherein the plurality of incidents reported by the device to the server can be accessed through a client application, an app or a browser.

13. The system of claim 3, wherein the incident data sent includes sensor data captured from the at least one sensor.

14. The system of claim 3, wherein the incident is tagged with additional metadata derived from the input.

15. The system of claim 3, wherein the incident data can include a video clip instead of an image.

16. The system of claim 3, wherein the incident data can include a video clip in addition to an image.

17. The system of claim 3, wherein the incident data contains redactions of personal identifying information.

18. The system of claim 3, wherein the interactive tagging takes place concurrently with the automated detection of the incidents.

19. The system of claim 3, wherein the interactive tagging takes place in sequence with automated detection of the incidents.

20. The system of claim 3, wherein the device is a smartphone.

21. A method for identifying a plurality of incidents of a roadway external to the vehicle and transmitting the identified incidents to a server, the plurality of incidents pertaining to the roadway surface itself, the server located remotely from the system, utilizing at least one memory and at least one processor for executing instructions to:

instruct a device mounted on a vehicle, the device having at least one camera for obtaining digital images of the roadway surface and sensor data using at least one sensor including location-based sensor;

execute image processing instructions including artificial intelligence (AI) for processing the digital images for automated detection of the plurality of incidents, in order to determine the identified incidents based on the instructions, generating object data based on the processing and incident data including the object data and the digital images; and send the incident data over a communications network to the server during operation of the vehicle on the roadway.

* * * * *